US012789042B2

(12) United States Patent
Shah

(10) Patent No.: US 12,789,042 B2
(45) Date of Patent: Nov. 10, 2026

(54) WEARABLE DEVICE SYSTEMS AND METHODS FOR MOVEMENT SIGNATURES

(71) Applicant: Xperience Robotics, Inc., Virginia Beach, VA (US)

(72) Inventor: Ankit Shah, Virginia Beach, VA (US)

(73) Assignee: Xperience Robotics, Inc., Virginia Beach, VA (US)

( * ) Notice: Subject to any disclaimer, the term of this patent is extended or adjusted under 35 U.S.C. 154(b) by 343 days.

(21) Appl. No.: 18/514,133

(22) Filed: Nov. 20, 2023

(65) Prior Publication Data

US 2024/0082638 A1 Mar. 14, 2024

Related U.S. Application Data

(63) Continuation-in-part of application No. 18/461,144, filed on Sep. 5, 2023, which is a continuation of (Continued)

(51) Int. Cl.
*A63B 24/00* (2006.01)
*G06F 1/16* (2006.01)
(Continued)

(52) U.S. Cl.
CPC ...... *A63B 24/0006* (2013.01); *A63B 24/0062* (2013.01); *G06F 1/163* (2013.01);
(Continued)

(58) Field of Classification Search
CPC ............ A63B 24/0006; A63B 24/0062; A63B 71/0619; A63B 2024/0009;
(Continued)

(56) References Cited

U.S. PATENT DOCUMENTS 9,286,782 B2 3/2016 Chang et al.
9,526,946 B1 12/2016 Zets et al.
(Continued)

FOREIGN PATENT DOCUMENTS

CN 108463271 A 8/2018
EP 2417905 A1 2/2012
(Continued)

OTHER PUBLICATIONS

Examination Report for Indian Application No. 202014018711 dated, Jul. 9, 2020.

*Primary Examiner* — Peter S Vasat
*Assistant Examiner* — Stephen Alvesteffer
(74) *Attorney, Agent, or Firm* — Bookoff McAndrews, PLLC

(57) ABSTRACT

A method for generating or modifying movement signatures includes receiving a request to generate a movement signature, receiving first sensor data from one or more sensors of a first wearable device associated with a first user, the first sensor data being generated with one or more of an accelerometer, a gyroscope, or a magnetometer of the wearable device, and associating the first sensor data with the movement signature and storing the sensor data. The method also includes receiving second sensor data from one or more sensors of a second wearable device associated with a second user, the second sensor data being generated with one or more of an accelerometer, a gyroscope, or a magnetometer of the second wearable device, analyzing the second sensor data in comparison to the first sensor data, and based on the analysis: generating a notification, or modifying the movement signature.

20 Claims, 23 Drawing Sheets

Related U.S. Application Data application No. 17/723,512, filed on Apr. 19, 2022, now Pat. No. 11,779,808, which is a continuation of application No. 16/859,005, filed on Apr. 27, 2020, now Pat. No. 11,325,000.

(60) Provisional application No. 62/842,668, filed on May 3, 2019.

(51) Int. Cl.
*G06F 3/01* (2006.01)
*G09B 19/00* (2006.01)
*A63B 71/06* (2006.01)

(52) U.S. Cl.
CPC ........... *G06F 3/016* (2013.01); *G09B 19/003* (2013.01); *A63B 2024/0009* (2013.01); *A63B 2024/0015* (2013.01); *A63B 71/0619* (2013.01); *A63B 2220/40* (2013.01); *A63B 2220/803* (2013.01); *A63B 2220/836* (2013.01); *A63B 2220/89* (2013.01)

(58) Field of Classification Search
CPC ........ A63B 2024/0015; A63B 2220/40; A63B 2220/803; A63B 2220/836; A63B 2220/89; G06F 1/163; G06F 3/016; G06F 3/0346; G09B 19/003
USPC .......................................................... 434/247
See application file for complete search history.

(56) References Cited

U.S. PATENT DOCUMENTS

| | | | | |
|---|---|---|---|---|
| 9,582,035 | B2 | 2/2017 | Connor | |
| 9,936,900 | B2 | 4/2018 | Chang et al. | |
| 10,065,074 | B1 | 9/2018 | Hoang et al. | |
| 10,251,595 | B2 | 4/2019 | Heruth et al. | |
| 10,314,520 | B2 | 6/2019 | Hauenstein et al. | |
| 10,973,440 | B1 | 4/2021 | Martin | |
| 2004/0203414 | A1 | 10/2004 | Satou et al. | |
| 2011/0092860 | A1 | 4/2011 | Salarian et al. | |
| 2013/0171596 | A1* | 7/2013 | French .................. | G09B 19/00 434/236 |
| 2013/0244211 | A1 | 9/2013 | Dowling et al. | |
| 2015/0153374 | A1 | 6/2015 | Balakrishnan et al. | |
| 2015/0366504 | A1 | 12/2015 | Connor | |
| 2016/0066820 | A1 | 3/2016 | Sales et al. | |
| 2016/0086500 | A1 | 3/2016 | Kaleal, III | |
| 2016/0202755 | A1 | 7/2016 | Connor | |
| 2016/0262688 | A1 | 9/2016 | Nichols | |
| 2017/0061817 | A1 | 3/2017 | May | |
| 2017/0182362 | A1 | 6/2017 | Mcleod et al. | |
| 2017/0225033 | A1 | 8/2017 | Czaja | |
| 2017/0227995 | A1* | 8/2017 | Lee ........................ | G06N 20/00 |
| 2017/0344919 | A1* | 11/2017 | Chang ...................... | G09B 5/02 |
| 2018/0045502 | A1 | 2/2018 | Ho et al. | |
| 2018/0242654 | A1 | 8/2018 | Marikkar et al. | |
| 2019/0224529 | A1 | 7/2019 | Jung et al. | |
| 2020/0093418 | A1 | 3/2020 | Kluger et al. | |

FOREIGN PATENT DOCUMENTS

| | | | |
|---|---|---|---|
| EP | 2972678 | A1 | 1/2016 |
| KR | 101707930 | B1 | 2/2017 |

* cited by examiner

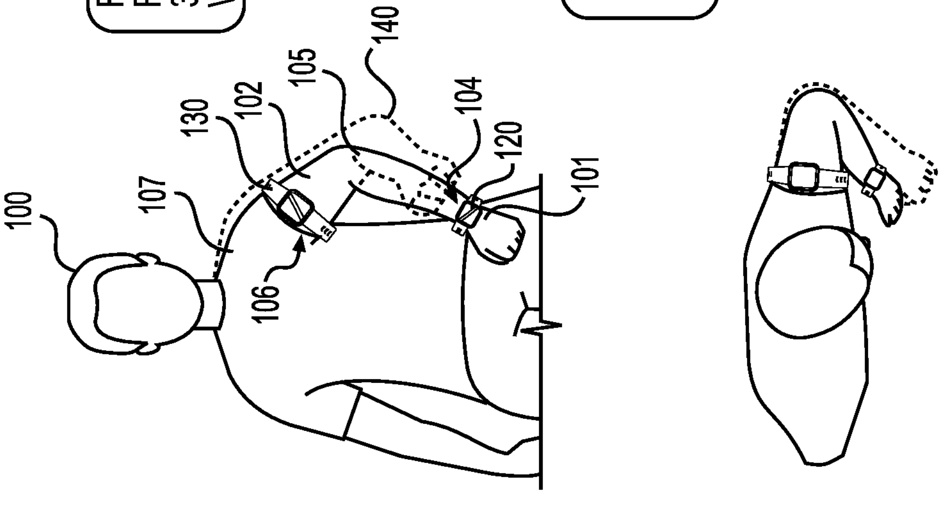
FIG. 1A-i
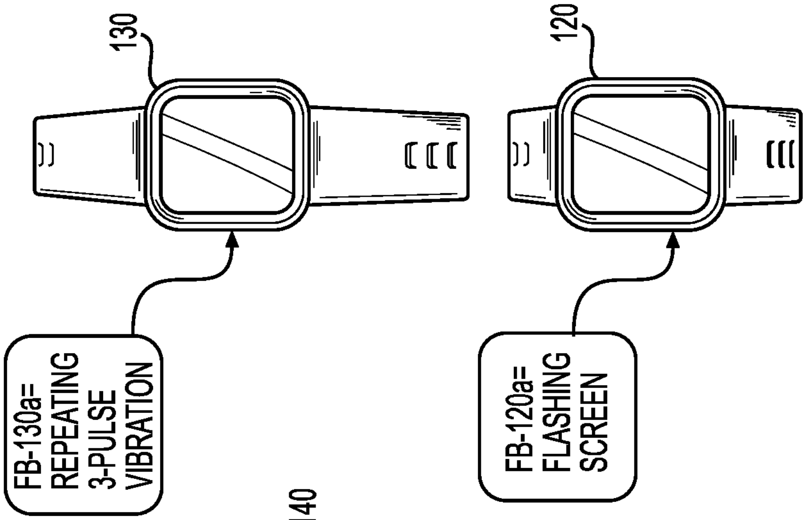
FIG. 1A-ii
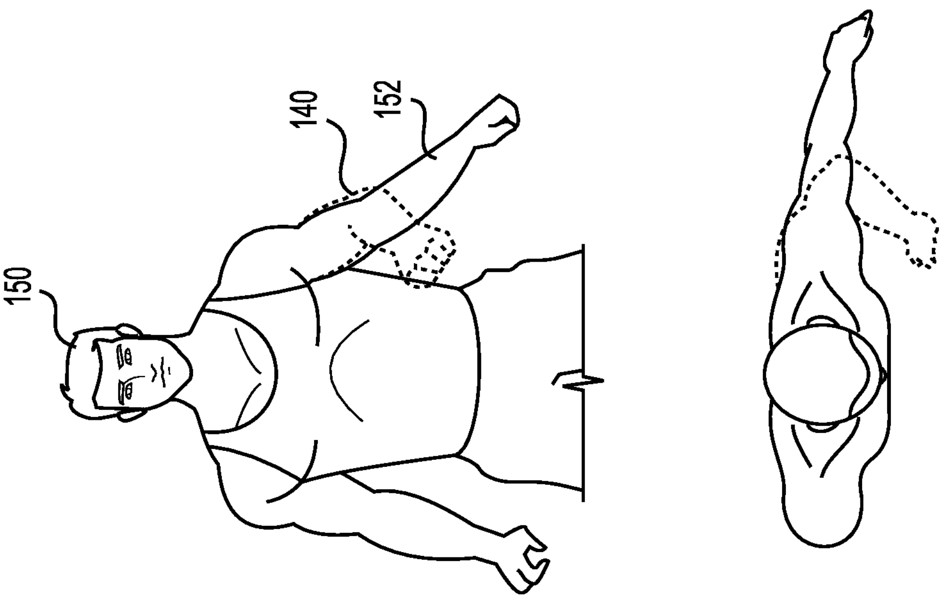
FIG. 1A-iii

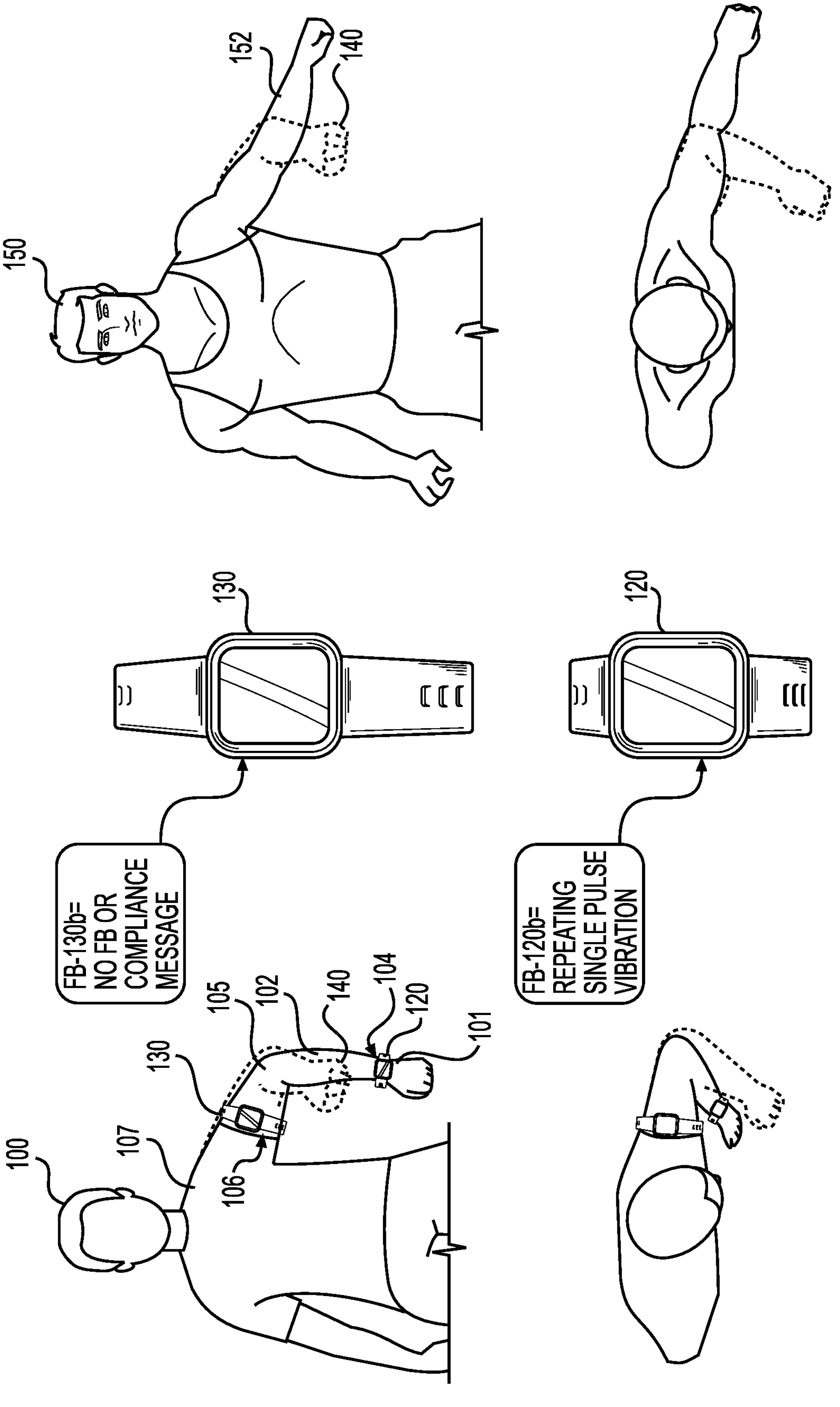
FIG. 1B-i
FIG. 1B-ii
FIG. 1B-iii

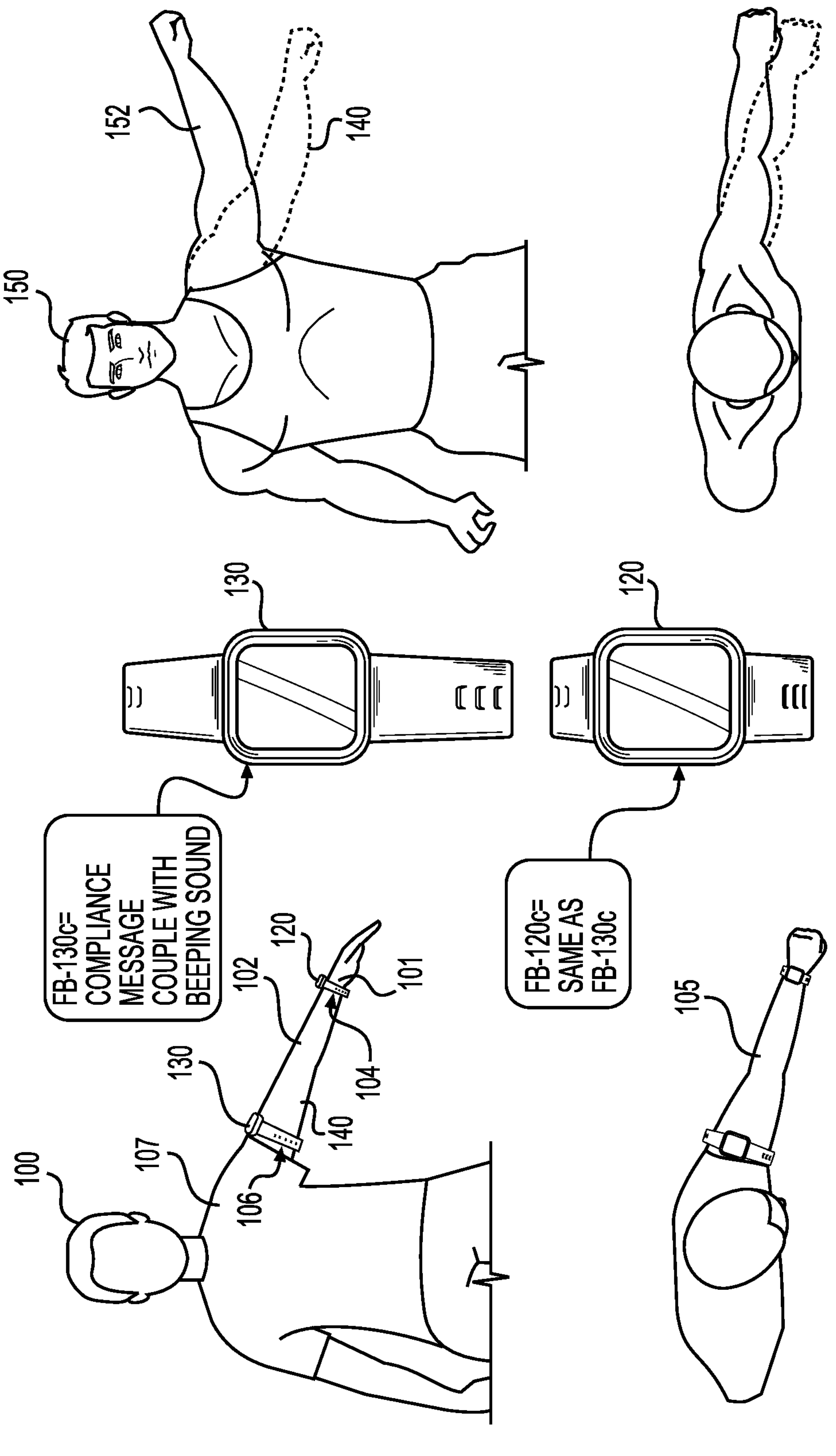
FIG. 1C-i
FIG. 1C-ii
FIG. 1C-iii

WEARABLE DEVICE SYSTEMS AND METHODS FOR MOVEMENT SIGNATURES

CROSS-REFERENCE TO RELATED APPLICATIONS

This application is a continuation-in-part of U.S. patent application Ser. No. 18/461,144, filed on Sep. 5, 2023, which is a continuation of U.S. patent application Ser. No. 17/723,512, filed on Apr. 19, 2022, issued as U.S. Pat. No. 11,779,808, on Oct. 10, 2023, which is a continuation of U.S. patent application Ser. No. 16/859,005, filed on Apr. 27, 2020, issued as U.S. Pat. No. 11,325,000, on May 10, 2022, which claims priority to U.S. Provisional Patent Application No. 62/842,668, filed May 3, 2019, the entireties of which are incorporated by reference herein.

BACKGROUND

Some wearable devices include sensors that can provide some level of information related to the individual's physical motion. These devices may monitor, track, and log physical movements. In addition, these devices may track limited physiological functions, such as step count or heart rate. These devices are limited in that they lack the ability to evaluate specific movements for correct performance.

Conventional wearable devices cannot accurately and efficiently perform intelligent and resource-intensive computations. A result of this limitation, these devices cannot deliver real-time feedback about basic aspects of the individual's physical movements, let alone real-time indications of whether the particular movement is performed correctly.

As a result, individuals attempting new, therapeutic, or rehabilitative movements cannot rely on such devices to let them know they need to change their movement. Furthermore, these devices cannot predict physical performance outcomes from that movement, or guide an individual to modify their movement into compliance with a movement that has been designated as therapeutic or rehabilitating. Still further, existing devices are not able to record a movement, such as an exercise or custom (e.g., novel) movement, store or record the movement as a movement signature, and allow a comparative analysis of the movement signature with a subsequently-performed movement.

SUMMARY

Examples described herein include systems and methods for guiding a physical movement of a subject based on a movement model while the subject performs the physical movement. The system can include multiple wearable devices positioned on the subject at different locations. Each wearable device can include a plurality of sensors, including but not limited to a gyroscope, an accelerometer, and a magnetometer. These sensors can generate raw sensor data as they monitor the subject perform a physical movement, which corresponds to a designated movement the subject is attempting.

In some examples, designated movements are included in movement plans provided to subjects by operators or clinicians supervising a respective physical treatment or performance program for the subjects. Thus, the movement plans may be part of a larger recovery, rehabilitation, therapeutic, or performance training program, the success of which is dependent on a subject's ability to comply with movement models for the designated movements included in the subject's movement plan.

In one example, the raw sensor data generated by the sensors of the wearable devices can be filtered with one or more data processing filters (e.g., high pass, low pass, Kalman, Butterworth, etc.) selected based on a condition of the subject and a designated movement corresponding to the physical movement. The selection of a filter may also be based on an understanding (e.g., a mathematical understanding) of biomechanics as applied to a kinetic chain involved with the designated movement. Accordingly, even though each of the motion sensors on each of the wearable devices can monitor motion in three body planes (i.e., frontal, sagittal, and transverse) or can also be referred to as three dimensions in space, certain filters may be selected by a wearable device based on a recognition that a particular designated movement should not have a component of motion in one or more of the body planes that motion sensors generate raw data with respect to.

In one example, filtering can be part of a process by the wearable devices of converting the raw sensor data into formatted data of improved accuracy and reduced volume. In general, the formatted data can be generated using, for example, fast filtering techniques resulting in removal of unwanted data and noise and thresholding techniques to choose values only within certain threshold. This leads to extracting meaningful features from the raw sensor data. In some examples, conversion into formatted data can also include averaging the filtered data output by selected data filters and then collecting values into vectors and matrices to perform one or more advanced matrix operations. The matrix operations performed can be selected based on a designated movement being attempted, a particular physical and/or health condition of the subject, which body segment is performing the physical motion, and the values of the raw sensor data. In some examples, the matrix operations can either precede or can be done after the raw sensor data has undergone filtering and/or thresholding operations.

In another example, formatted data is an output as result of raw sensor data being filtered, and then averaged, or processed using matrix operations, or both. The formatted data can then be used to determine a level of compliance of a subject's physical movement with a movement model for a designated movement the subject is attempting. More specifically, one or more comparative modeling techniques can be applied to the formatted data and the movement model to determine how close (how compliant) the subject's movement is to the movement model. The movement being part of the subject's movement plan to help the subject recover, rehabilitate, or enhance an ability to move in some way.

In one example, the comparative modeling techniques can include one, or a combination of probability-based, supervised machine learning, semi-supervised machine learning, and unsupervised machine learning methods of analysis. Through these techniques, the wearable devices can identify what movement is being performed and how it compares to a movement model. In one example, comparative modeling techniques implemented may be selected by the wearable devices according to a condition of a subject, a designated movement the subject is attempting, and values of raw sensor. With respect to the latter, raw sensor data can be used by a wearable device to recognize when a subject's movement significantly deviates from a movement model, and secondary machine learning and probability-based techniques can be utilized by the wearable devices to recognize the subject's movement and how it relates to the movement model.

Incorporation of the comparative modeling techniques enable one or more wearable devices being worn by a subject to identify key predetermined features and signatures that may/should be present in a physical movement as it is performed by a subject, and rapidly classify that physical movement. The accurate, efficient, and rapid manner in which the wearable devices identify a movement being performed, and compare its profile to how it should be performed (i.e., according to a movement model), enables each wearable device to deliver real-time feedback to a subject. In addition, because it is real-time information, the real-time feedback delivered can accurately indicate that a subject's physical movement is not compliant with a movement model, and effectively guide the subject on how to correct their movement. More specifically, the wearable devices are configured to deliver customized feedback during non-compliant portions of the physical movement, until a correction by the subject brings the physical movement into compliance.

In some examples, at least two wearable devices may be positioned on a subject performing a physical movement. Each wearable device can deliver a specific respective form of feedback (e.g., flashing lights, a flashing screen, sequenced pulses of vibration, sounds, spoken words, etc.). In one example, the form of feedback for each device may be based on a proximity of that device's position on a subject, relative to a portion of a limb or limb segment that is not moving in compliance with a movement model. The wearable devices can also be paired with any other electronic medium like a cell phone, tablet, personal computer, and a bluetooth headset or earphone in order to give real-time feedback and/or track exercises being performed.

The examples summarized above can each be incorporated into a non-transitory, computer-readable medium having instructions that, when executed by a processor associated with a computing device, causes the processor to perform the stages described. Additionally, the example methods summarized above can each be implemented in a system including, for example, a memory storage and a computing device having a processor that executes instructions to carry out the stages described.

In one aspect, a method for generating or modifying movement signatures may include receiving a request to generate a movement signature, receiving first sensor data from one or more sensors of a first wearable device associated with a first user, the first sensor data being generated with one or more of an accelerometer, a gyroscope, or a magnetometer of the wearable device, and associating the first sensor data with the movement signature and storing the sensor data. The method may also include receiving second sensor data from one or more sensors of a second wearable device associated with a second user, the second sensor data being generated with one or more of an accelerometer, a gyroscope, or a magnetometer of the second wearable device, analyzing the second sensor data in comparison to the first sensor data, and based on the analysis: generating a notification, or modifying the movement signature.

In another aspect, a system for processing movement signatures may include a memory storing instructions and one or more processors. The one or more processors, when executing the instructions, may perform operations including receiving a request to generate a movement signature, receiving first sensor data from one or more sensors of a first wearable device associated with a first user, the first sensor data being generated with one or more of an accelerometer, a gyroscope, or a magnetometer of the wearable device, and associating the first sensor data with the movement signature and storing the sensor data. The operations may also include receiving second sensor data from one or more sensors of a second wearable device associated with a second user, the second sensor data being generated with one or more of an accelerometer, a gyroscope, or a magnetometer of the second wearable device, analyzing the second sensor data in comparison to the first sensor data, and based on the analysis: generating a notification, or modifying the movement signature.

Both the foregoing general description and the following detailed description are exemplary and explanatory only and are not restrictive of the examples, as claimed.

BRIEF DESCRIPTION OF THE DRAWINGS

FIG. 1A-i illustrates an exemplary implementation of a system for guiding a physical movement with front and overhead views of a first subject with wearable devices and a movement model shown in dotted lines for the first subject at a first time during the physical movement.

FIG. 1A-ii illustrates close-ups of the wearable devices of FIG. 1A-i delivering real-time model compliance feedback to the first subject at the first time.

FIG. 1A-iii illustrates front and overhead views of the movement model at the first time, juxtaposed to a second subject performing the same physical movement as the first subject.

FIGS. 1B-1-1Biii respectively illustrate the first subject and the movement model, the wearable devices, and the second subject and the movement model at a second time.

FIGS. 1C-1-1Ciii respectively illustrate the first subject and the movement model, the wearable devices, and the second subject and the movement model at a third time.

DESCRIPTION OF THE EXAMPLES

Figure 2:
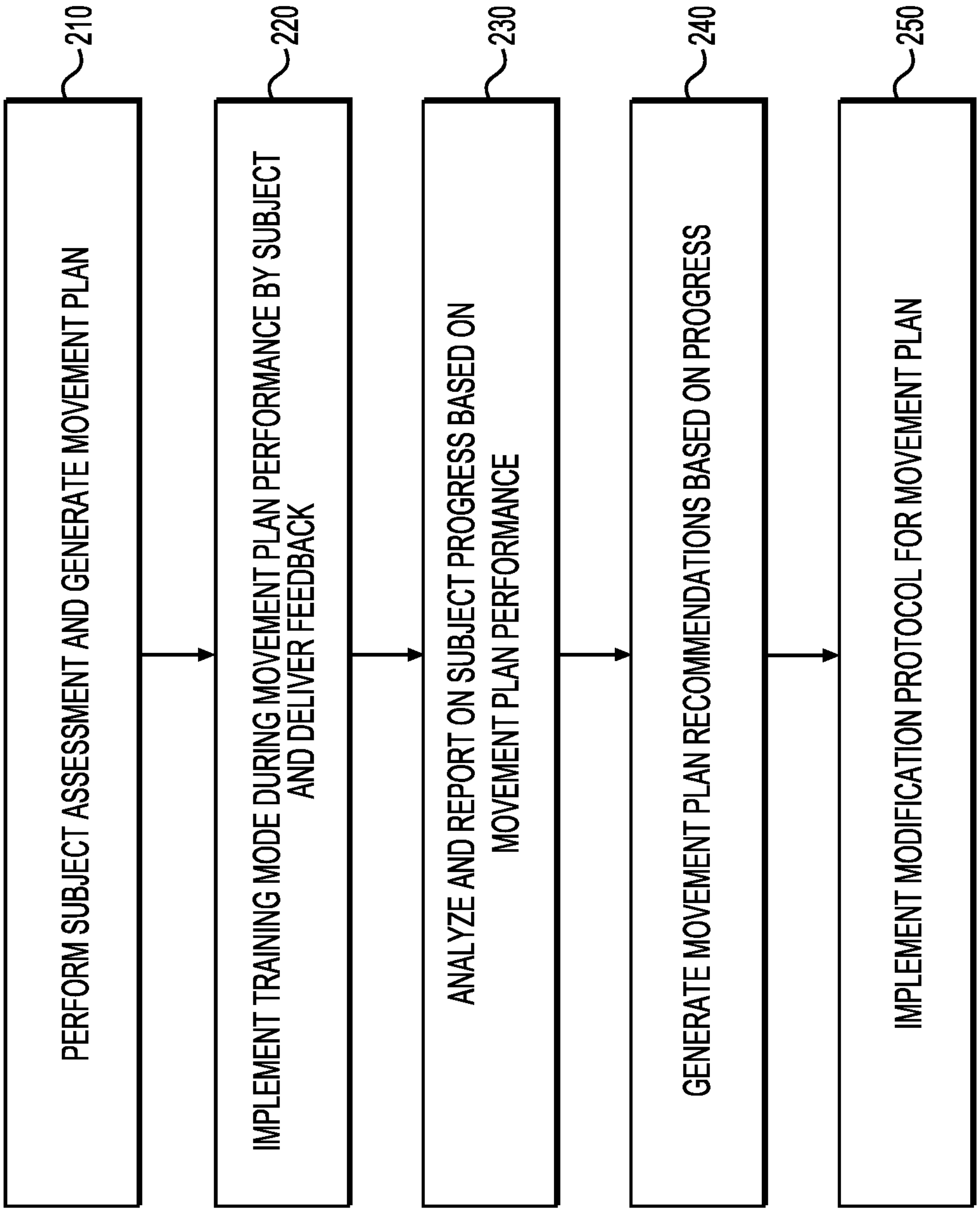
FIG. 2 is a flowchart of an exemplary method for determining a subject-specific movement model and guiding a physical movement of the subject based on the movement model using real-time model compliance feedback.

Reference will now be made in detail to the present examples, including examples illustrated in the accompanying drawings. Wherever possible, the same reference numbers will be used throughout the drawings to refer to the same or like parts.

However, reference numerals and terminology used herein are for the purpose of describing particular aspects only and are not intended to be limiting. For example, as used herein, the singular forms "a," "an" and "the" are intended to include the plural forms as well, unless the context clearly indicates otherwise. As another example, recitation of ranges of values herein are merely intended to serve as a shorthand method of referring individually to each separate value falling within the range. Unless otherwise indicated herein, and each separate value is incorporated into the specification as if it were individually recited herein.

Furthermore, it is noted that any one or more aspects or features described with respect to one example, may be incorporated in different examples described herein, although not specifically referred to or otherwise described relative thereto. That is, all examples and/or features of any aspect described herein can be combined in any way and/or combination. Thus, all methods described herein can be performed in any suitable order unless otherwise indicated herein or otherwise clearly contradicted by context.

Section I. Generation and Use of Movement Models

FIG. 1A-i illustrates an exemplary implementation of a system for guiding a physical movement. Front and overhead views illustrate a first subject 100 that is wearing exemplary first and second wearable devices 120, 130 according to the present disclosure. The first wearable device 120 is positioned on a first location 104 of an arm 102 of the first subject 100 near the subject's wrist. The second wearable device 130 is positioned on the arm 102 at second location 106 near a shoulder 107. It will be noted that the particular locations on a subject's body may be specific to a movement designated for the subject, and the contours of the subject's body. Accordingly, the first and second locations 104, 106 are examples for positioning a wearable device according to the present disclosure on a subject.

In FIG. 1A-i, the first subject 100 is in the process of making a physical movement with the arm 102. More specifically, the first subject 100 is attempting to perform an arm raise according to a designated movement for which that the first and second wearable devices 120, 130 have been calibrated. A movement model 140 for the designated movement is illustrated in dotted lines in FIG. 1A-i in order to illustrate how deviations from the movement model 140 cause certain types of real-time feedback from the first and second wearable devices 120, 130.

As used herein, the term "real-time," "real time," and "substantially real-time" are used to refer to processing performed within strict time constraints. For example, as described herein, real-time tracking, collection, processing, and delivery of raw sensor data, formatted data, comparative analysis data, and feedback: (1) can be performed; (2) as an event triggering that performance occurs; (3) without a perceivable delay after the occurrence of the event.

The calibration of the wearable devices 120, 130 may have been accomplished through an assessment of the subject's normal movement using the systems and methods described herein. In one example, calibration refers to loading a movement model by a processing component of the first and second wearable devices 120, 130. Calibrating may further include configuring the processing component to recognize when one or more sensors of the first and second wearable devices 120, 130 detect a movement, or portion of a movement that does not comply with the movement model 140.

In one example, a calibration of a wearable device can generally include configuring specific types of feedback for each of several wearable devices based on, for example: a degree of deviation from a model; a location of a portion of a limb where a deviation is observed relative to a location of the wearable device on a subject's body; whether a deviation is related to a pace at which a subject is attempting to perform a designated movement; a preference of a subject for auditory, visual, or haptic feedback; where a subject limb is positioned with respect to a range of motion specified for a designated movement (e.g., a beginning of an arm raise with an arm at a subject's side, an end point of an arm raise such that a subject's hand is level with the subject's shoulder 107); a number of times a subject has performed a designated movement; and a number of times that the subject has exhibited the same deviation with respect to the designated movement.

FIG. 1A-ii illustrates close-ups of the first and second wearable devices 120, 130 of FIG. 1A-i. According to an aspect of the present disclosure, "wearable device" includes any form factor designed or intended to be worn by a person (e.g., personal equipment such as helmets, face guards, apparel, or the like; personal devices such as head-mounted electronic devices, wrist mounted devices, body-mounted devices, devices worn around the neck; or any form factor that, while not necessarily designed or intended to be worn by a person, may be adapted to be worn by a person (e.g., smartphones, tablet computers, and/or other digital processing devices).

Each wearable device may constitute a computing device including a processor, a memory storage, and a non-transitory computer-readable medium containing instructions that are executed by the processor. In addition, each of the wearable devices includes a plurality of motion and other types of sensors installed in the device and in communication with the processor. In one example, a wearable device, such as the first and second wearable devices 120, 130 illustrated in FIGS. 1A-i and 1A-ii, may include at least a gyroscope, an accelerometer, and a magnetometer. In another example, a wearable device such as the first and second wearable devices 120, 130, may include a hall sensor, optical encoders, and/or any form of optical sensor for example.

Any wearable device described herein may include a component that authenticates biometric-information ("biometric component"), a pulse oximeter, a blood oxygen sensor, and/or an iris scanner. This biometric component or sub-component may acquire biometric information from a subject and use the acquired biometric information to authenticate and permit the subject to use the wearable device. The biometric component may acquire biometric information through a surface or portion of the wearable device that is particularly close to or in contact with the subject. The biometric information may be defined as information associated with the subject's living body (e.g., pulse, fingerprint, movement profile of a one portion of the subject's body, body temperature, etc.) the face, and the walking pattern. This configuration may biometrically identify and authenticate the subject without requesting an action by the subject.

Further with regards to hardware, both the first and second wearable devices 120, 130, and any other wearable device described herein, can include a screen. In one example, a screen could be provided as a device's interface with, and a vehicle for delivering feedback to, a subject wearing the device. In another example, versions of a wearable device provided with a screen (e.g., a liquid crystal display (LCD) screen, a touch sensitive screen, an organic light emitting diode (OLED) screen, and/or others), as well as versions that do not include a screen, may include LEDs, vibration motors, and/or a means of generating some type of audio feedback.

FIG. 1A-ii is provided to illustrate exemplary types of feedback that can be delivered to the first subject 100 by the first and second wearable devices 120, 130. In one example, a type of feedback can be specific to a device based on its proximity to a portion of a subject's body that may deviate more substantially from a movement model, than any other body portion part of a kinematic chain involved by the designated movement. In another example, a type of feedback can be specific to a device based on its proximity to a portion of a subject's body that, based on a kinematic chain involved, has a more prominent role in an overall deviation from a movement model.

In one example, the first wearable device 120 transfers its raw sensor data to the second wearable device 130 while the subject 100 moves the arm 102. In turn, the second wearable device 130 analyzes the transferred data in tandem with its own gathered data and determines whether to instruct either wearable device to deliver feedback. Either device may be capable of transferring data to or receiving data from the other device, as well as performing the methods described herein for delivering real-time model compliance feedback. Thus, the first wearable device 120 can perform all the same functions as the second wearable device 130. However, distribution of certain processing functions may be placed with one device over the other due to where that device will be positioned, what designated movements are part of a movement plan, and other factors. The first and second wearable devices 120, 130 can communicate with each other using any wireless protocol (e.g., Bluetooth, Bluetooth Low Energy, Zigbee, or a Wifi chip—this option would allow for direct communication with, for example, a cloud).

Each of the first and second wearable devices 120, 130 may communicate directly with other computing devices (e.g., a phone, tablet, laptop, or desktop computer), and/or over a network such as the internet, or in wired or wireless fashion, using one or more components. In one example, one or both of the wearable devices 120, 130 can communicate with an external device, such as a phone, and the external device can simultaneously transmit the raw sensor, formatted, and/or comparative analysis data received or generated, to a cloud or a backend of a system through a network connection.

In yet another example, either of the wearable devices 120, 130 may employ an internal storage and temporarily store raw sensor, formatted, and/or comparative analysis data received or generated data, until at least one of the devices can communicate and transfer data to an external device. It may even be the case that the one of the two or more wearable devices, such as the first wearable device 120, that normally receives data and performs an analysis, can only communicate with the second wearable device 130 but not an external device. Assuming the second wearable device 130 can communicate with both the external device and the first external device 120, data from the first wearable device 120 can be transferred to the second wearable device 130 and then to the external device. Accordingly, a subject located in a park without his or her phone or tablet, can finish a session of designated movements and one of the wearable devices will transfer data to the subject's phone or tablet the next time the subject has that external device with them. Once received by the external device, the data can be sent to a cloud server and/or a backend system for storage and, in some examples, further analysis.

Thus, as described above, each of the wearable devices according to the present disclosure can communicate with each other, store data, and deliver all feedback derived from analyses of data characterizing a subject's attempt to perform designated movements.

FIG. 1A-iii illustrates front and overhead views of the movement model 140 at the first time, juxtaposed on a second subject 150 performing the same physical movement as the first subject 100. Performance of the designated movement (here, an side arm raise) by the second subject 150 illustrated in FIGS. 1A-iii, 1B-iii, and 1C-iii, is considered optimal for the purposes of comparison with the movement model 140, which is specific to the first subject 100. In practice, a movement profile for the second subject 150 performing an arm raise may represent an ultimate goal for the first subject 100. However, as will be appreciated from FIGS. 1A, 1B, and 1C, considered in total, the movement model 140 represents a movement profile that a clinician, doctor, physical therapist, caregiver, or other qualified medical professional (hereafter "clinician" or "operator") has used a system described herein to determine a movement profile that the first subject 100 is capable of achieving. This analysis may be based on the subject's particular condition, past history (if available), and in some cases, the subject's most recent performances of a designated movement.

FIG. 1A-iii is included to provide a visualization of how the movement model 140 may be tailored to the first subject 100 based on the subject's abilities. In addition, and more importantly, FIG. 1A-iii also illustrates how a focus of the movement model 140 accounts for a kinematic chain involved in the designated movement with respect to the first subject 100. Thus, the movement model 140 is not merely representative of an intermediate goal between the movement profiles of the first subject 100 and second subject 150. Rather, it represents the specific movements, positions, and/or points of emphasis or exertion for particular segments in the first subject's kinematic chain (e.g., wrist 103, elbow 105, shoulder 107) that the first subject 100 may need to focus on to incrementally change how that kinematic chain operates.

For example, complying with the movement model 140 at this stage of a movement plan for the first subject 100 may require the first subject to focus on maintaining a shoulder level throughout a range of motion for an arm raise. Subsequently, a new version of the movement model 140 for this designated movement may cause the first subject 100 to bend his elbow less at the first time than the version of the movement model 140 illustrated in FIG. 1A-i. However, it may not be until the first subject 100 maintains a shoulder level until a system according to the present disclosure generates this subsequent version of the movement model 140.

FIGS. 1B-i to 1B-iii respectively illustrate the first subject 100 and the movement model 140, the first and second wearable devices 120, 130, and the second subject 150 and the movement model 140 at a second time. FIGS. 1C-i to 1C-iii respectively illustrate the first subject 100 and the movement model 140, the first and second wearable devices 120, 130, and the second subject 150 and the movement model 140 at a third time. An explanation of the specific differences between the first subject's movement profile and both the movement model 140 and the second subject's movement profile at the first, second, and third times will now be described with reference FIGS. 1A-i to 1C-iii. Any type feedback delivered by a specific wearable device for each time is indicated by text appearing next to the device and will be referenced using the reference numeral of the device and a lower case letter (i.e., a, b, or c) corresponding to the series letter (i.e., A, B, or C) of the figure in which that particular feedback is shown.

Turning back to FIG. 1A-i, the first subject 100 has started moving the arm 102 to perform the designated arm raise. However, the subject's arm 102 deviates from the movement model 140 at each of the three joints, the wrist 103, elbow 105, and shoulder 107, involved in the movement. As a result, each of the first and second wearable devices 120, 130 are delivering specific types of feedback to the first subject as shown in FIG. 1A-ii. The first wearable device 120 located near the first subject's wrist, delivers a first feedback 120*a* in form of a flashing touch screen. On the other hand, a second feedback delivered by second wearable device 130 includes a rapidly repeating pattern of three-pulse vibrations.

FIGS. 1A-i and 1A-ii illustrate an example of a system according to the present disclosure identifying a deviation of the shoulder 107 of the first subject 100 as a more prominent cause of a non-compliant movement. As illustrated in FIG. 1A-i, the wrist 103 may most closely mimic an orientation of a model counterpart than the other two joints, but of the three joints, it is the most spatially displaced from where it should be. The elbow 105 meanwhile, is more extended and lower than the movement model 140. Thus, there is also a significant deviation from the movement model 140 for this joint.

On the hand, while the shoulder 107 is dropped, it is relatively close to a location and orientation of its model counterpart. However, correcting this portion of the kinematic chain may have a great effect on bringing the first subject 100 into overall compliance with the movement model 140. Raising the shoulder 107 may cause the elbow 105 to flex more, move outward relative to a main torso, and be at a respective level closer to the position of the same in the movement model 140. Thus, correcting the shoulder 107 works to correct two joints rather just one. In contrast, done in isolation, either of increasing a flexion in the elbow 105, or raising a level of the wrist 101 using the elbow 105 as a pivot point, only brings that joint more into compliance. Accordingly, the pulsed feedback in the second wearable device 130 is deliberately configured to be more noticeable to signal an importance of that correction to the first subject 100.

Not coincidentally, the position of the shoulder according to the movement model 140 is substantially the same as a position of the shoulder of the second subject 150 representing an optimal movement profile.

Moving on to FIGS. 1Bi-iii, at the second time, the shoulder 107 and elbow 105 are in substantial positional compliance with the movement model 140. However, from the standpoint of a rotational orientation, the elbow 101 is rotated downward causing a significant displacement of the wrist 101 from a position of a model counter part. Now, the first wearable device 120 is delivering a first feedback 120*b* including a repeating pattern of single vibrations. A second feedback 130*b* may include a compliance message displayed on a respective screen, or no feedback. Alternatively, compliance with portion of the movement model 140 could be signaled by one or both wearable devices with continuous auditory, visual, haptic feedback. Basically, one or both wearable devices may emit a sound (e.g., a beeping sound), flash a screen, or vibrate until a subject's movement is compliant with a particular movement model.

At the third time illustrated in FIGS. 1Ci-iii, the first subject 100 has reached an end point of an upward movement portion of the designated arm raise. As shown in FIG. 1C-i, the arm 102 follows the movement model 140. However, either the first or second wearable device 120, 130, instead of being dormant, may be configured to deliver feedback that the first subject 100 recognizes as the end of the arm's upward movement for the designated arm raise. Either or both of the wearable devices 120, 130 may deliver this real-time model compliance feedback. In another example, recognizing which of the two devices is closer to the first subject's ears, the first wearable device 120 may not deliver feedback specifically related to the compliance with the movement model 140. Rather, a rep count, and/or a set count, and/or a remaining rep or set count may be displayed on the screen of the first wearable device 120.

It is noted that each of the first subject 100 and the second subject 150 are illustrated in FIGS. 1A-i to 1C-iii as a human person. However, as used herein, "subject" may include an living entity, human, animal, amphibian, or other species capable of moving and able to wear one or more wearable devices according to the present disclosure.

FIG. 2 is a flowchart of an exemplary method for determining a subject-specific movement model and guiding a physical movement of the subject based on the movement model using real-time model compliance feedback.

At stage 210, an assessment of a subject is performed and a movement model and plan based on the movement model are generated. In practice, a clinician or operator may observe what a subject does visually and through wearable devices in stage 210. In one example, the clinician may decide based on their observations, what limb, limb segment, or joint of the subject they want to be analyzed, and enters this information into a computing device used to manage an assessment process. Stage 210 may also include the subject, who is wearing two or more wearable devices, performing a movement that the clinician has selected to evaluate some aspect of the subject's ability to move.

For example, in a situation where a gait analysis is being done as part of the assessment, the subject may walk back and forth over a period as directed by the clinician. As the subject performs this assessment movement, data is transmitted real-time from one wearable device to another, and in some cases, to the clinician's computing device as well. When the subject stops, a final package of sensed raw, formatted, and or analyzed data may be provided to a management agent on the clinician's device, or to a modeling service. The subject's movement profile may be characterized through a series of graphs displayed on the C-UI. With these graphical representations of the subject's movement, the clinician may be able to visually pinpoint a limb, limb segment, or particular joint that is substantially impacting an operation of the subject's kinematic chain involved in the assessment movement.

At this stage, it becomes easy for the clinician to determine the simplest most effective designated movements to correct or enhance the subject's movement profile. The clinician may then determine or select movement parameters (frequency, sets, reps, range of motion, etc.) based on another review of the graphs and/or the clinician's knowledge of the subject. Finally, the clinician may cause the designated movements and movement parameters to be loaded on to the wearable devices as movement plan.

Stage 220 includes implementing a training mode during performance of designated movements as part of a movement plan provided to the subject and loaded into the wearable devices.

As described in more detail with reference to FIGS. 5 and 6, exemplary implementations of a training mode according to the present disclosure can include sensors incorporated in wearable devices being worn by a subject, detecting the subject's movements while the subject attempts designated movements as part of the subject's movement plan. The systems and method described herein can process the raw sensor data real-time to determine whether the subject's movement profile is in compliance with a movement model. In addition, as the subject performs the movement, wearable devices according to the present disclosure can deliver real-time model compliance feedback to the subject when a level of compliance falls below a specified threshold. Put another way, the wearable device can determine when a deviation from a movement model is greater than a predetermined threshold specific to that portion of the designated movement being attempted by the subject.

In one example, raw sensor data from one or more of an accelerometer, a gyroscope, and a magnetometer installed on each wearable device can be processed in stage 220 by a tracking and notification agent that manages the operations of the one or more wearable devices. Once obtained, the raw sensor data can be continuously filtered, modified, or otherwise prepared for a comparative analysis based on human biomechanics. By delivering the feedback to the user during a movement, the wearable devices indicate to the subject when a movement being performed is being performed correctly, or is being correctly modified by the subject to be compliant with the movement model. In addition, information about the subject's movement profile and the subject's responses to certain feedback may be: stored and analyzed; used to intelligently change feedback delivered to a subject; and used recommend modifications to movement parameters and/or different designated movements.

At stage 230, a subject's progress in performing a movement plan may be analyzed. In one example, the analysis includes determining a subject's overall compliance for each designated movement and in a movement plan. As described in more detail with reference to FIGS. 7A-10, in stage 230, a backend or a backend supported management agent, can analyze data obtained from wearable devices described herein, and determine a subject's progress relative to a designated movement plan. The subject's progress can be presented in one or more user interfaces that are accessible by the subject or a clinician.

In stage 240, a system according to the present disclosure may incorporate or otherwise utilize a recommendation service to analyze a subject's progress for a specific designated movement, a movement plan, and/or expected improvement in mobility or physical capabilities.

Stage 250 includes implementing a plan modification protocol that may be initiated by an operator meeting with, or at remote location relative to a subject. In one example, a clinician or operator can be alerted to a recommendation for a new or modified movement as part of a subject's movement plan via a personal computing device such as a phone, tablet, or laptop. In the absence of a recommendation from stage 240, the operator may review a report on the subject's performance of their specific plan. The plan, updates, and/or alerts may be provided through the C-UI presented on the clinician's personal or managed device as part of a dedicated application, a web application, or some type of API provided or otherwise maintained over a network by a system component, such as a backend server, according to the present disclosure.

The operator may send a message to the subject through the C-UI and transmitted to the subject's communication device through a network. The message may include a new movement, a modified movement (e.g., change in range of motion), or a new plan for a frequency (e.g., times per weeks), number of sets, and/or number of repetitions per set the subject should attempt for a given designated movement. The message may be presented to the subject through a UI presented on the subject's communication device as part of a dedicated application, a web application, or an API provided or otherwise maintained over the network by the system component, such as a backend server, according to the present disclosure.

Figure 3:
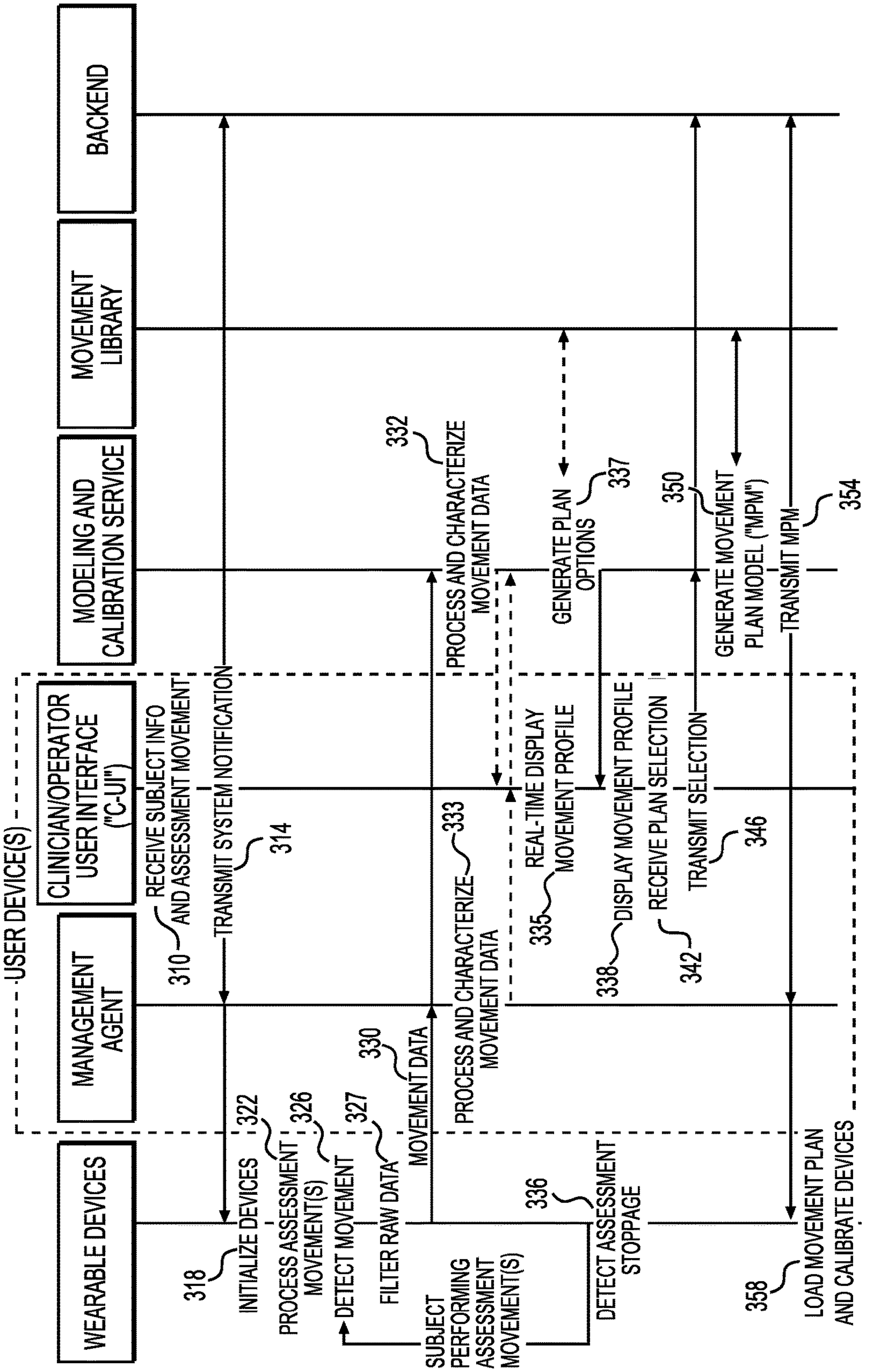
FIG. 3 is a sequence diagram of an example method for assessing a subject and determining a movement model specific to the subject.

FIG. 3 is a sequence diagram of an example method for assessing a subject and determining a movement model specific to the subject.

At stage 310, information about a subject can be received through a C-UI presented on a user device operated by a clinician or an operator. The subject information can include details about a condition, injury, medical procedure, or performance goal for the subject. In addition, the subject's physical measurements (e.g., height, weight, torso length, inseam, knee diameter, elbow diameter, degree of curvature of a back, hip alignment, leg(s) length, arm(s) length, etc.) can also be provided at stage 310. Any severe conditions or characteristics of the subject can also be included in the subject information, such as whether the patient suffers from Alzheimer's, Parkinson, Fibromyalgia, arthritis (and where located), or has any challenges in hearing or seeing, or is insensitive to physical contact.

An assessment movement, or a series of assessment movements may also be received in stage 310. For example, where a clinician determines that an effective movement plan must address the subject's gait (i.e., a manner in which the subject walks or more generally moves on foot), the assessment movement may include the subject walk at one pace, or a varied pace, or run, or even sprint. The assessment movement(s) may be selected from the C-UI, which can display a dashboard such as an exemplary dashboard illustrated in FIGS. 4A, 4B, 4C, and 8C. The dashboard may provide the clinician with options for selecting a type of analysis, and one or more options for selecting assessment movements, the performance of which serves as the basis for a type of analysis selected.

For example, a functional assessment of a subject's rotator cuff may be carried out by tracking the subject's movement profile as he or she raises their arm in front of their chest to a level of the subject's shoulder. The same process may be involved for tracking a subject while they raising the same arm to the shoulder level with an upward movement away from a respective side of the subject's body. Similarly, 90° knee bends, squats, step ups, jump upward from a static position, and other movements may be used in a functional assessment of the subject's knees and or ankles.

Stage 314 includes a management agent installed on the user device issuing a system notification to one or more wearable devices, as well as a backend of the system. The system notification can include information about the subject, the assessment movement(s), the clinician or operator, and settings for operating the wearable devices including, for example, what types of feedback the devices are to deliver to the subject during the assessment. For example, feedback in the form of audio, light, or touch-based signals may be specified to que a subject to start and stop a given assessment movement. In one example, the system notification may be specific to the wearable device it is being transmitted to.

More generally, the system notification conveys information that informs the wearable devices on what to expect with a next series of assessment movements it will detect. This notification may include information processed by the wearable devices regarding one or more of the following: what assessment movements will be attempted; what movement parameters to measure with respect to those assessment movements; a subject that will attempt the movements; a condition of the subject; how movement data that measures movement parameters of the assessment movements is to be reported to, for example, a user device or a backend; and any feedback the devices may need to generate in order to indicate, for example, the assessment is complete, the subject's movement is beyond a relevant range for evaluation, etc.

According to an aspect of the present disclosure, the management agent can be a backend server implemented agent, and/or an API, a Software Development Kit ("SDK"), or an application wrapper. The management agent can include privileges within other applications that operate on the user device as the C-UI is implemented.

In one example, the backend is a server, computing device, or a network of multiple servers or computing devices, having one or more processors and memory stores.

Stage 314 also may include transmitting a system notification to the backend for both storage and so that the backend knows to look for assessment data and training information soon. In one example, the backend may manage or otherwise control a database of subject information, and may add the assessment movements to the subject's history.

At stage 318 the wearable devices implement an initialization process based on the system notification transmitted in stage 314. The initialization process can include one or all of the wearable devices that will be used for the assessment, booting, rebooting, waking from a sleep state, and/or begin to operate its various sensors to at least determine that the device has been positioned on a subject. In another example, the system information may include locations on a subject's body where the wearable devices are to be attached, applied, or otherwise mounted on the subject's body.

As discussed above, a wearable device according to the present disclosure may include any device or form factor intended for use while being worn on a body of a subject. In addition, this wearable device may include a component that authenticates biometric-information ("bio-metric component"). In one example, carrying out the initialization at stage 318 can be contingent on the wearable devices being put on a subject specified in the system notification. Each wearable device may execute an authentication process, or just one device that is set up to allow other devices to operate once that one device authenticates the subject now wearing it and the other devices. The examples discussed herein of wearable devices including one or more biometric components can be used, as previously mentioned, to biometrically identify and authenticate a subject, and then permit initialization to move forward, without any additional actions on the part of the subject.

Stage 322 includes the wearable devices processing the assessment movement(s) and implementing a device configuration required to track one or more assessment movements specified in the system notification. This can include configuring the sensors and various subcomponents to collect data in accordance with instructions included in the system notification. In one example, this can include a wearable device recognizing the specific data required to accurately represent a subject's actual movement (speed, position, momentum, number of dimensions to detect within) for a given assessment movement. For example, each wearable device may include several movement sensors such as a gyroscope, accelerometer, and a magnetometer, for example. One or all of these sensors may detect a subject's motion in three dimensions. However, each of these sensors may be not register pertinent data for certain movements. Accordingly, during initialization, a tracking agent (See FIG. 6) implemented on at least one of the wearable devices, may configure an operational sequence that excludes using certain sensors for certain assessment movements. In doing so, the tracking agent can reduce overall power and computing loads on the computing resources within the wearable device during the assessment, and increase the devices operational efficiency.

At stage 326 the wearable devices detect a subject's movement using the configuration and settings for its internal movement sensors initialized in stage 318.

In one example of the method of FIG. 3, an optional filtering operation can be performed at stage 327 by the wearable devices. Each wearable device can analyze a subject's movement, and analyze whether or not data is relevant to an analysis being performed for an assessment. In one example, stage 327 can include the wearable device filtering out high or low values, data representing a measurement in a dimension not required, and other types of data. In another example, the stage 327 can involve removing noise from the raw sensor data registered in the wearable devices.

At stage 330, the subject's movement data can be transmitted to the management agent on the user device which may in turn, transmit the same to a modeling and calibration service.

At stage 332, the movement data is processed and characterized in graphical form by the modeling and calibration service, in one example. In another example, the management agent may process the movement data. A calibration is generated based on a spatial/frame of reference indicative of how a subject moves. As generated, the wearable devices use the calibration information to establish how to measure a patient motion with the device's internal sensors, when to generate feedback, and what feedback to generate. Characterized another way, the wearable devices tune respective internal sensors (e.g., set a sensitivity, sampling rate, storage time, error, feedback triggers etc.) based on the calibration provided by the modeling and calibration service. These sensor settings, how they are calibrated, consider a condition of a subject that will be using the wearable devices.

Thus, the wearable devices detect movements and generate sensor data with respective internal sensors with a subject's condition as an influence. Along these lines, the modeling and calibration service may utilize predictive charts to generate a calibration for a wearable device's sensors. For example, such a chart may reflect the fact that a subject has an arthritic elbow or Parkinson's for a prediction of that subject's progress with respect to a designated movement, plan, or their condition.

In one example, the method can include the management agent processing the movement data in stage 333 by performing the same operation performed by the modeling service in stage 332. In another example, stage 333 could include the management agent directing the modeling service, being installed on the user device, to perform the data processing and characterization as described with respect to stage 332. In yet another example, the management agent can perform these functions and transmit the resulting data in stage 333 to a server on which the modeling service is implemented (e.g., the backend server, dedicated modeling and calibration server, etc.). In turn, the modeling service can verify the results generated by the management agent real-time, and send an authorization to the C-UI to display a movement profile based on the processed movement data received from the management agent.

In another example, as the subject performs the assessment movements, the wearable devices continuously detect the subject's movements in stage 326 and transmit movement data in stage 330 as indicated by the loop illustrated under the wearable devices in FIG. 3. As the wearable devices transmit the movement data, either of the modeling service at stage 332, or the management agent at optional stage 333 as discussed above, can transmit the processed movement data to the C-UI. The C-UI can optionally real-time display and update the subject's movement profile temporally (1) as the subject continues to perform the assessment movement(s), and (2) before the wearable devices detect an assessment stoppage by the subject at stage 336.

The spacing and numbering of stage 332 and stage 333 in FIG. 3, convey are intended to convey a temporal relationship between these stages and the start and end of each loop iteration. Like stage 332 or stage 333, the C-UI receives the processed data generated in either of these stages and display subject's movement profile real-time in optional stage 335, after the start and before the end of one loop iteration. Thus, as the subject performs the assessment movement(s), and before the stoppage is detected in stage 336, a clinician or an operator can view a graphical representation that: pertains to individual body segments involved in a designated movement(s); is displayed and updated real-time with respect to actual movement performance. More specifically, real-time generated data that measures select characteristics (e.g., range of motion, amplitude of movement, deflection, flexion, supination, angular displacement, stride length, linear displacement, etc.) of a subject's movement of select body segments, can be received and real-time charted into a format the allows a clinician or operator to analyze the movement of those segments on an empirical basis. This contrasts with only being able to perceive the mechanics of a subject's movement visually, the presentation of which could be obscured by the subject's clothing, or skewed by the subject's positional orientation relative to the clinician or operator viewing the subject.

As a result of the real-time continuously self-updating display of graphical representations of a subject's movement profile presented in stage 335, the clinician can view, analyze, and request a subject alter some aspect of how they perform an assessment movement as performance occurs. In turn, the clinician or operator can gain valuable information as to what potential changes in the subject's movement are needed, and what may need to be included in a subject's movement plan for the subject to ultimately be able advantageously change their movement.

In one example of the method illustrated in FIG. 3, the modeling and calibration service can generate options for a movement plan to be built for the subject in stage 337. The options may include particular movements to designate, and movement parameters such as frequency, number of sets per session, number of repetitions per set, and/or a range of motion for a particular designated movement.

At stage 338, a movement profile for the subject may be displayed by the C-UI. The movement profile may be represented by a series of graphs that chart a position, angle, stress, strain, or other measurable physical or physiological metric as a function of time during the assessment, as detected by the wearable devices. In another example, a graphical three dimensional representation of a limb or limb segment of the subject in one or more body planes may be displayed.

In stage 342, a selection for a movement plan is received from the operator or clinician. This selection, which constitutes at least one, but is likely a set of designated movements, represents movements that have been designated for the subject, by the clinician, to effect a change or enhancement of a way in which the subject moves some portion of their body.

At stage 346, the plan selection is transmitted to the modeling and calibration service, as well as the backend.

At stage 350 the modeling and calibration service, using a movement library, generates a plan movement model ("PMM") for the subject. In one example, the movement library can be provided by a repository of designated movements. The repository of designated movements may be incorporated in a backend server, or accessible by the backend server or backend server supported agents and services, through a network, such as the internet. As mentioned above with reference to FIGS. 1A-1-1C-iii. A movement model reflects the movement profile for a designated movement that is specific to a subject's capabilities and needs for improvement. Thus, the PMM will not always reflect a fully optimized movement pattern for the designated movement, but rather, what aspects of that movement the subject should be doing at a given time as part of a progression to achieve the optimized movement. This can result in more pinpoint and simpler instructions for a subject to follow, implement, and be successful implementing.

Stage 354 includes the modeling and calibration service transmitting the PMM to the wearable devices. This causes the wearable devices to use the PMM to calibrate themselves in stage 358. In particular, the wearable device configures how its internal sensor is to gather data, when feedback will be delivered, what feedback will be delivered, and other operational settings required for training sessions for the particular subject that will be using the wearable devices.

Calibration at stage 358 can also include applying different weights and weighting criteria to the data generated by each of the sensors installed in the wearable devices. More specifically, in one example of a wearable device including an accelerometer, a gyroscope, and magnetometer, the actual devices sense data values that a manufacturer of each device specifies. However, the data from these sensors can be, and often are, weighted differently relative to each other by the tracking agent. The tracking agent relates the data from each to a movement model differently pursuant to the calibration information provided by the modeling and calibration service.

How the calibration and modeling service assigns different weights to the data generated from the different sensor is also based on a consideration of what measurement is beneficial for the particular subject, given that subject's condition. For example, a first subject may have an issue with their knee, while a second subject may have an elbow issue. Thus, the modeling and calibration service may assign, and the wearable device can recognize with more weight, data from an accelerometer for the first subject as opposed to data from gyroscope. On the other hand, the reverse may be true for the calibration associated with the second subject.

Figure 4A:
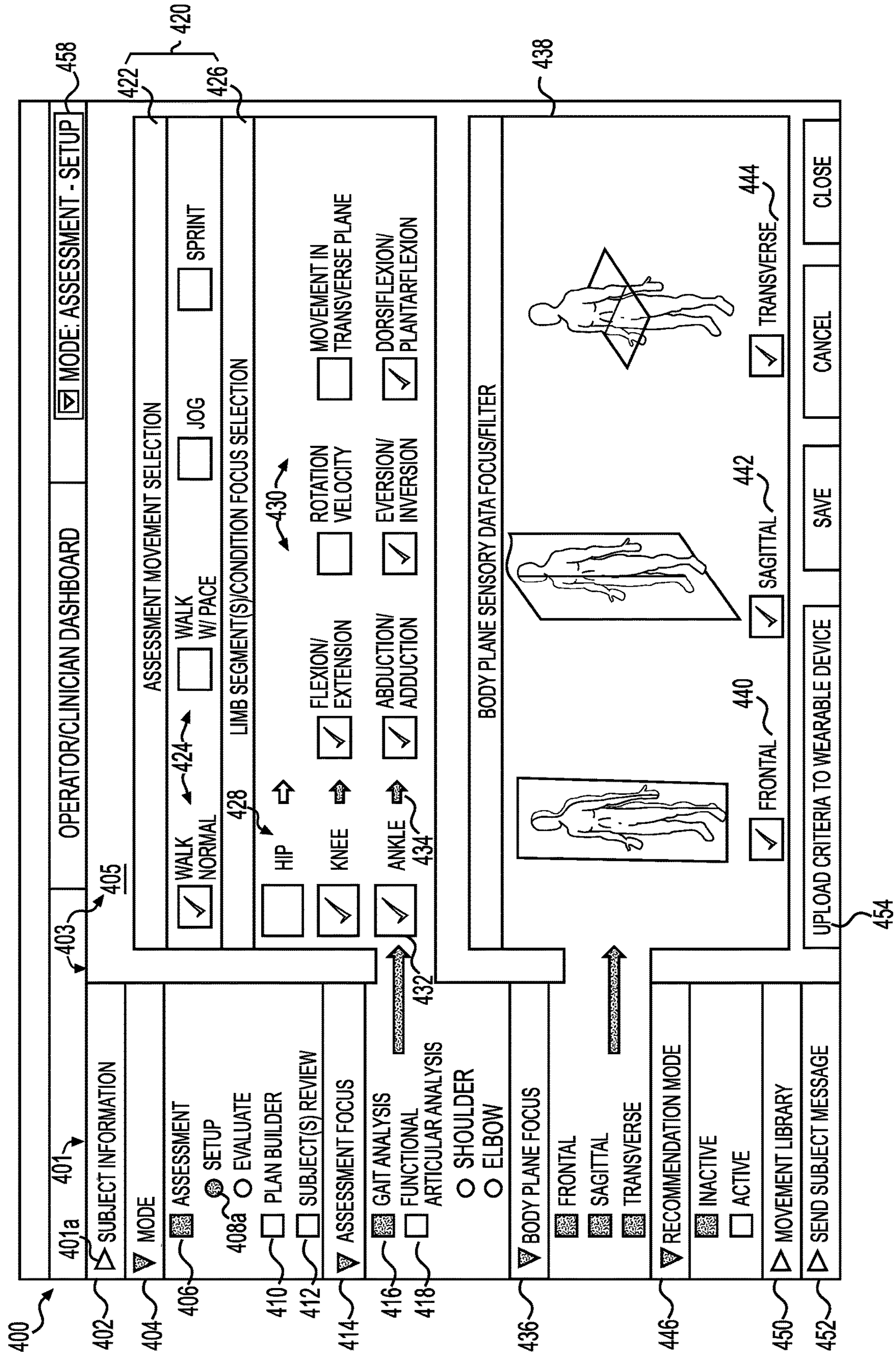
FIG. 4A illustrates an exemplary console for setting up a specific movement assessment for a subject, the console being part of an exemplary dashboard user interface ("UI").

FIG. 4A illustrates an exemplary console for setting up a specific movement assessment for a subject, the console being part of an exemplary dashboard user interface 400 ("dashboard 400"). In one example, the dashboard 400 can provide a UI for a clinician, as in the C-UI illustrated and described with reference to the method of FIG. 3. As shown in FIG. 4A, the dashboard 400 can include a navigation menu 401 and a console window 403. The navigation menu 401 includes a plurality of sub-menus.

In the example illustrated in FIG. 4A, mode, assessment focus, body plane focus, recommendation mode, movement library, and messaging sub-menus 404, 406, 414, 436, 446, 450, 452 are shown respectively. Each sub-menu may be displayed with the selection of a respective expand option 401*a* provided next to a title of that sub-menu. When expanded, a given sub-menu can display various primary, secondary, and even tertiary selection options. Selection of certain options, or combinations of options, can cause the dashboard 400 to: change a respective mode; expand other sub-menus; display different sub-menus; expand primary selection options to reveal secondary and tertiary selection options in a hierarchical manner; and/or display different consoles in the console window 403 and/or sub-menus in the navigation menu 401.

The subject information sub-menu 402, when expanded, can display selection options (e.g., checkboxes, radio buttons) that if selected, will bring up information about a subject in the console window 403. Subject information can include a condition of the subject, past conditions, any goals the subject has for a movement plan, and/or an identification number or other identifier. In another example, other types of subject information that could be selected within the subject information sub-menu 402 can include the subject's height, weight, blood pressure, most recent A1 C (average blood sugar level), and other vital statistics that can help a clinician or operator better understand the subject's condition.

In the exemplary case of FIG. 4A, an option for an assessment mode 406 (a primary option) is selected within the mode sub-menu 404, and an option for a setup sub-mode 408*a* is also selected from the secondary options associated with the assessment mode 406. In one example, selection of the setup sub-mode 408*a* can cause the assessment and body plane sub-menus 414, 436, which relate to setting up an assessment, to automatically be selected and expanded. In addition, this can also cause an assessment setup console 405 ("ASC 405") to be displayed in the console window 403.

Primary selection options for the assessment focus sub-menu 414 can include particular tests or sets of tests that may commonly be used to diagnosis a subject's physical condition. A clinician having observed some movement of a subject, may select one of these tests in order to determine an optimal movement plan to remedy the condition or assist the subject in achieving some type of performance goal. Selection of an option from options at a lowest hierarchical level for a primary option associated with the option selected, can cause the dashboard 400 to display a test movement module 420 that includes assessment movements and limb segment(s)/condition focused sub-modules 422, 426 ("movement sub-module 422" and "limb focus sub-module 426").

With the movement sub-module 422, a clinician can select from a catalog of movements used to assess a subject's particular movement profile against standards that may be to optimal, acceptable, and/or health enhancing. Turning to limb focus sub-module, the clinician can select which body portions 428 of a subject's body are to be tracked, and movement parameters 430 to be tracked in relation to the selected body portions. This information, once processed by a wearable device, is used to tune its respective sensors to focus on specific motions and portions of a subject's body. In turn, the sensors can generate raw sensor data that tracks those portions of the body for the movement parameters selected in the limb focus submodule 430.

The sensors can also be instructed to detect the subject's movement in select frames of reference (dimensions) using the body plane focus sub-menu 436. When this submenu is expanded, a body plane module can also be displayed in the ASC 405. The body plane module 438 includes plane selection options 440, 442, 444 that a clinician can select so that the sensors measure the subject movement in an x-y plane (frontal body plane), a y-z plane (sagittal body plane), and/or an x-z plane (transverse body plane).

In yet another example, selection options with the subject information sub-menu 402 can be used to see if the subject may have a terminal illness such as fibromyalgia, severe arthritis, and/or progress disorders Parkinson's or Alzheimer's disease. In another example the clinician may be able to check to see if the subject has any implants such as rods, plates, or screws, and/or other physical conditions. For example, a subject who getting an assessment for a shoulder issue, may have a degenerative hip or spinal discs, and this can be the information that is accessible through the subject information sub-menu. These conditions may be in addition to a condition providing the reason for the subject to perform an assessment. However, these types of comorbid conditions can impact the subject's ability to do certain designated movements and should be considered for a treating the condition the subject may be getting an assessment to address.

These types of information can also be considered when the clinician selects designated movements for that subject's movement plan. In addition to the clinician, a recommendation service can take this information as input and weigh it relative to previously recorded movements to generate recommendations for a new movement plan, or a modification to an existing plan.

When a clinician has completed setting up the assessment, the setup information can be transmitted to one or more wearable devices with the selection of an upload criteria option 454. According to another aspect of the present disclosure, the dashboard 400 can include a mode display and switching option 458 ("MDS option 458") that includes a drop-down box that can be used to quickly switch from a subject's record for an assessment setup, evaluation, movement plan, and progress results. More specifically, a clinician or operator can quickly switch between other modes of the dashboard 400 illustrated in FIGS. 4B, 4C, and 8C.

Figure 4B:
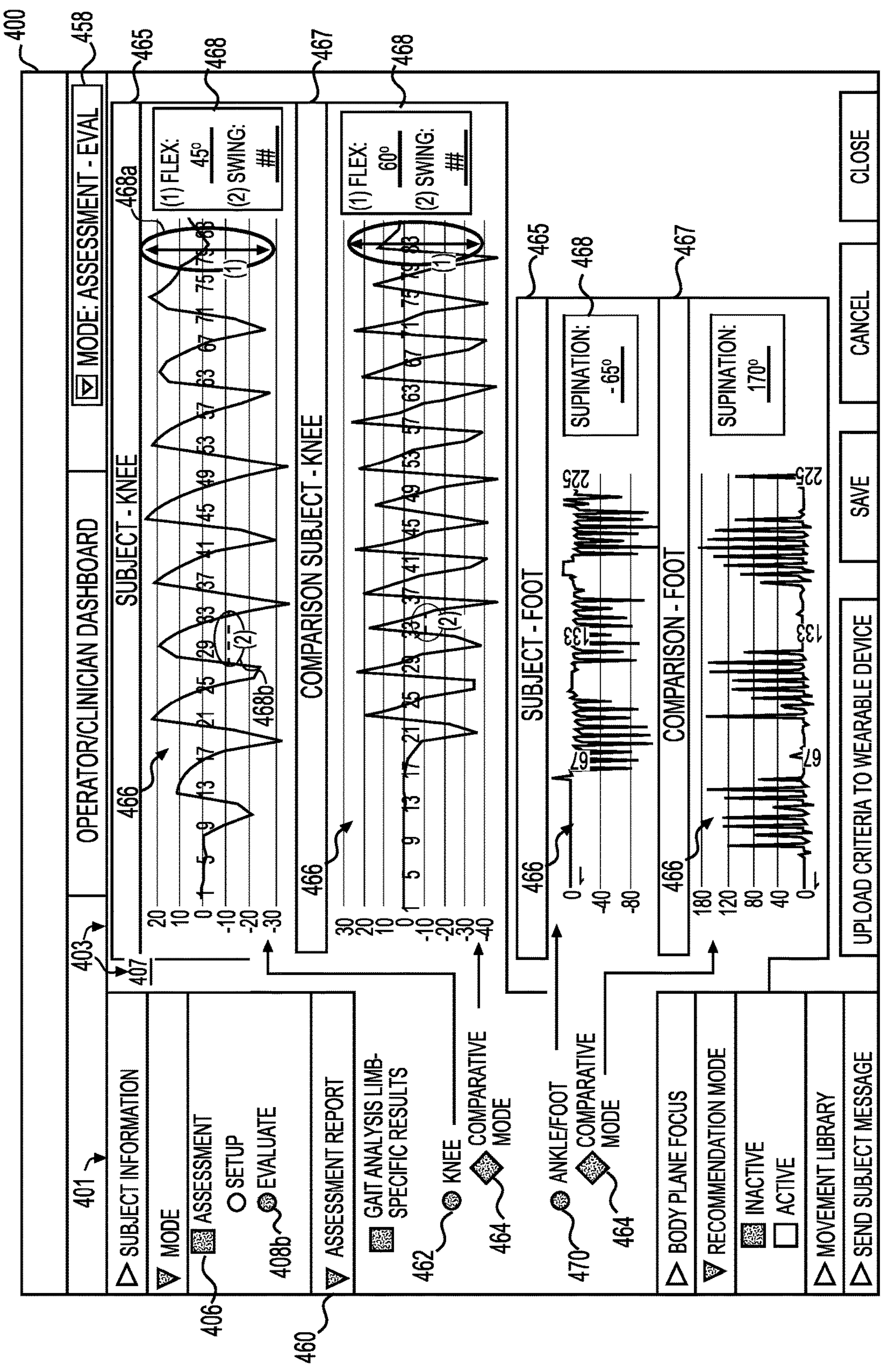
FIG. 4B illustrates an exemplary dashboard console for reviewing results derived from data gathered by exemplary wearable devices during a movement assessment for a subject.

FIG. 4B illustrates an exemplary console of the dashboard 400 for reviewing results derived from data gathered by the wearable devices during a movement assessment. As shown, an option for an assessment mode 406 (a primary option) is selected within the mode sub-menu 404, and an option for an evaluation sub-mode 408*b* is also selected from the secondary options associated with the assessment mode 406. Selection of the assessment submode 408*a* can cause an assessment report sub-menu 460 to automatically be selected and expanded as shown in FIG. 4B. In addition, this can also cause an assessment evaluation console 407 ("AEC 407") to display in the console window 403.

Primary selection options for the assessment report sub-menu 460 can include options to view movement data for specific parts of a subject's body that were tracked during a movement assessment completed by the subject (wearing the wearable devices). For example, selection of an option for a knee report 462 and/or an option for an ankle/foot 470 can cause a respective subject results module 465 to be displayed. Each subject results module 465 can include a results graph 466 that charts a measurable aspect of an ankle/foot or a knee's movement during performance of the assessment movement, as function of time. Values for one or more metrics that may correspond to, or be derived from, that measurable aspect, can be determined and included in a result summary section 468 for each subject results module 465.

In FIG. 4B, a first metric 468*a* for the knee is an absolute range of flexion, and a second metric 468*b* is a swing of the knee. A metric for the ankle/foot includes supination. In one example, the values corresponding to these metrics and displayed in the results summary section 468, can represent an average, mean, median value, or another operation. Results for these metrics can be helpful to an operator or clinician in understanding a condition of a subject. However, more effective than knowing a magnitude of the values for these metrics, is knowing how those values compare to values for the same metrics for a movement profile considered to be good or bad according to recognized standards of analyzing a type of subject (e.g., human vs. animal, injured vs. athlete, terminal illness vs. no illness).

In recognition of the insights that can come from comparisons discussed immediately above, the dashboard 400 can be configured to provide selectable options for a comparative mode 464. As shown, selection of the comparative mode 464 for a knee 462 and/or for an ankle/foot 470 can result in a respective comparison results module 467 being displayed. Each comparison results module 467 can include a respective results graph 466 that charts the same measurable aspect as in a corresponding subject results module 465. Values for one or more metrics that may correspond to, or be derived from, that measurable aspect, can be determined and included in a result summary section 468 for each subject results module 465.

As will be understood from the above discussion for stage 335, the results modules 465, including results graphs 466, first and second metrics 468*a*, 468*b*, and result summary section 468, can be generated real-time as assessment movements are performed by a subject. The exemplary display of graphical and numeric data illustrated in FIG. 4B, can be continuously updated. That is, as the wearable devices continue to detect movement and transmit movement data, and a management agent or a modeling service processes and characterizes the movement data, the graph 466 and first and second metrics 468*a*, 468*b* can be updated and displayed real-time in the AEC 407 of the console window 403 accordingly.

Figure 4C:
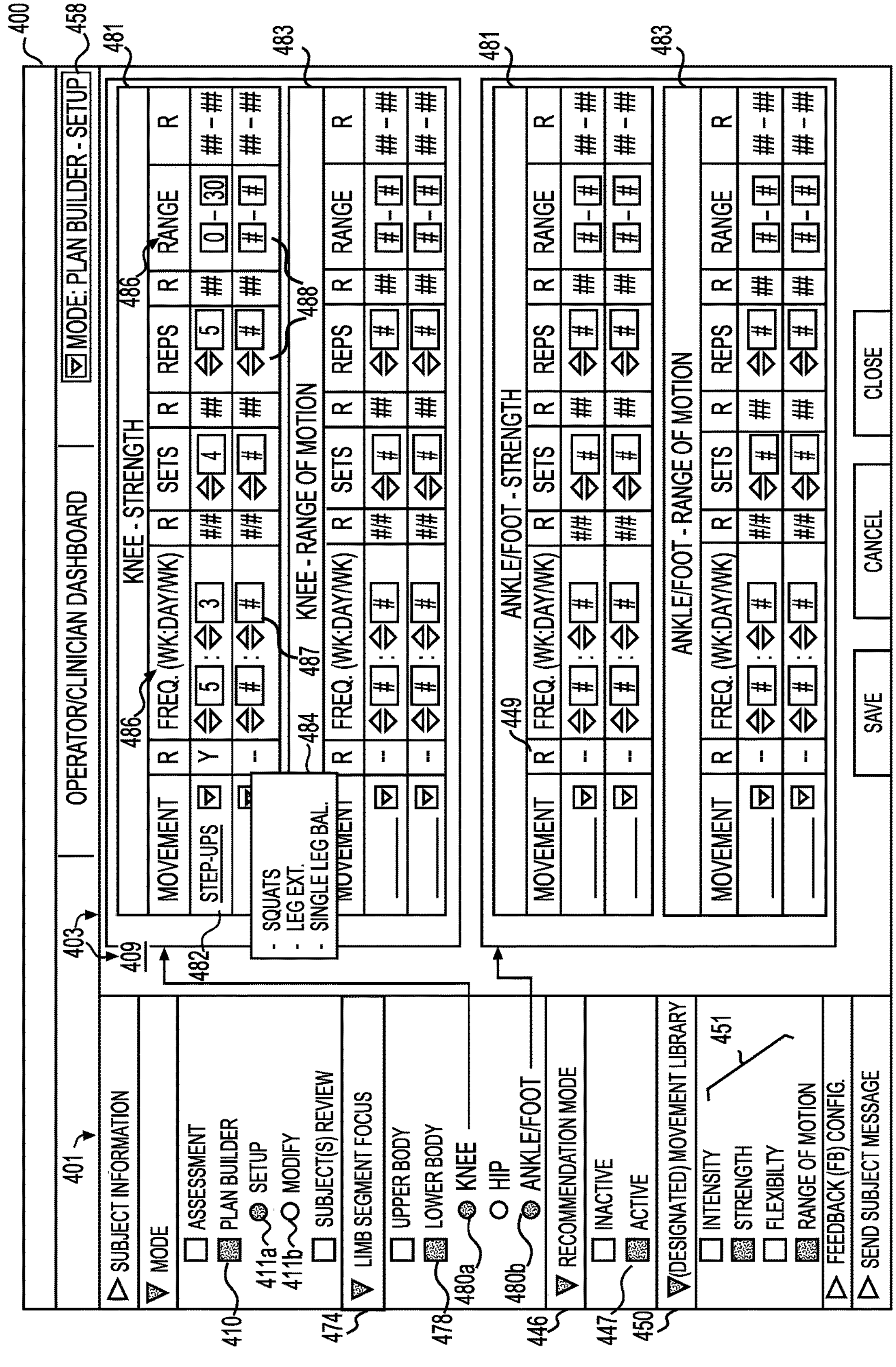
FIG. 4C illustrates an exemplary dashboard console for building a movement plan for a subject.

FIG. 4C illustrates an exemplary console of the dashboard 400 for building a movement plan for a subject. As shown, an option for a plan builder mode 410 (a primary option) is selected within the mode sub-menu 404, and an option for a setup sub-mode 411 a is also selected from the secondary options associated with the plan builder mode 410. Selection of the setup sub-mode 411 a can cause a limb segment focus sub-menu 474 for the movement library sub-menu 450 to automatically be selected and expanded as shown in FIG. 4C. In addition, this can also cause a plan builder console 409 ("PBC 409") to display in the console window 403.

Primary selection options for the limb segment sub-menu 474 can include options to view movements that target different regions of a subject. For example, selection of an option for a lower body 478 can cause secondary selection options corresponding to specific parts of a subject's body to be displayed. Selection of one of these secondary options, for example a knee 480*a* and/or an ankle/foot 480*b*, can cause a plan building module to be displayed for each body part selected in the console window 403. Each of the plan building modules can be used to select designated movements to be part of a movement plan that will be provided to a subject.

Designated movements can be categorized according to portions of a body they target, abilities of a subject they are geared to improve, and/or difficulty. In the example of FIG. 4C, these categories correspond to physical abilities (e.g., heart rate—intensity, muscle strength, flexibility, mobility—range of motion) required to perform the movements and/or targeted for improvement by the movement. As shown in FIG. 4C, each body part is associated with two plan building modules as result of the selections of primary options from the movement library sub-menu 450.

More specifically, a first plan building module 481 for both the knee and the ankle/foot will allow an operator or clinician to populate its entry slots 482 with movements that test or improve the strength of the body part for that first building module 481. Likewise, a second plan building module 483 for both the knee and the ankle/foot will allow an operator or clinician to populate its entry slots 482 with movements that test or improve the strength of the body part for that first building module 481

As shown, each plan building module can include entries slots 482 in which a single designated movement can be selected by typing in a name or using a drop-down list 484. Performance values 487 for movement parameters 486 for the designated movement selected can be entered or selected using the selection and incrementing options 488 provided for each movement parameter. In addition to the performance values 487 for the movement parameters 486 that a clinician or operator may select, recommend values 449 can also be displayed where an active option 447 has been selected in the recommendation mode sub-menu 446.

The recommendations displayed in the first and second plan building modules 481, 483, can be generated by a recommendation service discussed in other parts of the present disclosure relating to FIGS. 7A, 7B, 9, and 10, for example. The recommendations may be provided as values for the movement parameters 486 displayed in the recommendation sections 449 of the modules. The recommended values may be selected, for example, by a recommendation service running on a computing device. The actual values may be selected based on factors that include a condition of a subject, a designated movement selected, and other designated movements that have been selected in the modules and defined with respect to their movement parameters 486. Regarding the last factor, the recommendation service can analyze a movement plan, and use the physical requirements of the already defined movements as a basis for generating a movement parameter recommendation. Thus, how much strength is required, how intense, what range of motion is required, or how a subject's flexibility will be tested by other designated movements already can all be taken into account before a recommendation is determined and displayed in a plan building module.

Figure 5:
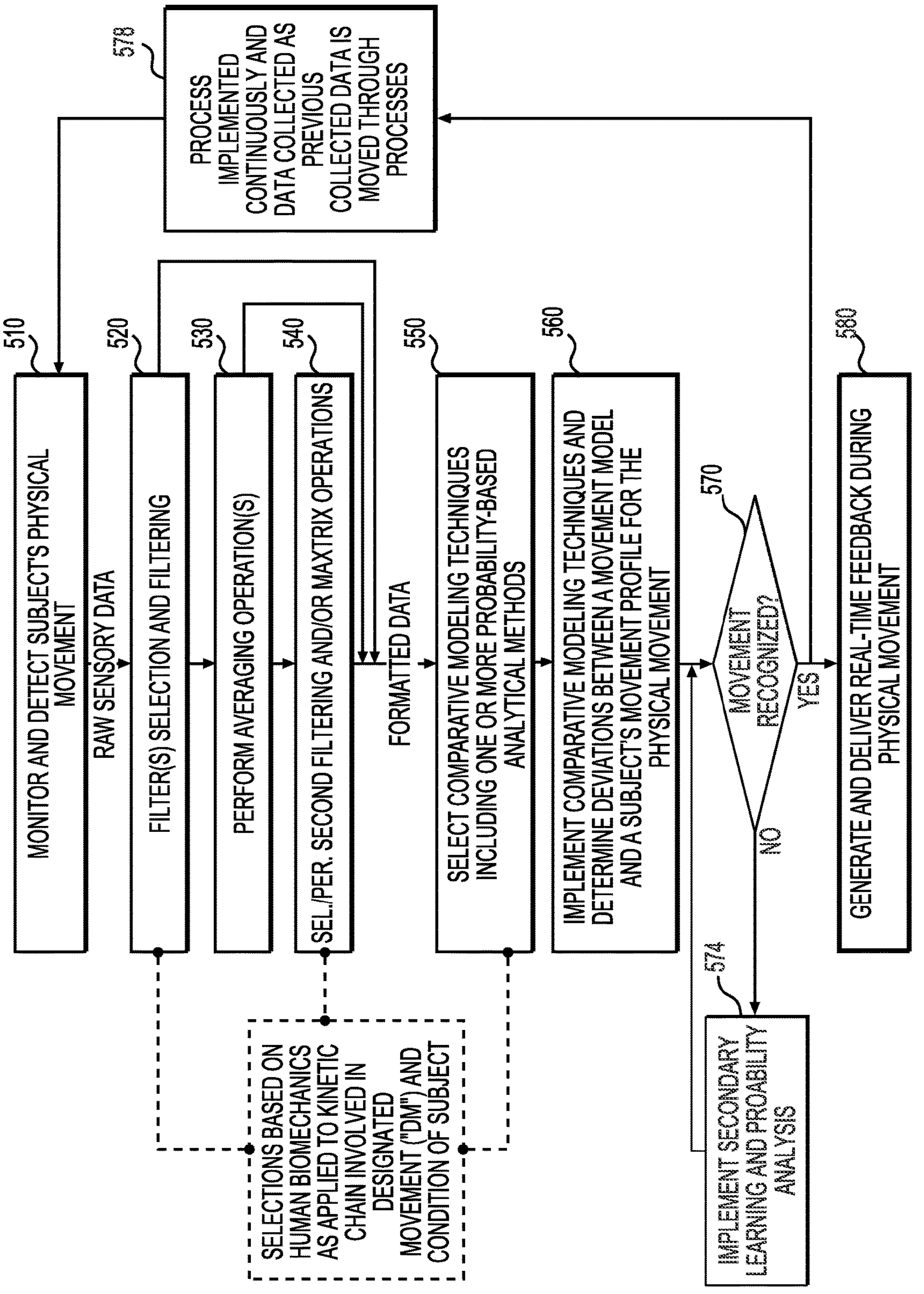
FIG. 5 is a flowchart of an exemplary method for guiding a physical movement according to a movement model using real-time model compliance feedback.

FIG. 5 is a flowchart of an exemplary method for guiding a physical movement according to a movement model using real-time model compliance feedback. In one example, FIG. 5, along with FIG. 6, relate to a subject performing a training session as part of a designated movement plan that includes one or more training sessions in which designated movements are performed or attempted.

At stage 510, a physical movement may be detected with one or more sensors based on designated movements that are part of a movement plan that a wearable device has been loaded with. In one example, each wearable device includes several sensors that measure a subject's movements in three dimensions. The sensors for each device can include an accelerometer, a gyroscope, and a magnetometer, each of generating raw sensor data that may be input for to a processor or other computing resource for the wearable device. Thus, the raw input, for each set of readings including all of the sensors can include nine raw inputs (i.e., (ax, ay, az) from the accelerometer; (gx, gy, gz) from the gyroscope; and (mx, my, mz) for a magnetometer).

Stage 520 includes selecting one or more filters, and filtering the raw sensor data with the selected filters. As discussed above, measurements along all three axes (x, y, z) are registered for each of the sensors incorporated in a wearable device. However, some designated movements may only need to be measured along two axes. At stage 520, the type of filtering performed is selected according to the designated movement expected to be performed. The wearable devices, having been provided with the subject's movement plan, are tuned to the designated movements the subject is supposed to perform. With this information, the filtering by the wearable device(s) removes unwanted values regarding the specific movement being performed. This allows for more accurate and precise arithmetic thresholds to be set for each axis beyond which future sensor data values can be discarded.

In one example, low pass filtering can be used to filter the raw inputs from the sensors, followed by an application of high pass filtering, next further filtering can be performed to reduce noise, and then, a filtered signal is produced. In another example, the raw input from the sensors can be passed through a Butterworth filter only to produce the filtered signal. Other filters that may be used can include Kalman, extended Kalman, and particle filters. The filter(s) that are used are selected based on an overall condition of the subject and what designated movement the subject is attempting to perform.

In one example, the wearable device can access one or more lookup tables that relate conditions and/or designated movements to data filters. Thus, the wearable device may match filter algorithms from a lookup table and select the same for application, based on a clinician's input defining a subject's condition. In another example, the subject's condition can be used to narrow down the potential filters that could be used. For example, if a condition relates to a gait analysis, the wearable device may only consider three of a possible seven filters. From this determination, a processor of the wearable device will be able to recognize a range of values that could be generated as sensor data for each of the three filters. Depending on what range the actual sensed data values fall in, one or more of the three filters may be deployed for filtering the sensed data.

Stage 520 can produce one or more sets of filtered data values for each sensor and each axis for which that sensor outputs an associated raw sensor data value (e.g., (Fax, Fay, Faz) relating to data input from the accelerometer; (Fgx, Fgy, Fgz) relating to data input from the gyroscope; and (Fmx, Fmy, Fmz) relating to data input from the magnetometer).

At stage 530, averaging operations can be performed on the filtered data. The data from the sensors is processed with real-time signal processing techniques. Filtering in stage 520 provides, at a minimum, less noisy data that can be averaged in stage 530 with more accuracy. This is because the filtering reduces a range of values to average. In turn, more accurate data is being used to determine an average of a respective movement parameter, e.g., amplitude, of a movement being performed that will be a closer representation of the actual average. Without the filtering, a wider range of values would be provided and a calculated average would be more offset from the actual average. Averaging the filtered data provides more accurate data for processing in the later stages of the example method of FIG. 5.

Stage 540 includes selecting one or more secondary filtering operations and/or one or more matrix operations, and preforming those operations on the now averaged data. In one example, fast filtering and thresholding techniques are implemented to process the averaged data output from stage 530 and generate formatted data for eventual comparison with trained 40 models using probability-based techniques and/or supervised, semi-supervised, and/or unsupervised machine learning techniques selected as comparative modeling techniques in stage 550 and applied in stage 560. The operations carried out in stage 540 on the averaged data can output formatted data for each sensor in the x, y, and z axes (e.g., (Rax, Ray, Raz) relating to data input from the accelerometer; (Rgx, Rgy, Rgz) relating to data input from the gyroscope; and (Rmx, Rmy, Rmz).

In one example, a combination of fast filtering and matrix operations carried out in stage 540 can allow for processing of signals quickly to determine the signatures of a particular motion profile. An exemplary process can include fast processing of the post-filtered and averaged data using an algorithm that uses data for the designated movement as its baseline for real-time determinations as to the signatures that should be expected. More specifically, a wearable device may be configured to, or run a service configured to register signatures having one waveform or another that characterize the designated movement, and look for those waveforms in the averaged data resulting from stage 530.

In an example iteration of the method of FIG. 5 involving one or more matrix operations at stage 540, the particular matrix operation(s) executed, are done so based on the designated movement that wearable device is attempting to recognize in the physical movement being performed by a subject. These matrix operations, which employ matrix/linear algebra techniques, can simplify computations required of the wearable devices. That is, how data values are arranged in a matrix, and how output is obtained can simplify the computations performed in the method viewed as a whole. This is due in part to the fact that the matrix operation (e.g., a matrix transformations, dot products, computing Jacobian, etc.) can reduce the number of values that will be processed in the computationally intensive probability and/or machine learning techniques that may be employed at stage 560.

At stage 550, one or more comparative modeling techniques that can include probability-based analytical methods, may be selected for application to the formatted data. These techniques can include biomechanics-based algorithms using one or more probability-based, and/or supervised, semi-supervised, and/or unsupervised machine learning techniques, and/or fast Fourier transform ("FFT"). In one example, one or more supervised machine learning techniques that can be selected, may be implemented through the use a repository of training data. The training data can be previously collected data that characterizes or otherwise corresponds to movements performed: (a) by test subjects that may be considered optimal or suboptimal in terms of health, condition, and/or ability; (b) for different body/limb segments. Supervised learning algorithms can be used to come up with a model that helps distinguish movements that are being correctly performed by the subject versus those movements considered to be sub-optimal (at least relative to a movement model for the subject).

In one example, some iterations of the example method of FIG. 5 can employ a semi-supervised training model that has been set up, and other iterations may employ probability-based calculations. A selection of one comparative modeling technique in stage 550, instead of or in combination with another technique, can be based on: values for the raw sensor or formatted data; a body segment involved in a physical movement being performed; and a condition of a subject performing the physical movement.

At stage 560, comparative modeling technique(s) selected in stage 550 are implemented, and deviations between a movement model and a subject's movement profile for the physical movement the subject is currently performing are determined real-time. Each physical movement that a subject may attempt can be, and may have been, classified with training and test data prior to the assessment or a first training session by the subject. Using the techniques selected in stage 550, combinations of the formatted data values ((Rax, Ray, Raz), (Rgx, Rgy, Rgz), and (Rmx, Rmy, Rmz)) being generated real-time as the physical movement is being performed, are compared to the movement model generated as part of a prior assessment. Probability-based analytical and/or the previously mentioned methods can be applied to the formatted data output from stage 540 and determine whether that physical movement is compliant with the designated movement to which it corresponds.

In one example, a deviation of one portion of a subject's body during a physical movement can be greater than a threshold deviation for that one portion of the body at that temporal point of a movement performance, as compared to a part of a movement model including the same portion of the body at the same temporal point. As a result, the deviation exhibited by this body portion alone, can lower a subject's level of compliance below a predetermined level and therefore cause real-time feedback to be delivered to the subject. Thus, any one portion of a movement profile can have specific deviation thresholds for any and portions of a subject's body a designate movement corresponding to the movement model involves. Accordingly, one deviation, can be significant enough to trigger real-time feedback delivery indicating to the subject that their level of compliance with some portion of the movement model is below a certain threshold.

In another example, a sum of all the deviations identified may be determined and recognized as an overall level of compliance by the subject that triggers real-time feedback delivery. This may be the case even if no one portion of the subject's body or their movement profile deviates beyond threshold for that portion of the body or movement profile. In the latter case, the real-time feedback may have two or three components delivered by more than one wearable device to guide the subject to correct all the deviations.

In another example, the real-time feedback delivered can be specific to a deviation(s) determined—e.g., based on location, muscle group, distance from a wearable device, a subject's past history of exhibiting the same deviation, and other factors.

In each of stages 520, 540, 550, and 560, a selection of an operation is based on an understanding of human biomechanics that has been built into the wearable devices and applied to a kinematic chain involved in the designated movement. The system of wearable devices described herein provide a subject with comprehensive guidance of a physical movement in a small self-contained interactive device the subject can wear without being obtrusive.

The wearable devices according to the present disclosure are appropriately characterized as "self-contained" because the various processes dynamically selected and performed thereby. Substantially all of the algorithms and processes employed by the wearable device are dynamically configured, constructed, or otherwise adapted: (1) automatically; (2) by the wearable device without communicating with any other device or source of information, other than another wearable device; (3) real-time; and (4) based on (a) a condition of a subject, (b) a designated movement being attempted, and (c) the values of the sensor data being generated as a result of a physical movement actually being performed. Operation of the wearable device is substantially condition dependent, such that device is configured to account for dynamic movements of a subject.

In one example, the methods performed by the wearable device may be executed by processors and off the shelf technology as a result of the inherent efficiency each method exhibits. Each wearable device can receive raw sensor data that characterizes complex movements in a three-dimensional frame of reference. Further, each device is configured to distill that data real-time in to a form that accurately indicates positions and motions of the limbs, limb segments, and joints involved in a movement being performed.

In one example, a wearable device uses data characterizing a condition of a subject and a designated movement, to determine how to filter and post-filter process data values being generated by its sensors as they detect a movement of a subject wearing the wearable device. In using the condition and designated movement data, the wearable device is able to identify data values it can expect from the sensors, and how to filter out the data values that could: (1) cause a determined movement profile to be inaccurate; (2) increase computing resources needed to determine the movement profile; or (3) that lead to delivery of feedback at the wrong times. The series of operations performed once the raw sensor data is filtered increase the accuracy and limit the number of values to run through computationally intensive comparative modeling methods (e.g., probability-based and/or machine learning methods).

In one example a probability-based method may be utilized to compare a subject's movement profile for a movement the subject is performing, with a movement model for a designated movement. In the same example, raw sensor data from a device's movement sensors may be filtered, averaged, and run through a fast filtering and/or advanced matrix operation. The specific filters and operations are selected by the device based on a condition of a subject and a designated movement. This can limit or reduce the amount of values that must be considered with a comparative modeling technique, while at the same time ensuring those realtime values more accurately represent an actual movement profile of the user. Accordingly, the stages 510 to 560 result in less data and more accurate data being feed into a machine learning and/or probability-based comparative modeling technique, with the end result of more accurate real-time comparative analysis results being delivered.

According to an aspect of the present disclosure, accuracy and efficiency of data processed in stage 560 is a byproduct of the wearable device starting from a point where a movement being done and a condition of a subject are already known. With this information, the device knows what to look for in terms of a movement profile. In addition, this allows feedback to be delivered to a subject quickly because the device, or a processor thereof, is able to recognize mathematically that a subject's movement is not correct relative to a model for a designated movement.

Put another way, the device will be expecting a signature based on the data it has that characterizes the designated movement. This data having a temporal component allows the device to know what signatures to expect and when to expect them. The data from the device sensors can be analyzed versus a time expected for the designated movement. Thus, at stages 520, 540, and 550, the wearable device can take a time from a movement model of a designated movement, and compare it with the data to be processed in each of those stages. Then, at each of these stages, the device is able determine if the data is as expected, and select a particular operation for those stages based on that determination.

Put still another way, as part of the assessment, a wearable device will be provided with data that will represent, for example, where a subject's shoulder should be at every instant in time during a designated arm raise. From a time a subject starts the arm raise, the wearable device is scanning for data from, or derived from, its sensors that mimics the data for a model of the designated movement. Per stages 520 to 550, the wearable device is continuously processing data as the subject performs, for example, the arm raise. This includes continuously detecting the subject's movement(s), and comparing that data to what is expected or what the device should have expected for that particular designated movement.

In stage 570, the wearable device(s) determines whether the movement being performed is recognizable as the designated movement. As sensor data values are generated real-time while a motion is performed, combinations of these data values are being compared to a movement model as previously discussed, to identify which physical activity is being performed. In one example, a system of the present disclosure may access a repository of test data gathered from subjects wearing devices that track those subjects as they perform numerous movements. In stage 560, machine learning or probability-based inference techniques can be applied to the generated formatted data and a model(s) developed from the accessed test data, to recognize the movement being performed. Each movement performed by a subject may have certain characteristics that can be captured in a data processing algorithm in stage 560, and used to determine whether the movement being performed can be recognized as the designated movement expected.

Based on an ability of the wearable devices to learn in real-time, the devices can implement a secondary analysis at stage 574 if the physical movement is not recognized at stage 570. The secondary analysis can incorporate one or more machine learning and/or probability-based methods to recognize the physical movement being performed.

In one example, a wearable device can learn at rate comparable to real-time data processing. Where the movement being performed is not recognized as a result of stages 560 and 570, then the formatted data (Rax, Ray, Raz), . . . ) can be processed in a second recognition test in stage 574. In one example, unsupervised machine learning and probability-based methods can be applied to the formatted data. Real-time waveform matching techniques can be used to compare data generated real-time (by the sensors) to a target waveform for a designated movement that the wearable device is attempting to recognize. In an instance in which waveforms match, the movement being performed is recognized. In one example, the probability-based techniques used in stage 574 can include Bayesian analysis, Kalman Filter, Extended Kalman Filter, particle filter, and the like.

In stage 578, the processes incorporated in stages 510 to 570 are repeated continuously, and raw sensor data is collected as previously collected data is move through these stages. The wearable devices can be configured to execute through a single cycle of stages 510 to 570 in less than a predetermined amount of time, such as 3000 ms, 2000 ms, or 1500 ms, as examples. The cycle time can be configured by a clinician or an operator based on a subject's condition or other factors described herein.

This cycle time can be configured taking into account a subject's ability to consume, understand, and respond to feedback (see e.g., stage 658 and 660 of FIG. 6) as the subject performs a designated movement. In one example, a backend, a management agent, or a recommendation service as described herein, can estimate and present as a setting option for a clinician or operator to elect to use, a cycle time. This proposed cycle time may be determined based on a subject's condition and an effectiveness of cycle time as it relates to delivering realtime feedback and a subject performing a corrective movement that improves a subject's compliance with a movement model. In one example, effectiveness can be estimated based on a review of a repository of data comparing cycle time and feedback response data for other subjects have a same or similar condition as a subject currently performing a designated movement.

At stage 580, real-time feedback may be generated and delivered to a subject by the wearable devices during the performance of the designated physical movement. As discussed herein, real-time feedback can be delivered as a subject's movement deviates from a movement model of a designated movement in position, speed, limb orientation, angular velocity, angular acceleration, linear acceleration, etc. The method of FIG. 5 generally includes a wearable device, having been provided with model data that characterizes a designated movement, scanning for key patterns and signatures in sensed data to confirm the sensed data corresponds to model data, and processing the sensed data real-time to give real-time feedback that indicates where a correspondence has been recognized.

One form of feedback can include the wearable device indicating what set, rep, or range a subject is on or moving through. Thus, once a movement is recognized, it can be counted where stage 580 coincides with the completion of a repetition or a subject reaching range of motion limit. The wearable device will automatically recognize these aspects of performance, and can issue feedback in the form of showing or indicating an increase in a count number for repetitions or sets, or emitting a sound at the end of the range of motion.

Feedback can include auditory signals and or vibrations/haptic sensations having different modes and kinds of signals when a predetermined range is reached. The predetermined range can be set by a clinician, who can also set ranges in terms of angle of displacement, angular velocity, height, distance, and speed of movement for one or more movements that have been designated as part of a subject's movement plan. In addition, the auditory and haptic signals can have different signatures for rep and set completions, and very specific feedback for correct or incorrect movements (or portions thereof). In one example, types of feedback can be specified using an UI on the wearable device, such as a touch screen. In one example, the wearable device can be set to deliver continuous feedback (e.g., vibrate, beep light or sound, etc.) where a subject's movement profile is compliant with a movement model, and to stop delivering feedback when the subject deviates from the movement model.

Figure 6:
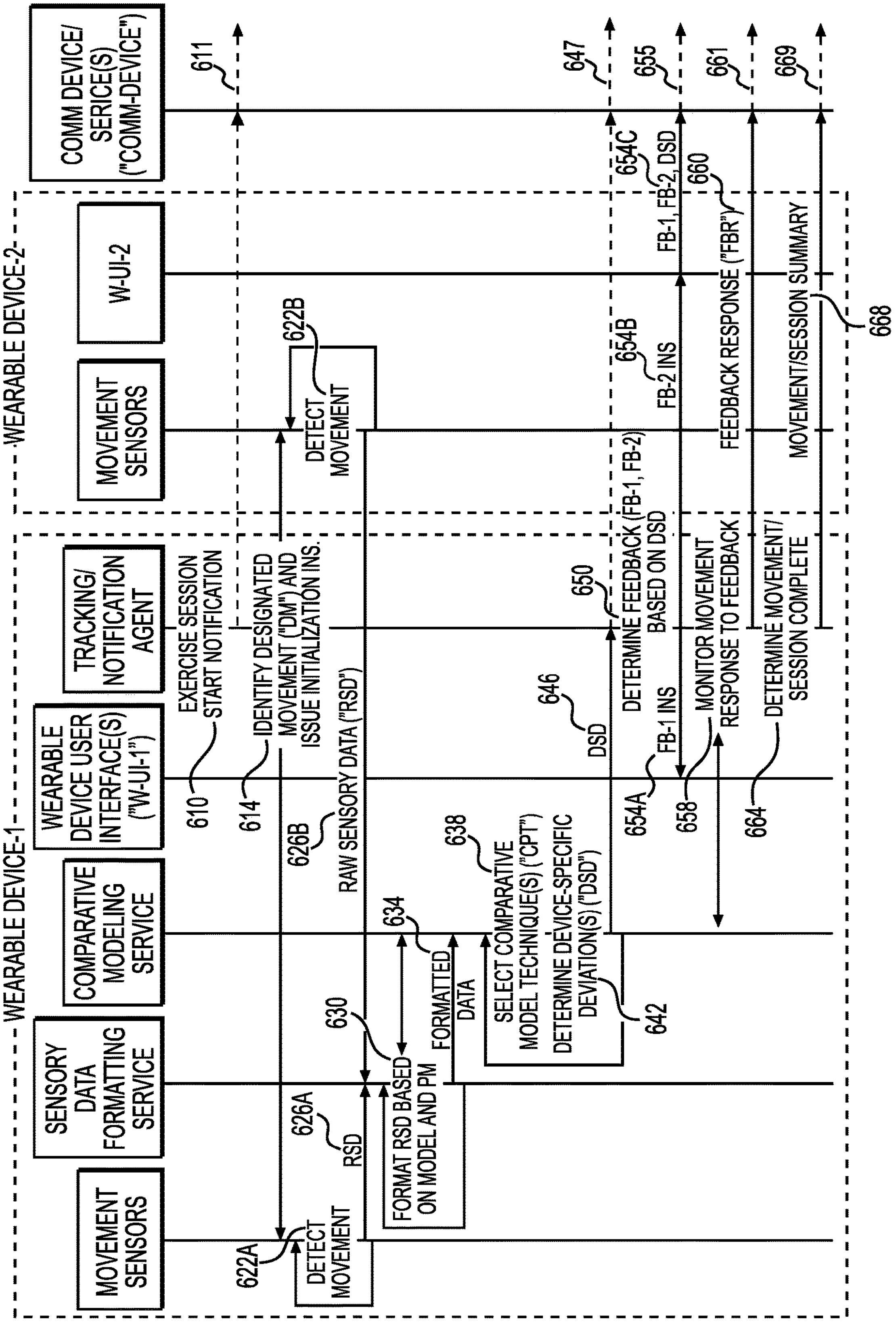
FIG. 6 is a sequence diagram of an example method for guiding a physical movement according to a movement model using real-time model compliance feedback.

FIG. 6 is a sequence diagram of an example method for guiding a physical movement of a subject according to a movement model specific to the subject. At stage 610, a tracking/notification agent ("tracking agent") on a first wearable device receives a notification, or otherwise determines, that a movement session has been initiated.

In stage 614, the tracking agent identifies a designated movement being attempted by a subject wearing wearable device-1 and wearable device-2, and issues initialization instructions to the movement sensors of both devices.

Stage 622A and stage 622B may involve similar operations by the movement sensors on both device-1 and device-2. That is, each set of sensors operates to detect its assigned portion of a training movement it is supposed to monitor, gather data for, and deliver real-time feedback with respect to, pursuant to the calibration that occurred in stage 358.

At stage 626A the movement sensors for wearable device-1 sends raw sensor data ("RSD") gathered, and transmits this package of RSD to a sensor data formatting serve being implemented on wearable device-1. Stage 626B includes the movement sensors of wearable device no. 2, transmitting gathered RSD to the sensor data formatting service.

In stage 630, the combined RSD is formatted and transmitted real-time to a comparative modeling service in stage 634. Formatting the RSD can include the filtering, averaging, and/or matrix operations described for stages 520, 530, and 540 of the example method illustrated in FIG. 5. In one example, the formatted data can also be transmitted in stage 634 to a backend through a comm device, or directly depending on the hardware included in the wearable devices (e.g., wifi chip, cellular communication enabling component).

At stage 638, one or more comparative modeling techniques ("CPT") are selected by the comparative modeling service. A CPT selection is based on the formatted data, the limb, limb segment, or joint that is the focus of the training movements, a condition of the subject, and a designated movement the subject is currently attempting.

At stage 642, the comparative modeling service determines deviations and a level of compliance real-time between a movement profile of the subject and a movement model for the designated movement currently being attempted. The comparative modeling service also registers a proximity of any deviation determined relative to respective locations of the wearable devices on the subject. Together, a deviation and a location of where that deviation is occurring relative to device locations is referred to device-specific deviation ("DSD") information.

In stage 646, the DSD information is transmitted to the tracking agent implemented on wearable device-1.

At stage 650 the tracking agent determines a type of feedback to deliver based on a level of compliance with the movement model to the subject specifically with wearable device-1 ("first device real-time feedback" or "FB-1") and wearable device-2 ("second device real-time feedback" or "FB-2"). First and second device real-time feedback may be any type of feedback a respective device is configured to deliver, but may be specific to a deviation(s) being observed, and the device it will be delivered by.

Stage 654A includes the tracking agent transmitting an instruction to a UI of wearable device-1 ("W-UI-1") to deliver FB-1. Simultaneously, in stage 654B the tracking agent transmits an instruction to a UI of wearable device-2 ("W-UI-2") to deliver FB-2. In addition to transmitting to W-UI-1 and W-UI-2, the tracking agent can also simultaneously transmit FB-1, FB-2, and DSD to a designated communication device or service ("comm-device") for the subject, or a user device (not shown) used by an operator or clinician. Thus, as a subject receives real-time feedback regarding their movement's level of compliance with a movement model, all the data used to determine that level of compliance can be transmitted to an agent or service operating on a comm-device or a user device and provided for display to a respective UI. This package of information can then be compiled, processed, stored, and reported in some form to the subject, a clinician or operator, and the backend.

At stage 658, the tracking agent monitor a movement response of the subject immediately following delivery of FB-1 and FB-2. This feedback response ("FBR") gets transmitted by the tracking agent to the comm-device or service at stage 660.

Each of the following groups of stages define a sub-sequence within the sequence of FIG. 6: stages 622A, 622B, 626A, and 636B (also referred to as "sub-sequence-1"); stages 630 and 634 (also referred to as "sub-sequence-2"); and stages 638, 642, and 646 (also referred to as "sub-sequence-3"). Each of the sub-sequences-1, 2, and 3 is repeated on a loop as shown in FIG. 6 until the movement sensors stop detecting a designated movement by the subject and a sub-sequence that precedes it completes a last iteration.

A subject's response, for example a correction or alteration of their movement immediately after FB-1 and/or FB-2 is delivered, will register with the movement sensors as another part of the subject's movements. However, the tracking agent is continuously receiving DSD information and is configured to register and flag or otherwise specifically log a next portion of the subject's movement following FB-1 and/or FB-2 delivery at stage 658.

As a result, the tracking agent can determine a numerical success-rate (or some type of performance-based historical rating) that measures the effectiveness of a particular type of feedback during a movement session or over several movement sessions with a review of the subject's movement responses to that type of feedback. Stages 658 and 660 can include the tracking agent continuously updating a success-rate for the types of feedback being delivered to the subject using wearable devices-1 and 2. In addition, the tracking agent can be configured by a clinician or operator, as part of an assessment or review of the subject, to change a type of feedback delivered based on its success-rate. Such a change may be made during a movement session or at a next movement session by the wearable devices without prompting, or with a notification to and approval by, the subject or a clinician.

At stage 664, the tracking agent may determine the subject has completed: a repetition of a designated movement; a set of repetitions of the designated movement; a session plan (e.g., X number of sets of Y number of repetitions) for the designated movement for a current movement session; or a movement session including one or more designated movements. In another example, the tracking agent may determine the subject has stopped performing a designated movement, session plan, or movement session. In one example, stage 664 can include the tracking agent determining and issuing FB-1 and FB-2 instructions that specify a specific type feedback to deliver to the subject when a movement, session plan, or session is complete, or the subject has stopped performing.

At stage 668, the tracking agent, having recognized the completion or stoppage of a designated movement, a session plan, or a movement session at stage 664, can transmit a summary of the same to the comm-device. In one example, either of wearable device-1 or device-2 can communicate with the comm-device. Completion of a movement session comprising several movements and how many sets, repetitions, and range of motion, etc., for each movement—all this information can also be stored on an on-board memory for one or more wearable devices worn during the session. As a result, all this information can be transferred to the comm-device even at a later point in time.

The exemplary method of FIG. 6 illustrates how, in practice, the wearable devices can take in values for multiple movement parameters, and select data values and processes that are the most relevant to a designated movement being attempted during a training session that is part of a subject's movement plan. For example, during both a side arm raise and a front leg raise, sensors for wearable device could measure an angular velocity—how fast an angle of the arm or leg changes. Other sensors for the same wearable devices could measure a normal velocity of the hand or foot—a displacement velocity of the hand or the foot. The process implemented by the wearable devices for determining a position of the subject's arm can differ from the process the devices would implement for the subject's leg.

Based on a structure, weight, muscle composition, and a path and speed of motion (among other factors), processes for the leg raise and the arm raise may first differ at a filtering level. Based on the characteristics of a typical front leg raise, a type of filter or combination of filters for the leg may include low pass then high pass filtering. Whereas only a Butterworth or Kalman filtering technique may be used for the arm raises. This may be due, in part, to the fact that the two movements do not occur in the same plane or combination of planes.

A second difference may come with a type of matrix operation and/or secondary filtering operation that is performed for a process for the leg versus the arm. One type of advance matrix operation may be used for the leg raise, followed by a fast filtering process. On the other hand, a different type of matrix operation may be used for the arm raise, which is followed by a threshold checking process.

A third difference between these two movements may be with a feedback delivered to the subject. For both movements, one wearable device may be positioned just above a right wrist of the subject, and the other may be positioned just above a right ankle. However, feedback delivered for key portions or aspects of each movement may differ significantly. For example, feedback delivered because the movement path of the leg is deviating from a movement model may be in the form of a pattern of vibrations by the wearable device above the ankle. In a similar situation for the arm raise, the wearable device above the wrist may emit a series of beeps for a deviation from a respective movement model greater than a predetermined threshold. This difference may be due to a recognition, by a system including the wearable devices, that an auditory feedback for a leg raise may be less effective than a vibration pattern the subject feels, because the wearable device closest to a location of the deviation, is the farthest of the two devices relative to the subject's ears. Thus, a system implementing the wearable devices can recognize that a beeping sound at one's ankle may be more likely to go unnoticed than a vibration.

In another example, the method of FIG. 6 can optionally include stages 611, 647, 655, 661, and 669 to facilitate real-time representation and review of a subject's movement session by a clinician or operator. In one example, real-time review can be initiated by the exercise start notification generated in stage 610 being transmitted in optional stage 611 to a user device directly, or through a backend. Upon receipt of the start notification, discussed more with reference to stage 709 of FIG. 7A, a clinician or operator can monitor a subject's movement session performance real-time as the DSD, FB-1 and FB-2, the FRBY, can be transmitted respectively in optional stages 647, 655, and 661 as follows: from the comm device directly to a user device, or to a user device through a backend; real-time as each is continuously generated; while a clinician is using an interface to monitor a subject's progress; and during the movement session for which the start notification was sent in stage 611. In addition, the same real-time communication protocol can be used upon the completion of the movement session to transmit the movement session summary real-time to the user device at stage 669.

Figure 7A:
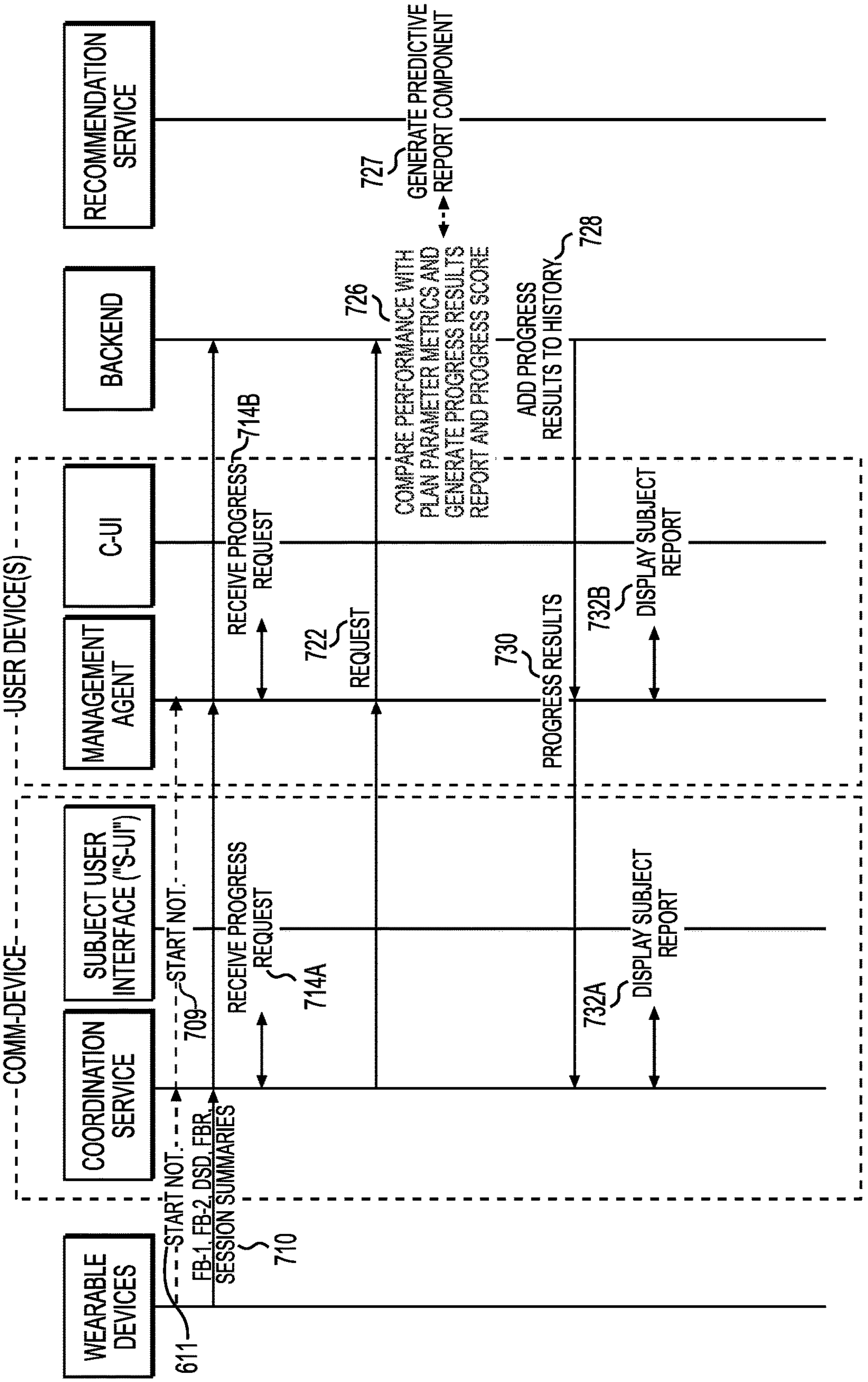
FIG. 7A is a sequence diagram of an example method for generating a compliance report for a session of designated movements by a subject with wearable devices.

FIG. 7A is a sequence diagram of an example method for generating a compliance report for a session of designated movements by a subject with wearable devices.

As discussed above, a subject's performance of designated movements during a movement session can be monitored real-time in one example of the present disclosure with stages 611, 647, 655, 661, and 669. As part of this monitoring scheme, a coordination service of the comm-device can receive the start notification in stage 611, and transmit the same to a management agent of a user device in optional stage 709. Accordingly, all of stages 710 to 732A and 732B may be performed real-time as a subject engages in a movement session.

In another example, the start notification at stage 611 and at stage 709 could follow, or initiate a video conference between a subject and a clinician or operator. In particular, the subject and clinician may schedule a time for the clinician to monitor the subject's at-home movement session, and provide guidance. The dashboard 400 of FIGS. 4A-C and 8C may include a selectable option to bring up a window that includes a video screen that receives and displays a camera feed from a subject's end, and one or more modules including graphs in which measured movement parameters of the subject's designated movements are charted real-time as they are performed by the subject.

At stage 710, the wearable devices can transmit, continuously, packages of information including any one or all of FB-1, FB-2, DSD, FBR, and session summaries (any single one or combination of which referred to hereafter by a respective name or "training movement information"). The packages of training movement information can be transmitted real-time to any one or all of: a coordination service installed on a comm-device used by a subject; a management agent installed on a user device used by a clinician or operator, and to a backend. In one example, each package of training movement information, or any other data transmitted by the wearable devices described herein, between each other or to any external (non-wearable) device, can include identifying information unique to the wearable device or group of wearable devices transmitting the training movement information or other data. In another example, the training movement information can also include formatted data generated at stage 634. In this example, the management agent or backend can complete a redundancy analysis to check the training movement information, and verify whether the wearable devices are correctly calibrated to a movement plan associated with the subject using the wearable devices that transmitted the training movement information.

Stages 714A and 714B can respectively occur any time after an information package including the training movement information is received by the comm-device or the user device. In stage 714A, the comm-device can receive a request for a progress report through a user interface presented for a subject on the comm-device. This subject user interface ("SUI"), can be part of an application, agent, or other software component maintained or otherwise supported by the backend. Likewise, a request from a clinician can be received through a C-UI presented on the user device at stage 714B.

At stage 722, the coordination service and/or the management agent can respectively transmit the progress request to the backend (e.g., a backend server, backend cloud computing environment).

At stage 726, the backend can determine a level of progress for the subject's performance. In one example, the level of progress can be determined based on a performance history of designated movements in a respective movement plan. In one example the level of progress can include or be defined as an increment of progress that represents a comparison between a current movement session and a most recent movement session. In another example, the level of progress can include or otherwise represent a comparison between the subject's current performance and the subject's past performance of assessment movements, if no other sessions have been completed or other performance history information is otherwise not available. Regardless of whether a level of progress is determined, at staged 726, the backend can use the training movement information received in stage 710 to complete a comparative analysis of the subject's performance. In one example, the comparative analysis in stage 726 includes: (1) comparing (A) the subject's performance, as reflected by the training movement information in isolation or, if determined, with a progress level, and (B) one or more plan parameter metrics established at the time when the plan was created or modified; and (2) determining a subject's progress through their respective movement plan based on comparing (A) and (B).

Each movement plan includes a plan parameter metric that measures a subject's compliance in performing a designated movement relative to a movement model for the designated movement (specific to the subject). In addition, other plan parameter metrics can include estimated and/or goal-based performance measures for each designated movement of a movement plan. These other plan parameter metrics can include performance measurements or values corresponding to various movement parameters and representing planned, estimated, and/or goal-based ranges of motion, number of repetitions, number of sets, daily/weekly/monthly designated movement performance frequencies, and the like. The plan parameter metrics can be defined: based on the subject's condition; by a clinician or a recommendation service with the approval of a clinician; as corresponding to movement parameters for designated movements of a movement plan: on the user device; and during an assessment or as part of review or modification of a subject's plan.

Each plan parameter metric can include incremental performance values and an overall performance value for a movement plan. Incremental values for a plan parameter metric may be set according to increments of an overall time (e.g., week 1, week 2, week 3) the subject will be engaged in performing the movement plan. Alternatively, or in addition to the timebased increments, the incremental value may be established based on number of movement sessions (e.g., session 1, session 5, session 10). Thus, each movement session, or session representing the last session in an increment of sessions, may include a plan parameter metric incremental value for one or more designated movements.

From this comparison, the backend, management agent, and/or the coordination service can generate a progress results report for the subject that details the subject's historical performance with respect to a plan parameter metric for each designated movement in the subject's plan. In addition, an overall progress scored can be determined for each designated movement and user to determine an overall progress score for the subject with respect to their plan. The progress score for a designated movement can be calculated or otherwise determined by determining the subject's level of compliance for each designated movement. In one example, this can include an overall percentage that the subject's movement profile matched with a movement model for that designated movement. Taken further, this percentage be combined with a percentage of times the subject completed a designated number of repetitions in a set, and completed designated number of sets during a movement session.

In the example method of FIG. 7A, the comparison with the plan parameter metrics can be performed at the backend (e.g., backend server, backend cloud computing environment). In another example, either of the coordination service for the comm-device, or the management agent on the user device can perform this analysis. In either situation, the plan parameter metrics can be stored on, or otherwise accessible by, the coordination service or the management service via the backend or an external data repository or cloud service incorporated by a system according to the present disclosure.

The exemplary method of FIG. 7A can optionally include generating a predictive component for inclusion in a progress report at stage 727. In one example, the predictive component can be generated by a recommendation service upon receiving a movement plan and a progress results report and/or the training movement information. The recommendation service is described in more detail with reference to FIG. 9. In one example, the predictive component can be generated based on the subject's historical progress as reflected by the subject's actual recorded performance values for their tracked movement parameters. In one example, the predictive component can be generated by charting out a series of future performance values for the movement parameters, including compliance percentages and scores, for designated movements in the subject's movement plan. The predictive component can be presented as graph that includes predicted performance values over time. The predictive component can be determined every time the subject completes a session and/or training movement information is received. In another example, the predictive component can include a comparison between predicted compliance and performance values (e.g., range of motion, reps, sets, etc.), and the plan parameter metrics.

At stage 728, progress results determined from the analysis performed in stage 726 can be added to a history for the subject associated with the request in stage 722. At stages 732A and 732B the subject's progress results can be displayed on the S-UI and C-UI respectively.

Figure 7B:
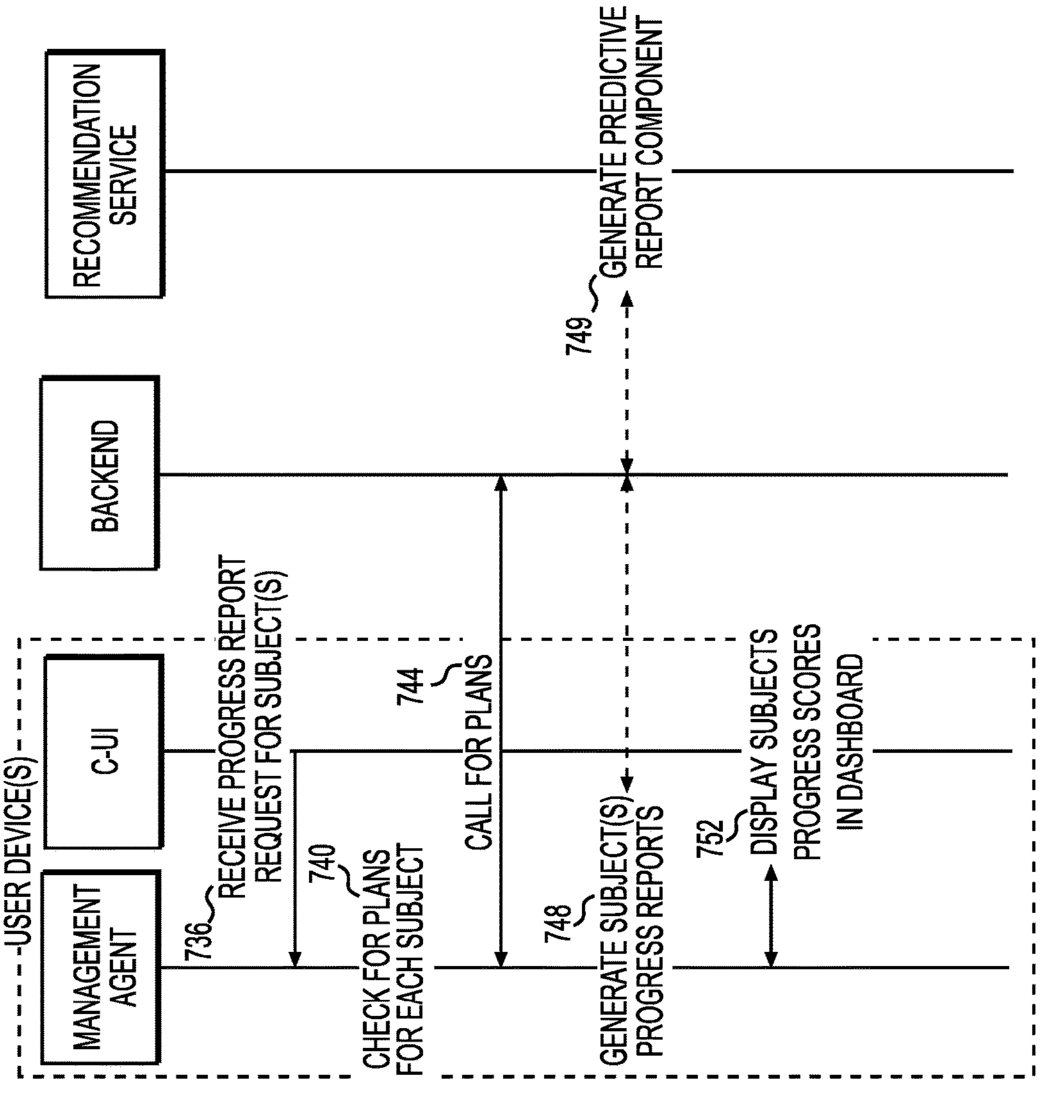
FIG. 7B is a sequence diagram of an example method for generating a dashboard including progress reports for one or more subjects.

FIG. 7B is a sequence diagram of an example method for generating an operator dashboard including progress reports for one or more subjects.

In one example, a clinician or operator may be treating, supervising, or coaching multiple subjects at any given time, and desire to see an overview of out each subject is progressing through their respective plan. At stage 736, the user device can receive a progress report for a group of subjects through the C-UI.

The management agent can check a local storage for the user device at stage 7 40 to determine whether a plan for each of the subjects is on the user device. At stage 744, the user device can access the backend, or a cloud storage service, if no plan is found, and/or to synchronize a plan for any subject requested in stage 736.

At stage 748, the management agent can analyze, or request and receive an analysis from the backend, the progress reports of each subject and determine an overall score for each. In one example, each subject's overall progress can be determined by averaging a compliance score for each designated movement in that subject's plan over a period of time, or for a specified number of previous movement sessions.

In another example, a request from the management agent or the backend can be transmitted to the recommendation service in stage 749, and a predictive report component for one or more subjects can be determined and obtained. In one example, the recommendation can review a subject's past performance and condition, and compare these elements with other subjects having similar results and conditions and determine a predicted progress over a specified amount of time in the future.

At stage 752, a summary of each subject requested can be displayed in an operator dashboard presented through the C-UI on the user device. As discussed in more detail with reference to FIG. 8C, through the dashboard, a clinician or operator may drill down into a report for a subject and see how that subject is performing with respect to any one single designated movement in that subject's movement plan.

Figure 8B:
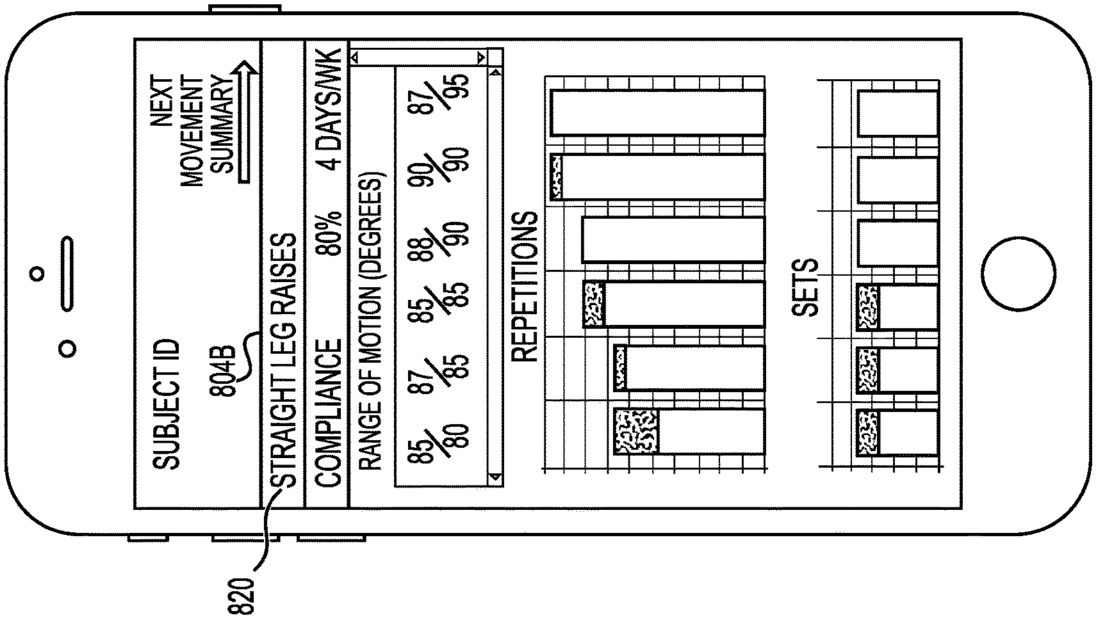
FIGS. 8A and 8B illustrate an exemplary UI to review movement reports based on data from wearable devices worn by a subject during movement sessions.
Figure 8A:
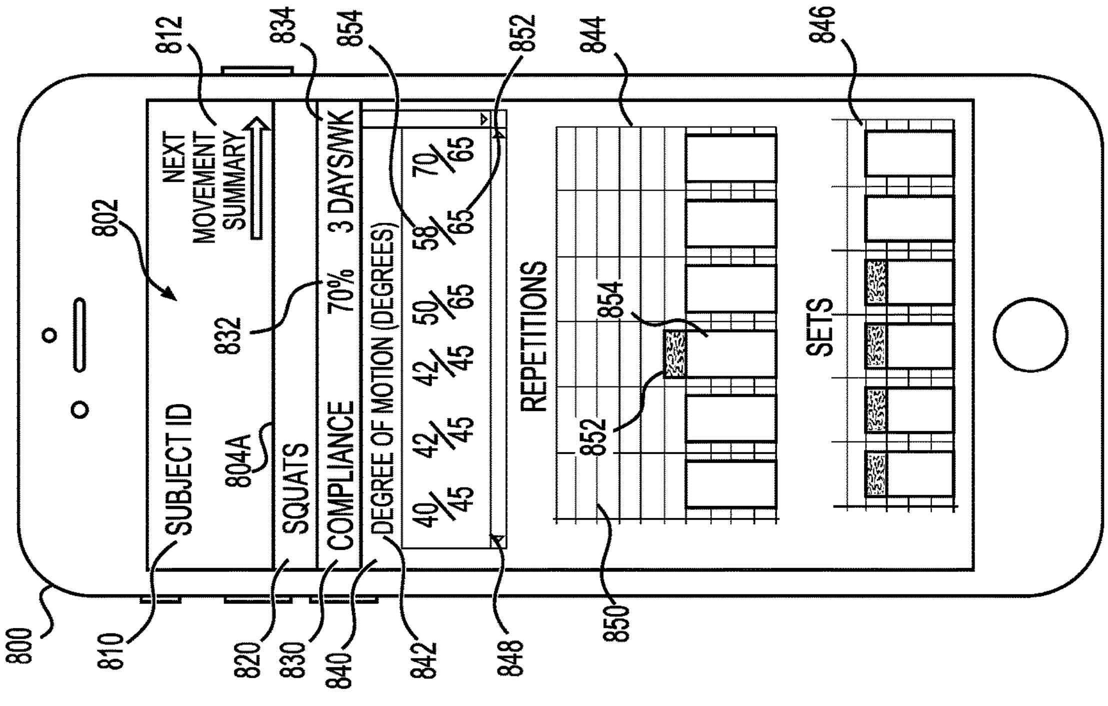

FIGS. 8A and 8B illustrate an exemplary subject user interface (S-UI) 802 for review movement reports based on data from wearable devices worn by a subject during movement sessions.

As shown, the S-UI 802 can be implemented by and displayed on a communication device 800, in this case a cellular phone, but could be displayed on other computing devices (e.g., a tablet, laptop, etc.). The S-UI 802 displays subject ID 810 corresponding to the subject using the device 800. A navigation option 812 allows the subject to navigate between subject focused versions of designated movement summary panels 804 ("subject panels 804") for different designated movements in that subject's movement plan. Each the subject panels 804 can include movement ID section 820, a compliance section 830, and a results section 840. The compliance section can indication a subject's overall movement plan compliance score 832, and display a plan frequency 834 for movement sessions. The results section 840 can include a first parameter report 842, a second parameter report 844, and a third parameter report 846 for the designated movement listed in the movement ID section 820. Results for the parameters can be represented in a summary table 848 or a graph summary 850. In both representations, an expected performance 852 is visual compared to an actual performance 854.

Figure 8C:
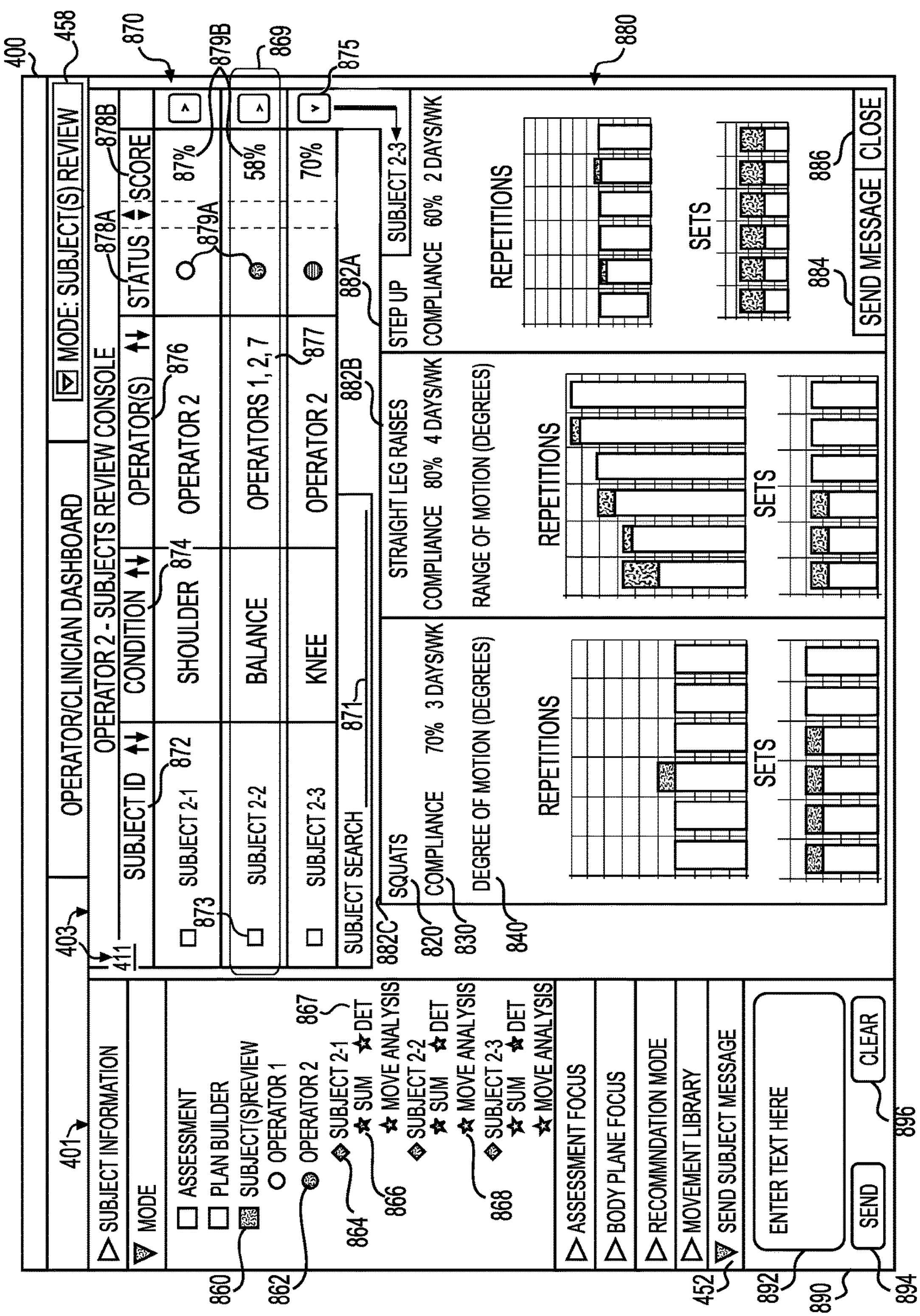
FIG. 8C illustrates an exemplary dashboard console for reviewing movement reports of one or more subjects.

FIG. 8C illustrates an exemplary console of the dashboard 400 for reviewing results derived from data gathered by wearable devices during a movement training sessions. In one example, some of the movement training sessions included in the report may have been performed by a subject at a facility, or were otherwise supervised by a clinician or an operator. Other movement training sessions may have occurred in a park, at the subject's home, in a hotel gym, or any other location suitable for the subject to perform the designated movements in the movement plan devised specifically for that subject based on their condition.

As indicated by the MDS option 458, the dashboard 400 in FIG. 8C is displaying a subject(s) review mode. Accordingly, an option for a subject(s) review mode 860, a primary option within the mode sub-menu 404, is selected. In the example shown, a secondary operator option 862 has been selected, and list of subjects the selected operator may work with is expanded below the operator's name. A tertiary subject option 864 is provided next to the name of each the subjects listed below the selected operator. As selection of any one of these tertiary subject options 864, can result in a progress report for that subject being displayed in a subject summary table 870 of the report review console 411.

The dashboard 400, through an exemplary system of the present disclosure that supports it, can be utilized to obtain progress reports of different types with regards to content, as well as different levels of detail. In one example, a clinician, operator, or an administrator or other type of supervisor, depending on their respective permissions and settings that may be managed by the system, can select a summary report option 866 to have an entry 869 for the corresponding subject added to the summary table. The entry 869, as shown, provides a highlevel synopsis of the subject's overall performance of their respective MP. Each entry includes a subject's subject ID 872, their condition 874, operators 876 working with that subject, and at least one progress summary parameter. In FIG. 8C, two progress summary parameters, status 878A and overall compliance score 878B, are included in the subject summary table summary 870.

An example operator value 877 is designated in FIG. 8C to show an example of a subject working with multiple operators. Example status and score values 879A, 879B are designated with respective reference numeral to highlight how a subject's level of success or progress can be visually indicated. More specifically, the background appearances the circular symbols constituting the example status values 879A, correspond to a range a corresponding example score value 879B falls within. For example, the score value 878B for "subject 2-1" is 85%, and falls within a percentage range of 80-90% that is indicated with a solid background. On the other hand, the example score value 878B for "subject 2-2" is 58%, and falls within a percentage range of 50-60% that is indicated with a patterned background. In one example, particular patterns deemed to be better at drawing an operator's attention may be assigned to lower score ranges because the subjects with those scores likely require more attention and help than other subjects.

The subject(s) summary table 870 also includes tools in a search function 871, a selection option 873 for each entry 869, and an expand option 875. The search function 871 can enable a user to search for a particular subject by entering the subject's name, or a portion thereof. The selection option 873 provides multi-entry (subject) functionality. In one example, an operator could select several entries before or after drafting a message in a text entry box 892 found with a messaging module 890 when the messaging sub-menu 452 is expanded. Once the message is drafted and all selection options 873 for subjects an operator wants to communicate with are selected, a user of the dashboard 400 need only select the send option 894 for that message to get sent to subject that was selected.

In another example, the selection option for more than one entry 869 can be selected so that the corresponding entries get expanded when the expand option 875 for only one of the selected entries 869, is acted upon (e.g., click using a mouse or some type of pointer). An entry 869 can be expanded to display a detailed movement progress report using a respective expand option 875. Another way to have this type of report displayed includes selecting a detail option 867 found in the navigation menu 401 next to the summary option 864 for each subject listed for a selected operator.

Expansion of one the entries 869 can cause a detailed progress report 880 to be displayed underneath that entry 869 as shown in FIG. 8C. The detailed progress report 880 may include one or more clinician/operator focused designated movement summary panels 882 ("operator panels 882"). As shown in FIG. 8C, each of a first, second, and third operator panel 882A, 882B, 882C includes a movement ID section 820, a compliance section 830, and a results section 840 similar to the subject panels illustrated in FIGS. 8A and 8B.

FIG. 8C illustrates two types of subject specific progress reports with individual entries 869 in the summary table 870, and the detail progress report 880. Either type of. report can be accessed by selecting the summary report option 866 or the detail report option 867 as provided in the subject(s) review sub-menu 860.

In addition, as shown, a third selectable option is provided for each selectable subject found in the subject(s) review sub-menu 860—a movement analysis option 868. In one example, selection of the movement analysis option 868 can cause graphical analysis of a subject's performance of the designated movements included in their respective movement plans, similar to the subject results modules 465, 467 displayed AEC 407 illustrated in FIG. 4B. These modules may present graphs that compare a subject's movement to a movement model to which the wearable devices are calibrated and deliver feedback based on. In this respect, a clinician or operator may be able to pinpoint exactly which portion of a designated movement may be causing the subject difficulties. In turn, the operator or clinician may be better able to modify a designated movement, provide target instructions for a current or modified version of the designated movement, or assign the subject a new designated movement that the operator or clinician believes will be more effective in helping the subject achieve their goals and/or obtain an optimal movement capability.

In yet another example, a system according to the present disclosure can provide for a subject's tracked assessment movement to be recreated in three-dimensions via a graphical or even physical model. More specifically, a functional three-dimensional model of an entire human body or separate body parts can receive movement data from (1) the wearable devices capturing a subject's movement via wireless electromagnetic wave; or (2) any electronic media that receive movement data from the wearable devices. Assuming the functional model includes all the necessary electronic and mechanical components required, it can then replicate a movement performed by a subject. In addition, the functional model may also be used to record the movements performed by a subject that can later be exhibited or executed at any playback rate. The functional model may be locally or remotely hosted, whether at home, office, clinics, etc. Use of a functional model according to any of the methods described above can help with an assessment of a subject, and/or improving or reducing pain experienced during all of the physical movements of a subject wearing the wearable devices of the present disclosure.

In another example, the subject(s) review mode 860 may include a Live mode option (not shown), that a clinician or operator can select to start a video conference session with the subject and/or monitor a subject's performance during a movement session real-time. In one example, selecting the live sub-mode can cause a new live review console to be generated and displayed in the console window 403. The live review console can include modules displaying determined actual performance values for tracked movement parameters with graphs, such as graphs 466, that are updated continuously as a subject performs their designated movements. In another example, the graphs in the live review console can include a comparison graph that is progressively generated as the real-time graph is generated in the module. Either graph may be overlaid on top of the other and together can show real-time deviation therebetween.

Figure 9:
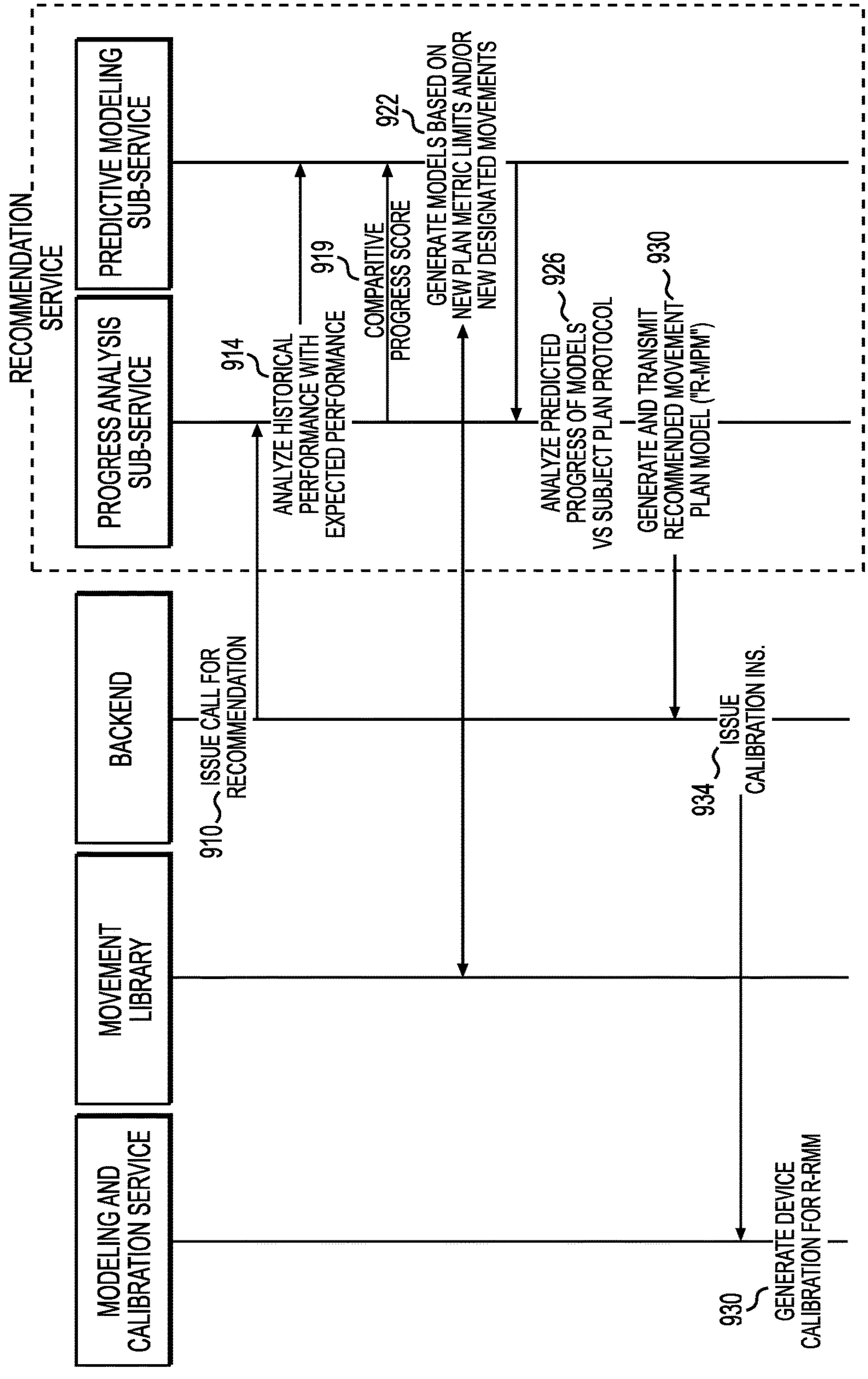
FIG. 9 illustrates a sequence diagram of an example method for determining a recommendation for modifying a movement plan for a subject.

FIG. 9 illustrates a sequence diagram of an example method for determining a recommendation for modifying a movement plan for a subject.

At stage 910, the backend can issue a call to a progress analysis sub-service implemented by the recommendation service.

In stage 914, the progress analysis sub-service can analyze the subject's historical performance, and compare it with an expected performance, and optimal performance, and/or an average performance by other subjects having similar conditions and plans. Information about the expected performance can be provided by the backend as previously determined by the modeling and calibration service as part of the assessment or any subsequent analysis or modification of the subject's plan. Information regarding optimal and average performance may be maintained by the recommendation service or obtained from an external source.

In one example, an example method can include determining a comparative progress score in stage 919. The comparative progress score can be determined by applying the same scoring methodology to information provided with respect to the expected, optimal, and average performance data and comparing those scores to the progress score determined in stage 726.

At stage 922, a predictive modeling sub-service can generate movement models based on new plan parameter metrics, limits, and exercise. Can be based on a current movement plan if continued, and different movement regimes obtained from an external source or otherwise accessible by the recommendation service. These other plans may be similar with respect to subject condition, but differ with respect the designated movements. The predictive modeling sub-service may select these different plans based on matching a progress report or score these different plans to those of the current plan, and those of the expected, average, and optimal cases analyzed in stage 914. The actual models may be generated by looking up designated movements from these different plans in the movement library.

In practice, over time, the predictive modeling sub-service may be implemented to identify a small number of core movements from a set of designated movements that result in optimal outcomes more often than the other movements within the original set. This is particularly useful in a physical therapy setting where a clinician (e.g., a physical therapist) may provide a subject (e.g., a physical therapy patient) 10 to 15 designated movements (e.g., physical therapy exercises) as part of a plan (e.g., a treatment plan), to complete at home between movement sessions (e.g., physical therapy appointment).

Thus, in addition to the wearable devices of the present disclosure can being used to improve the accuracy of an assessment, use in a training scenario can markedly increase the effectiveness of a treatment or long term care associated with physical challenges many human subjects face including, but not limited to, an abnormal human gait, hand and leg tremors, fall prediction, slowness of movement, difficulty maintaining a particular physical form, etc.

According to an aspect of the present disclosure, the wearable devices that this subject uses at home will transmit how the subject preforms those 10 to 15 designated movements as previously discussed. Either a tracking agent for one or more wearable devices the subject uses, or a management agent on a clinician's user device, or a management service executing on the backend can chart the subject's overall progress versus their performances for each of the designated movements. In turn, either of the agents or the management service can identify the designated movements that were more effective at contributing to the subject's progress. The patient's clinician can also be notified of the more effective movements when a progress report for the subject is request, for example, through a C-UI on a user device.

In one aspect according to the present disclosure, as these effective movements are identified by either of the agents or the management service, predictive models incorporating more of a focus on the particularly effective designated movements can be generated and compared to each other, and the subject's actual movement plan and progress. As the subject progresses through a long-term movement plan, their progress can be tracked against these continuously updated models. These comparisons, which may inherently include that subject's progress and overall outcome, can be stored in repository, and accessed during future assessments and subject progress reviews.

According to another aspect of the present disclosure, as effective movements are identified by either of the agents or the management service, predictive models incorporating more of a focus on the particularly effective designated movements can be generated and compared to each other, and the subject's actual movement plan and progress. As the subject progresses through a long-term movement plan, their progress can be tracked against these continuously updated models. These comparisons, which may inherently include that subject's progress and overall outcome, can be stored in repository, and accessed during future assessments and subject progress reviews. Any of a management service of the backend, the predictive modeling sub-service, the modeling and calibration service use this historical, predictive, and comparative information as sources of evidence and points of comparison to base recommendations. More specifically, the system can use this data collected, which can include treatment results, to identify approaches (or combinations of approaches) previously applied to subjects that received matching or similar initial assessments and/or intermediate progress reports, and yielded specific levels of improvement and/or levels of performance. So, for example, where a subject and their condition involve a physical therapy patient and a shoulder injury, the patient may be sent home with seven exercises including front and side raises, stretch and hold movements, and the like. The patient's progress can be tracked for all of the exercises. Over the course of the first three weeks the treatment plan (movement plan), the patient may perform at an average or below average level, as determined by the recommendation service using one or more performance value benchmarks for movement parameters.

For example, the subject's performance over time with respect to a velocity (how fast or slow) the subject raised their arm, a range of motion in an elbow of the arm, and/or how much the elbow fluctuated versus a shoulder, could be compared with the subject's projected progress for their movement plan, and the historical, predictive, and comparative data as mentioned above. Using these comparisons and the subject's condition, the recommendation service can identify and model different modifications to the subject's plan to make a recommendation. For example, a recommendation could be to do more or less front arm raises as compared to the side arm raises.

In stage 926, the progress analysis sub-service can analyze the predicted progress of the models generated in stage 922 with respect to a subject plan protocol. The subject plan protocol may include specific elements such as goals, financial limitations, subject preferences for plan intensity, scheduling requirements and limitations, as well as insurance related permissions and limitations.

At stage 930, the progress analysis sub-service can generate and transmit a recommended plan movement model ("R-PMM") to the backend. In one example, more than one recommendation can be provided and present to a clinician, who then selects a single recommendation to be transmitted to the backed.

In stage 934, the backend can issue a calibration instruction to the modeling and calibration service. In response, the modeling and calibration service can generate a calibration specific to the R-PMM and wearable devices used by the subject in stage 938.

Figure 10:
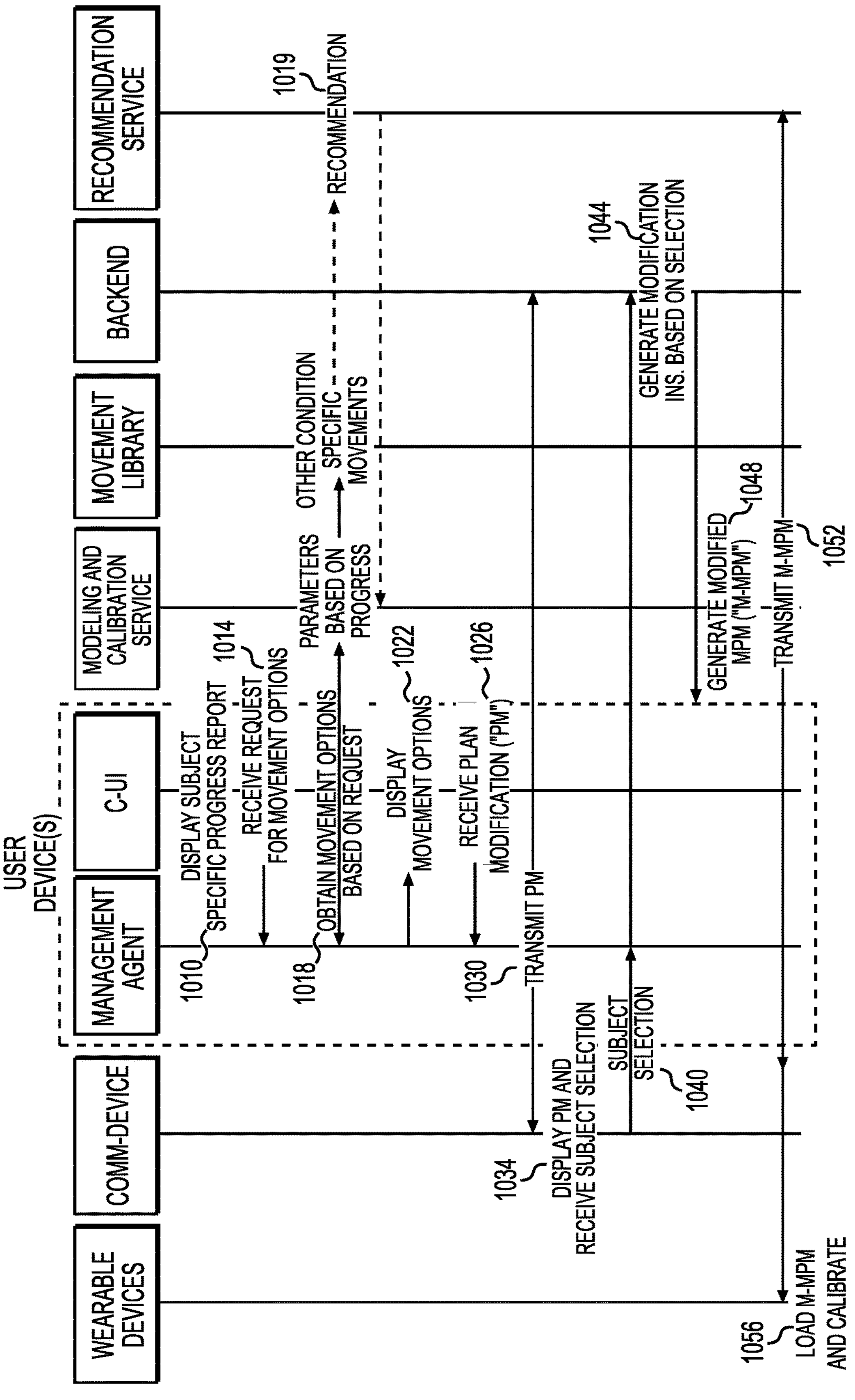
FIG. 10 illustrates a sequence diagram of an example method for modifying a movement plan for a subject.

FIG. 10 illustrates a sequence diagram of an example method for modifying a movement plan for a subject.

At stage 1010, progress report for a specific subject may be displayed on the CUI. The subject may be selected through the C-UI which is currently displaying progress scores/summaries for a group of subjects associated in the system to a clinician or operator using the user device.

In stage 1014, request for movement options can be received through the C-UI. The request can be made by the clinician, who after reviewing the subject's detail progress report, believes a modification to the subject's movement plan should be made.

At stage 1018, the management agent can receive movement options based on the request. In one example, the management agent may pole the modeling and calibration service for adjusted movement parameters (frequency, reps, sets, range of motion) for the designated movements that are included in the current movement plan. The modeling and calibration service can adjust performance values for these movement parameters by matching the subject's progress to that of another subject having a similar condition, progress score, and plan. In another example, the management agent can obtain different training movements from the movement library based on the subject's condition. In one example, these new movements can be generally selected from a catalog of movements associated with the subject's condition or goals, or similar conditions or goals.

In another example, the movements provided can be obtained from the recommendation service be provided in stage 1019. The recommendation service, can implement the method of FIG. 9 in response to a request from the management agent.

At stage 1022, the management agent can cause the C-UI to display the new movement options. The C-UI can display a similar dashboard console as the example in FIG. 4C. Subsequently at stage 1026, the management agent can receive a plan modification ("RM") received from the clinician by the user device through the C-UI. Then at stage 1030, the RM can be transmitted to a subject's comm-device and the backend.

Stages 1010 to 1030 of the method of FIG. 10 can be implemented by a clinician reviewing a subject's progress report in a clinical setting when the subject is at a facility to perform a movement session, for example at a physical therapy appointment. In such a scenario, the RM can be transmitted to the backend for storage in the subject's history since it will be the next version of the subject's movement plan as designated.

In another example, the clinician may be at the facility or in a remote location reviewing the subject's progress report while not in the presence of the subject, for example while a clinician is at home. In another example, the user device may be a personal computing device on which the clinician is reviewing the subject's progress report while commuting for example, to the facility before a movement session with the subject, or from the facility after a movement session with the subject, or any other time.

In the situation where an RM is being transmitted while the clinician is not with the subject, an approval process may be implemented wherein the subject is essentially given the choice to accept the RM or continue with a current movement plan. As illustrated in FIG. 10, such a process can include the RM being displayed on a subject's comm-device at stage 1034. The comm-device can be a personal computing device such as a phone, tablet, or laptop. In another example the comm-device may include a web application or other type or network accessible service, such a portal for a clinician website.

The subject can receive a notification that an RM has been sent and view the specifics of the RM in stage 1034, and select whether to accept, decline, or send a message to the clinician about the RM. The selection made or message sent by the subject can be transmitted to the management agent on the user device in stage 1040. Where the subject accepts the RM, the management agent will forward the notification to the backend as part of stage 1040. In response the, backend will issue and transmit a modification instruction to the modeling and calibration service at stage 1044 similar to stage 350 of the exemplary method illustrated in FIG. 3. Also like the method shown in FIG. 3 with the PMM, the modeling and calibration service generate a modified PMM ("M-PMM") in stage 1048 and transmit the same to the wearable devices and the backend in stage 1052. As a result, the wearable devices will recalibrate based on the M-PMM in stage 1056.

Figure 11:
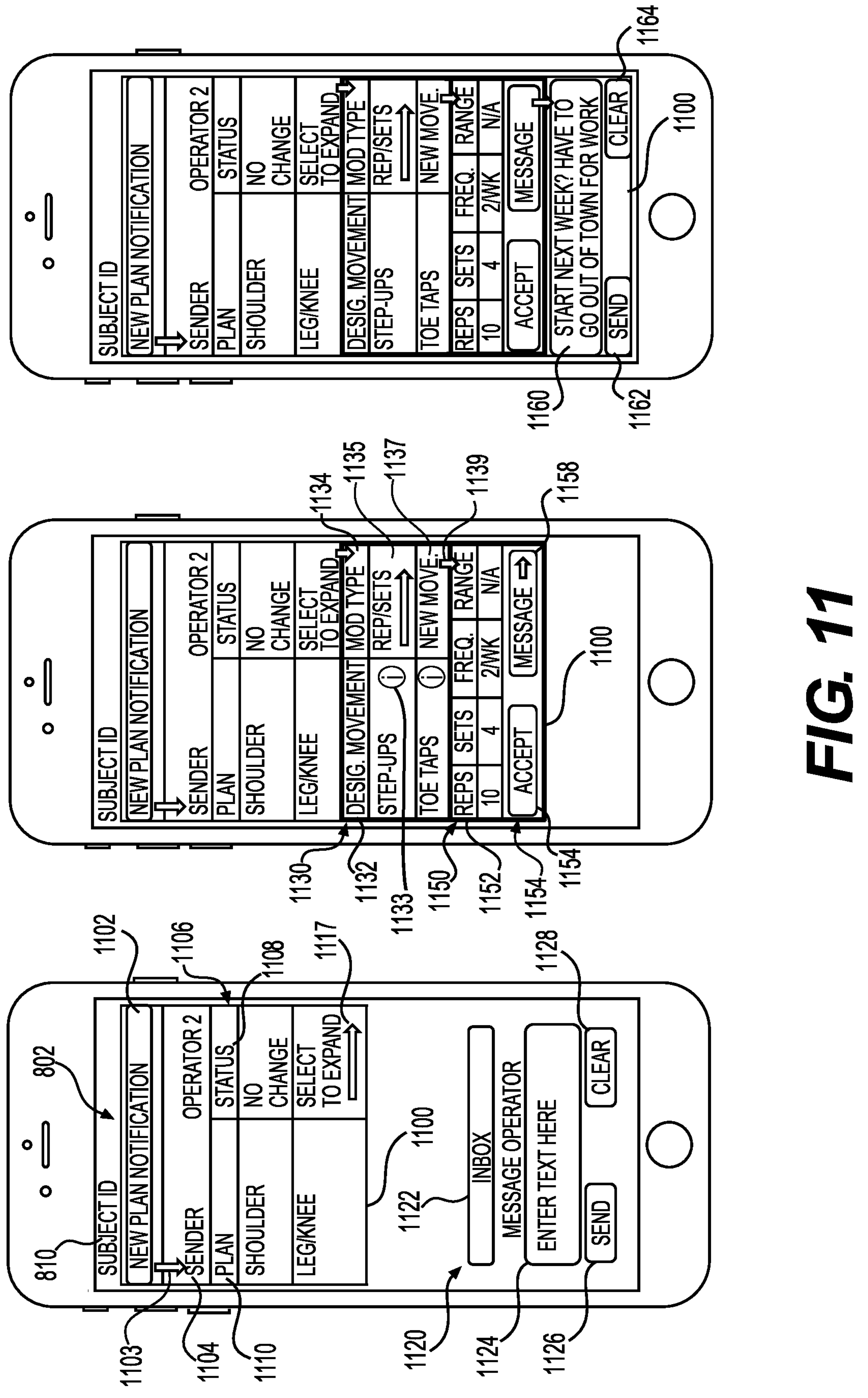
FIG. 11 illustrates an exemplary UI for receiving and responding to a modification in a movement plan.

FIG. 11 an exemplary UI for receiving and responding to a modification in a movement plan. As shown, the S-UI 802 displays the subject ID 810, new plan notification window 1110, and a message center 1120.

The message center 1120 can be used by a subject for general communications with their operator or clinician. In one example, a subject select an inbox option 1122 to look as previous or new messages from their operator. A text box 1124 and send option 1126 can be utilized to send quick, instant message-type messages. The subject could use the message center 1120 to request more information about a particular movement, schedule a supervised training session, communicate the completion of an unsupervised training session, etc. In another example, the message center 1120 could cater to particular types of communications are that are movement or movement plan specific. Those messages may only persist in the new plan notification window 1110 through an option (not shown) that allows the subject to review past plan modifications.

In practice, a subject can receive a new plan notification 1102 any time a plan for the subject's next individual movement session is changed from a previous session plan. Upon opening the plan notification window 1110, the subject can select a notification expand option 1103 to view a sender 1102 of the notification, and plan(s) summary table 1106 showing a status 1108 of each plan 1110. Each movement plan that has been modification or received a suggested modification can include a modification detail option 1117 can be selected in order to view plan modification summary 1130.

The plan modification summary 1130 may include a table of entries that identify a designated movement 1132 and a type of modification 1134. As shown in FIG. 11, a first entry 1135 of the plan modification summary 1130 indicates a modification of movement parameters (i.e., performance values for repetitions and sets) for a step-up movement of a leg/knee movement plan is available to view. On the other hand, a second entry 1137 indicates a new designated movement for the leg/knee movement plan is available to view. For each entry 1135, 1137 a selectable information option 1133 is displayed. When selected a new when showing detailed instructions and/or providing videos or other resources may be displayed. The instructions, video, and other material may all be directed towards instructing a subject how to a movement associated with the information option 1133 that has been selected.

In FIG. 11, an expand option 1139 for the second entry 1137 has been selected, resulting in a display of movement modification summary 1150 in the S-UI 802 below the second entry 1137. As shown, the modification summary 1150 includes a table with columns of movement parameters 1152 for a new toe tap (designated) movement that may be added to the subject's movement plan. In the particular example shown in FIG. 11, the new movement of the second entry 1137 is not yet a part of the leg/knee movement plan.

The movement modification summary 1150 includes an authorization section 1154. This indicates that the modification may have been suggested by an operator reviewing the subject's progress between supervised training sessions, as opposed to at the conclusion of a supervised training session in which the operator is able to observe the subject's actual capabilities. As such, the subject is given the option to accept the modification using an accept option 1154 provided in the authorization section 1150. Selecting the accept option 1154 will initiate the calibration process for the user's wearable devices as with stages 1030 to 1056 of the method of claim 10.

Alternatively, if after reviewing the movement modification summary 1150, the subject does not feel they are ready for a new movement, a message option 1158 can be selected to display a message section 1160 that is "local" to designated movement it appears under. A textbox for the subject to write their message, and end and clear options 1162, 1164 options for the subject to send a message to their operator specific to that movement modification. In one example, the operator may receive a message with information in a subject line that identifies the subject, movement plan, and movement modification. A body of the message could include the same information as in the subject line, plus movement parameters and corresponding performance values for the modified movement, and the text of a message the subject sent with the message section 1160.

In one example, a subject may have a movement plan where they preform the same movements for three weeks, and then the movements are changed automatically as part of a longer-term movement plan. At those three-week marks, the subject may receive a new plan notification 1102 on the comm-device 800 through the S-UI 802, and view the details of the modification through the S-UI 802 in plan and movement modification summaries 1130, 1150 of a notification window 1100 as described below with reference to FIG. 11.

In other examples, a situation may arise in which a clinician or operator aiding a subject in their recovery, rehabilitation, or performance training, has determined the subject could benefit from an unplanned modification to their movement plan. There are several scenarios that could lead to the above situation. In one exemplary scenario, an operator or clinician can make the determination described above during a supervised training session, and discuss new movements or new performance values for movement parameters with the subject during or at the end of that session. Following the supervised training session, the operator can select in the dashboard 400, an option for a plan modify mode 411*b* provided under the plan builder option 410 of the mode sub-menu 410 illustrated in FIG. 4C.

A console including plan building modules similar to the plan building modules 481, 482 for the plan setup console 409 shown in FIG. 4C, can be displayed in the console window 403 in response to the selection of the plan modify mode 411*b* for a particular subject. These modifying modules can include the designated movements and movement parameters (populated) of the subject's current movement plan. Like the modules 481, 482 in FIG. 4C, these modifying modules can include selecting and incrementing options similar to the options 488, which the operator can use to add movements, replace or remove current movements, or modify the current movements. In this particular scenario the subject's movement plan is changed/updated unilaterally by the operator, and the subject will receive a new plan notification 1102 that provides the new movement plan. Hence, the authorization section 1150 may not be displayed when a subject selects expand option 1139 for an entry in the plan modification summary 1130. The movement plan may have already been implemented from the standpoint of a calibration of the wearable devices.

In another exemplary scenario, an operator or clinician may determine a plan modification is needed upon reviewing the subject's progress reports following supervised training session in which modifications were not discussed, or after an unsupervised training session by the subject, or seeing that the subject is not actual doing unsupervised training sessions. In this scenario, the subject would be presented with the authorization section 1150 when the movement.

As a result, the operator or clinician may devise a modification to the subject's plan by adding a new movement, increasing a range of motion for performance of another movement, decreasing, or increasing the frequency, sets, and/or reps the subject it to perform of one or more movements.

Figure 12:
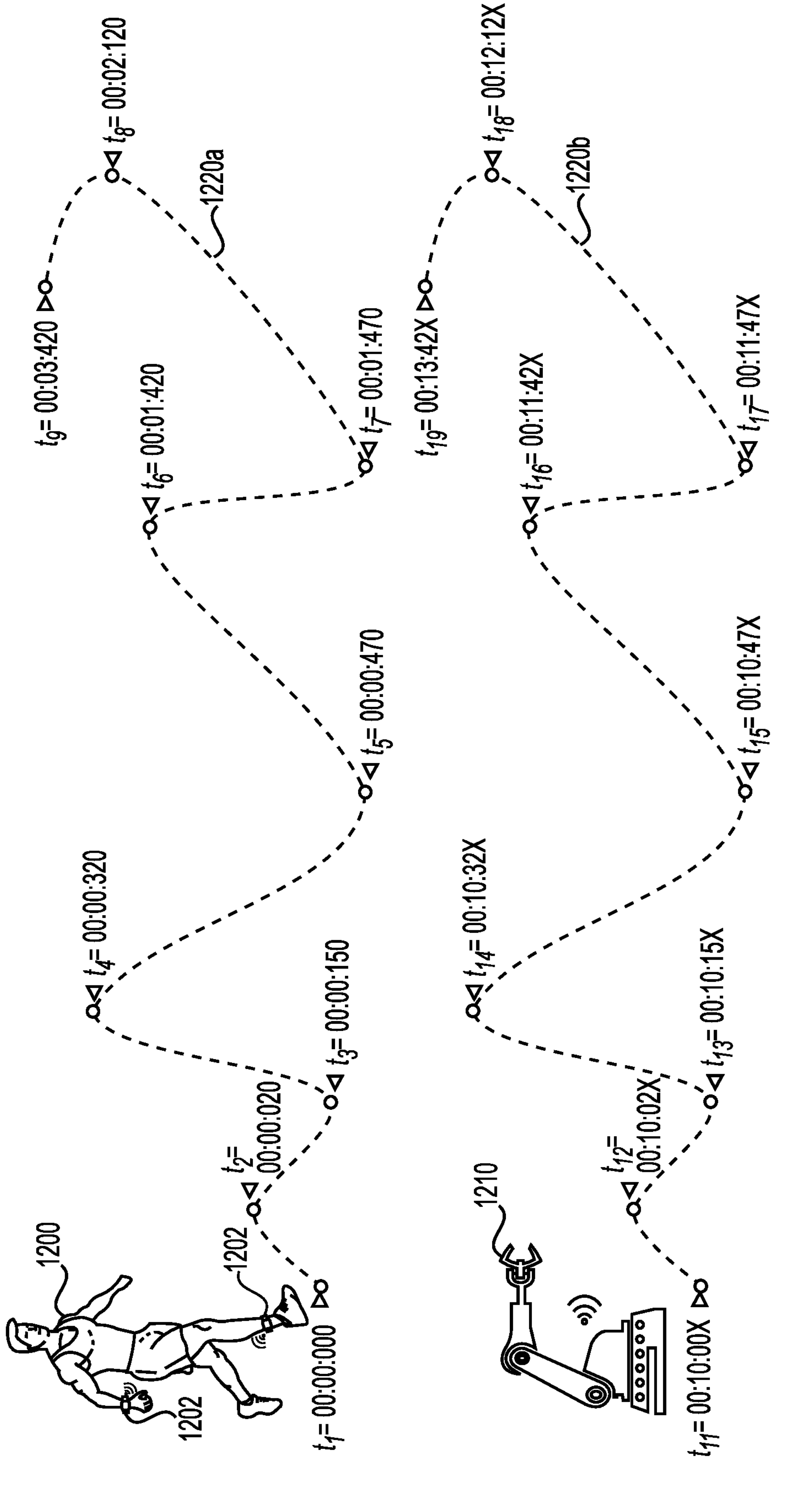
FIG. 12 illustrates an exemplary implementation of a system for guiding a physical movement according to an aspect of the present disclosure.

In one example, after a subject has performed a movement session at an operator or clinician's facility, modifications to the subject's plan may be made unilaterally by the operator or clinician using the plan builder sub-menu 410. In particular, the operator can select the plan builder modify option 411*b* as shown in FIG. 4C, to make changes to the subject's movement plan which may have been discussed during a supervised movement session. In another example, entered a plan builder modification console FIG. 12 illustrates an exemplary implementation of a system for guiding a physical movement of a subject according to an aspect of the present disclosure. In FIG. 12, there are depicted a first subject 1200 ("person 1200") and a second subject 1210 ("automated device 1210"). Using a system and wearable devices 1202 of the present disclosure, movement of the automated device 1210 can be guided by the wearable devices 1202 using the movement of the person 1200 as model.

As shown in FIG. 12, a movement path 1220*a* starting at time $t_1$ and ending at time $t_9$ is associated with the person 1200. As shown, this movement path 1220*a* is not uniform and review of the time values $t_1$ to $t_9$ reveals that a speed of the person 1200 during the movement on the path 1220*a* was not constant.

Also shown in FIG. 12 is an automation device 1210 (e.g., a robot) that moves along a movement path 1220*b* matching that of the person 1200, from time $t_{11}$ to $t_{19}$. The illustration of the path 1220*b* for the automated device 1210 is presented as an example of how the wearable devices 1202 of the present disclosure can be used to learn and transfer movements from a human subject (e.g., a human gait) to an automated device such as a robot.

According to an aspect of the present disclosure, the wearable devices 1202 being worn by the person 1200 are configured to track a gait of the person 1200 and other physical body movements. In one example, the wearable device in FIG. 12 can also be configured with a programming language of the automated device 1210 and learn how it moves. The devices may be capable of converting the processed information from its sensors into a series of commands that the automated device 1210 can process and operate based on. In particular, the devices may be able to do this with data output from stage 560, or data in the method of FIG. 6 after at least stage 630. In another example, conversion can occur at the automated device 1210 through a backend supported service installed on the automated device 1210. Through this service, the automated device 1210 can learn and execute its movements from the wearable device output from the stages previously mentioned.

When the automated device 1210 executes the series of commands, from a conversion by either the wearable devices 1202 or the automated device 1210, it will be controlled or otherwise caused to follow the same path 1220*a* as the person 1200. Information from the wearable sensors, whether converted or unconverted, may be transferred to the automated device 1210 by any means discussed herein, particularly with respect to the various methods in which the wearable devices 1202 can communicate with each other. In another example, communication between the automation device 1210 and the wearable devices 1202 may happen by any electromagnetic wave. In addition, cameras, in conjunction with other obstacle detection sensors, may simultaneously be used in localization and mapping processes by the automated device, based on the information from the wearable devices 1202. In yet another example, information from the wearable devices 1202 could be utilized by the automation device 1210 in its use and control of onboard terrain mapping equipment, such as lasers or other electromagnetic wave devices, in order to cause the automation device 1210 to traverse the path 1220*a* by the person 1200 real-time.

As shown in FIG. 12, a time difference between $t_1$ and $t_{11}$ is ten minutes and X thousandths of a second, where X is a predetermined time delay. However, as discussed above, because the combination of condition dependent operations it performs on raw sensor data, the wearable devices 1202 of the present disclosure are extremely accurate, efficient, and fast in determining the positions of the moving portions of the person 1200. As a result of the computational capabilities of the wearable devices 1202, the variable X, if undefined, represents an entire time delay between any movement of the subject 1210 and a corresponding movement of the automated device 1210. Thus, the automated device 1210 could be directed to follow the person 1200 with a delay between their respective movements on a scale of milliseconds—an example of real-time path following.

Many types of automated devices can be configured to perform human tasks. Using the information about the movement of the person 1200, the automated device 1210 can be trained to navigate based on a human gait. Taking this a step beyond translational movement, the person 1200 could make a lifting and hold motion with their arms, and this could be converted into a corresponding raise and hold motion of one more appendages (e.g., arms) installed on the automated device 1210. Thus, the wearable devices 1202 may be used to control, without any supervision, the automated device 1210 to lift loads. Depending on the construction of the automated device 1201, these loads could range from few kilograms to thousands of kilograms.

In another example, the lifting motion could be combined with the feature of the automated device 1210 being caused to follow another subject wearing the wearable devices 1202 to reach a particular destination. Thus, the automated device 1210 could be utilized to lift a load and carry that load to a destination by following a path 1220*a* of the person 1200. All the person 1200 would have to do is walk and lift their arms, and the automated device 1210, executing the commands generated from the wearable devices 1202, could lift and move a load the person 1200 would be incapable of carrying. Further, the above can be accomplished without the use of a radio beacon or other transmission, signals from a global position system ("GPS"), triangulation or other similar methods.

In addition to the advantages of accurate and real-time execution of movements, the automation device 1210 able to store commands or series of commands, and have those commands or series called at scheduled times. Thus, with the wearable devices 1202 sending information, the automation device 1210 could be used to "memorize" the movements performed by the person 1200, and execute those movements later in time. In one example, this capability could be utilized while the automation device 1210 was operating in an autonomous mode without supervision of some time (e.g., human).

Figure 13:
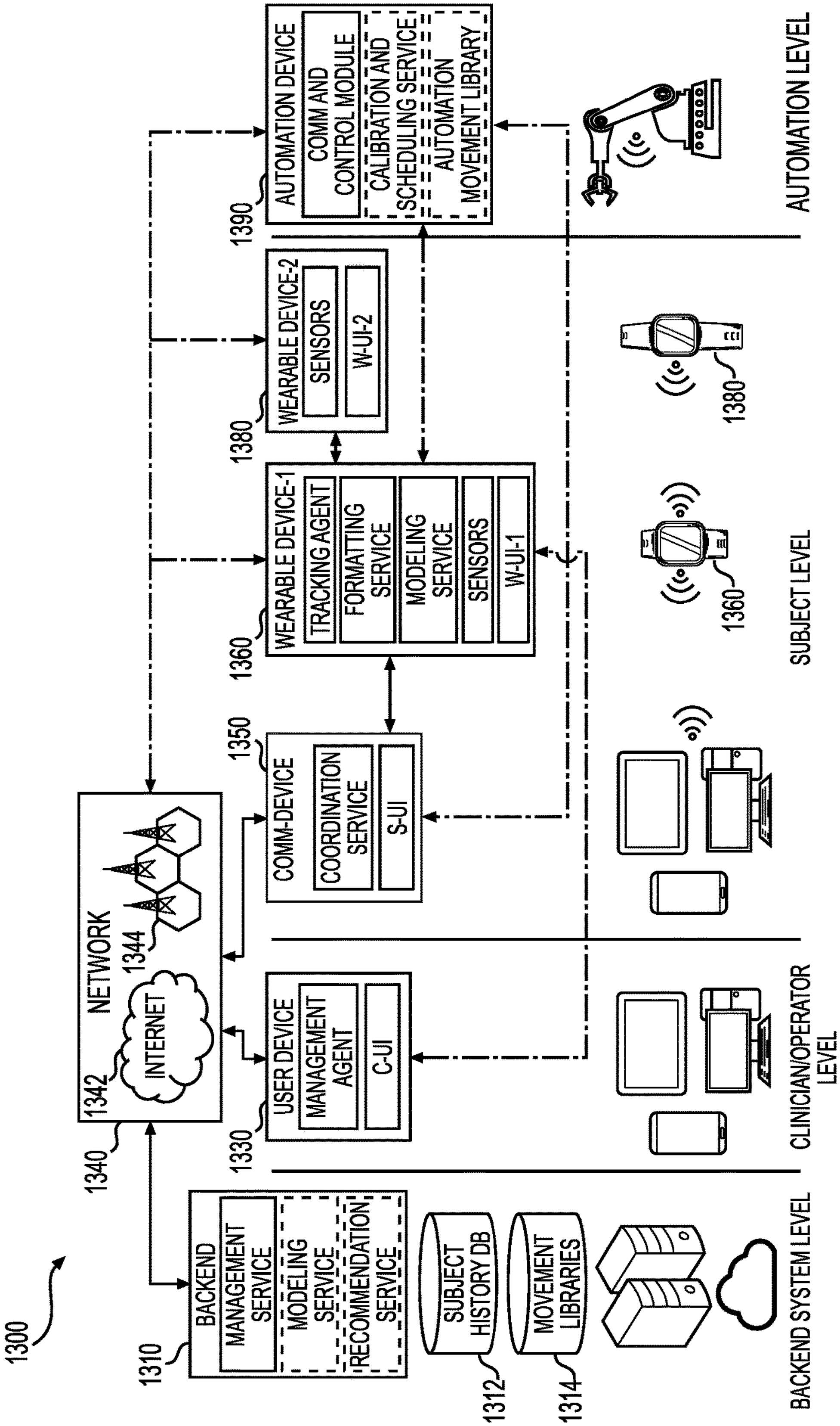
FIG. 13 is an exemplary illustration of system components for determining a subject-specific movement model and guiding a physical movement of the subject based on the model.

FIG. 13 is an exemplary illustration of system components 1300 for determining a subject-specific movement model and guiding a physical movement of the subject based on the model. The system components 1300 can include a backend, one or more user devices 1330, one or more comm-devices, a first wearable device 1360, a second wearable device 1380, and an automation device 1390. System components can be in communication through a diversified network 1340 that includes different sub-networks such as the internet 1342 and a cellular network 1344. In addition, the user device 1330, comm-device 1350, first wearable device 1360, second wearable device 1380, and automation device 1390 can be in direct communications with each other via the wireless communication protocols already mentioned (e.g., Bluetooth, Bluetooth Low Energy, Zigbee, or a Wifi chip).

In one example, the user device 1330 and the comm-device 1350 are in communication with the diversified network 1340 through an internet or a cellular connection. The remaining devices receive information (e.g., movement models, calibrations, messages, movement plans and plan modifications, etc.) through a location/proximity dependent connection with either the user device 1330 or the user device 1350. For example, in the case of a plan modification being transmitted to a subject from an operator working remotely, the authorization process would occur on with the comm-device 1350. Once accepted, the comm-device 1350 could reach out to the backend 1310 or the user device 1330 for a new or updated movement model and calibration, and transmit it to the first wearable device 1360.

In another example, one or both of the wearable devices 13 60, 13 80 can include a Wifi chip or cellular connectivity. With the example situation just mentioned, the comm-device 1350 could make a call for the model/calibration through the diversified network 1340, or instruct the wearable devices 1360, 1380 to issue a call through the same. Then, the required information and models may be transmitted to the wearable devices 1360, 1380 through the diversified network without have to pass through the comm-device 1350.

The system components are illustrated in levels to place end user roles into context with how the system components communicate and operate to help end users fulfill those roles. In one example, the backend 1310 can include one or more physical servers, and or cloud-based virtual servers that support the services and agent operating on other system components. In addition, the backend 1310 can be provided with software-based tools through which an administrator can monitor, manage, update, and modify aspects of, for example, a tracking agent being implemented on one or more wearable devices.

The backend is part of a backend system level that supports the operations of services, agents, and applications being implemented on various devices. Such devices, like the user device 1330, and in some cases the wearable devices 1360, 1380 if loaned out to a subject, may be managed devices that the backend 1310 has direct control over. Other devices, such as the comm-device 1350 is likely to be a personal device of and owned by, the subject who uses it. Accordingly, the coordination service of the comm-device 1350 may have certain permissions and be configured to generate a C-UI on the comm-device 1350, but ultimate control of the comm-device 1350 lies with the subject.

Each of the services agents running or otherwise being implemented on the backend system, clinician/operator, subject, and automation levels can be part of or configured to be compatible with a software product that is at least partially provided by the backend 1310. The software product can provide tools for system management, communication and coordination, modeling, data formatting, tracking movements, generating components of and supporting selections made through a UI, and any other relevant features.

The backend 1310 may be supported on the backend system level by a subject history repository 1312 and a movement library repository 1314. According to an aspect of the present disclosure, each of these repositories can be a database that is hosted on one or more servers. In another example, one or both repositories 1370 can be a cloud-based storage component that is part of an infrastructure that includes various computing devices (e.g., user devices and wearable devices) and cloud-based services interconnected by local networks, wide-area networks, wireless communications, and the Internet.

Section II. Generation and Use of Signatures

Figure 14:
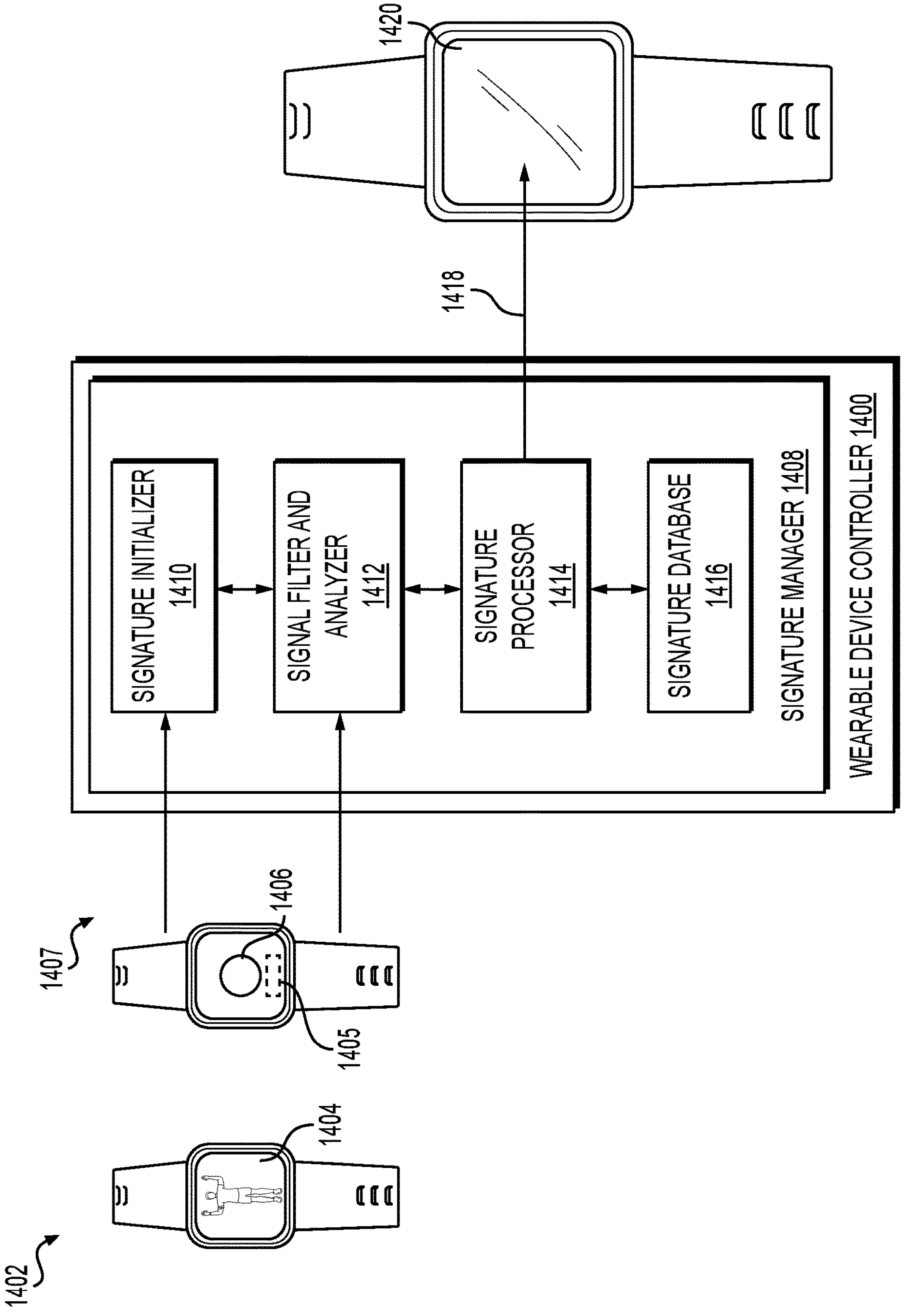
FIG. 14 is a block diagram showing an exemplary configuration of a wearable device controller.

FIG. 14 is a block diagram illustrating an exemplary configuration of a wearable device controller 1400 that is incorporated in the wearable devices described herein, including wearable devices 1402 represented in FIG. 14. Wearable device controller 1400, also referred to herein as "controller 1400," may receive inputs 1407 and generate outputs 1418 to facilitate functions related to movement signatures.

As used herein, a "movement signature" refers to data reflecting any movement, including an exercise or training movement, that is performed by a user, with at least some movement data generated with the movement being recorded (e.g., by storing data from one or more sensors recorded during an actual movement, the data forming an electronic representation of the movement). The signature may represent an exercise movement, a gesture, or a novel or "custom" movement (e.g., a movement not associated with exercises that are stored in a memory associated with the wearable device). A movement signature can involve one body part or multiple body parts. The movement signatures described herein are different from predetermined movements that are created without the use of a subject actually performing the movement.

A movement signature may include data other than motion data. For example, physiological data may be included with movement data in a signature. Exemplary physiological characteristics that may be reflected in the physiological data are described below.

In some examples, a physiological signature may be recorded instead of a movement signature, a physiological signature being recorded without recording movement data, even when movement is performed as part of this signature.

Even when a movement signature represents a desired motion, such as a motion performed by a trainer or clinician, the movement signature might not represent a flawless performance of the motion. Similarly, physiological data in a signature may not represent ideal or perfect physiological traits. This is because these signatures correspond to data generated with actual motion data of the subject, in contrast to idealized motion generated with simulation software, for example.

Signatures may be recorded, as described below, with one wearable device, or a plurality of wearable devices operating in conjunction with each other. Movement signatures may be used to create a movement model, including the movement models described above, to modify these movement models, or as a mechanism for authenticating a user (e.g., the signature may act as a unique identifier for identifying a particular user or as an authentication).

Controller 1400 may include a signature manager 1408 configured (e.g., programmed) to perform signature recognition, signature generation, signature analysis, and signature modification functions, among others. While FIG. 14 represents an exemplary configuration of a single wearable device, in some embodiments the below-described functions may be performed by a different device (e.g., a non-wearable computing system) or plurality of devices (e.g., a plurality of wearable devices, a wearable device and a non-wearable computing system, or any combination thereof). For example, a first wearable device may be used to initiate the recording of a signature, while another device analyzes the movements for the signature, provides feedback, records the signature, etc.

Signature manager 1408 may enable controller 1400 to recognize, create, and modify signatures. If desired, signature manager 1408 may also be configured to modify the above-described movement models based on one or more signatures. Signature manager 1408 may include a signature initializer 1410, a signal filter and analyzer 1412, a signature processor 1414, and a signature database 1416. However, as noted above, one or more of these functions of signature manager 1408, such as signature database 1416, may be present on a different wearable device and/or on a different system such as external storage devices.

Signature initializer 1410 may be configured to determine when a movement corresponding to a signature has begun, or determine when a signature will begin in the future (e.g., via a timer). Signature initializer 1410 may also be configured to perform calibration processes, such as sensor calibration performed according to which body part a wearable device is associated with (e.g., is or will be placed on). In some aspects, signature initializer 1410 may be configured to receive signals (represented by arrows) that represent placement inputs 1404 and/or a signature recording inputs 1406, as described below.

Signal filter and analyzer 1412 may provide raw signal analysis functions, such as filtering. Suitable filtering may include, for example, a low pass filter, a high pass filter, a butter worth filter, or other types of filters. The filtering may be performed in the manner described above in Section I. Raw signals may be delivered to signal filter and analyzer 1412 via one or more sensors 1405.

Sensors 1405 may correspond to the above-described sensors, such as an accelerometer, gyroscope, and/or magnetometer. In some aspects, sensors 1405 may include physiological sensors that measure physiological parameters in addition to, or instead of, movement sensors. Examples of suitable physiological sensors include heart rate sensors, volume of oxygen ($VO_2$) maximum sensors, blood sugar sensors, temperature sensors, humidity sensors, and others. Heart rate and $VO_2$ sensors may facilitate measurement of instantaneous work (e.g., a measurement of current output measured in kJ/min, kJ/hr, watts, etc.), work capacity (e.g., a measurement of maximum output of the user over a period of time), or other physiological characteristics for a user. Temperature sensors may facilitate measurement of body temperature, while humidity sensors can generate signals that correspond to respiration rate, respiration pattern, sweating, and others. A movement signature or physiological signature may include one or more of these physiological characteristics (e.g., heart rate, breathing rate, breathing pattern, instantaneous work output, body temperature, sweating, etc.), or other characteristics.

Signature processor 1414 may be configured to recognize a signature. This may include correlating data from sensors 1405 (e.g., after filtering), and knowledge of the location (e.g., position on a limb) of the wearable device (e.g., as selected via placement inputs 1404) with an electronic representation of the kinematic chain or other physiology of the subject. For example, signature processor 1414 may recognize movement of a limb or other body part(s) of a subject in three dimensions based on the data from sensors 1405 and knowledge of the location of the wearable device(s).

Figure 18:
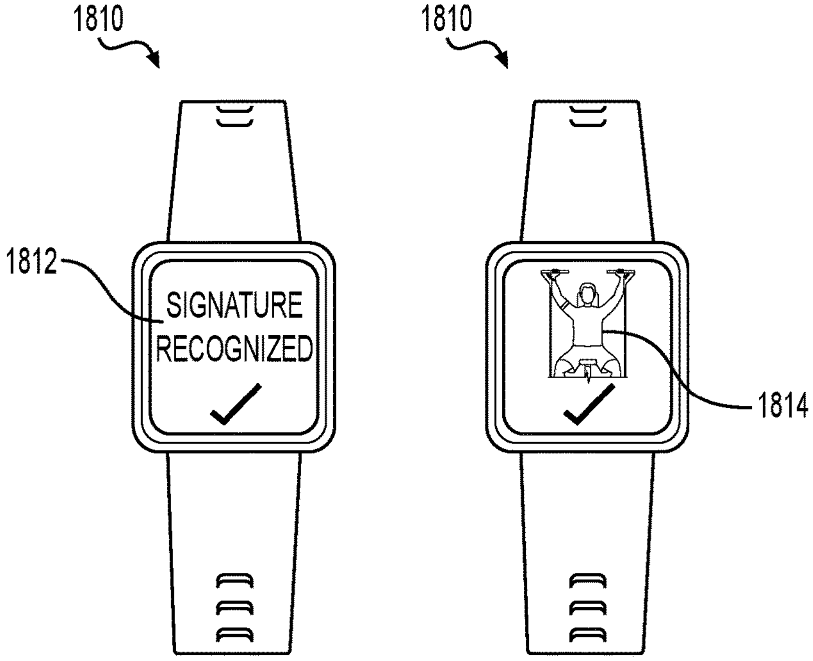
FIG. 18 is a view showing exemplary displays of a wearable device providing a notification indicating the recognition of a signature.
Figure 20:
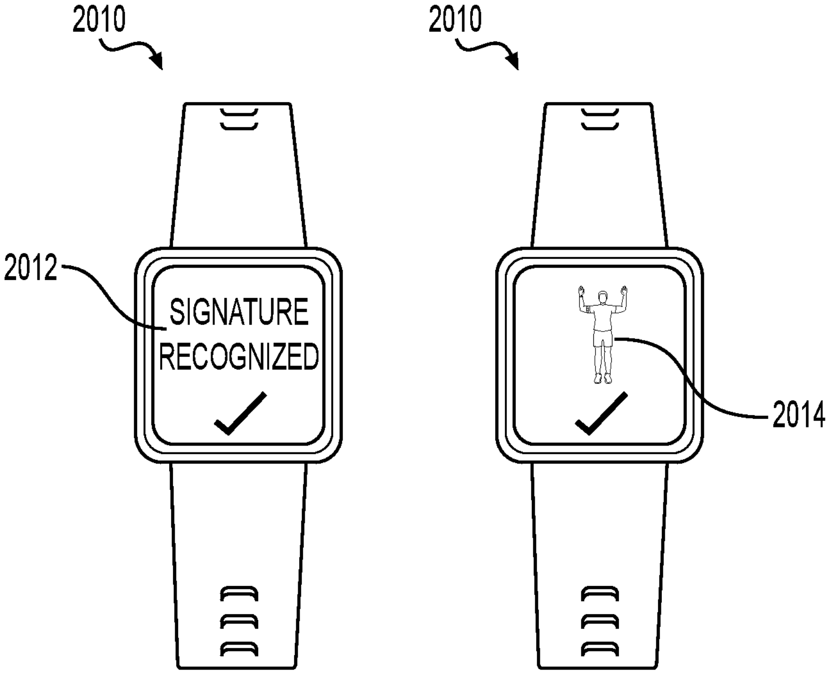
FIG. 20 is a view showing exemplary displays of a wearable device providing a notification indicating the recognition of a signature.

Outputs 1418 may be presented as a notification 1420 on the wearable device. Exemplary outputs of notification 1420 are shown in FIGS. 18 and 20, and are described below. Notifications 1420 may include an indication that signature recording has begun (e.g., as an image, sound, and/or vibration or other haptic), an indication that signature recording will begin after a predetermined time (e.g., as a visual, auditory, or haptic countdown timer), an animation representing a previously-performed signature, or feedback comparing the most-recent movement (including a current movement performed in real-time).

Figure 15:
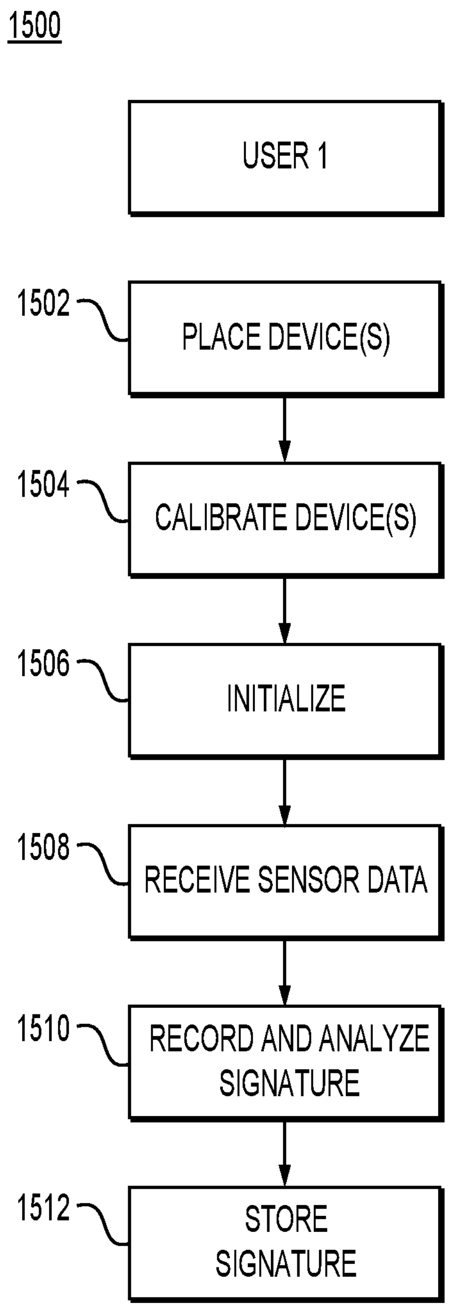
FIG. 15 is a flowchart of an exemplary method for generating movement signatures.
Figure 16:
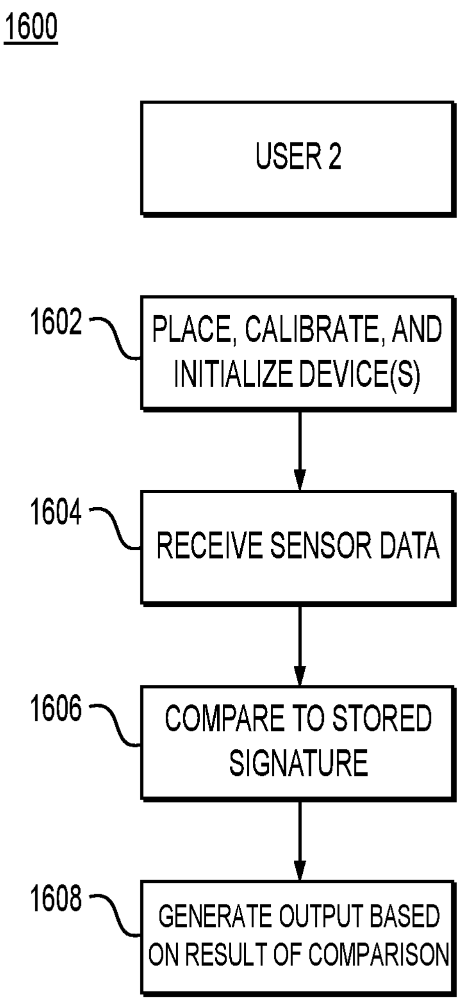
FIG. 16 is a flowchart of an exemplary method for analyzing movement signatures.

An exemplary use of the wearable device(s) of FIG. 14 for signature management will be described with respect to FIGS. 15 and 16. FIGS. 15 and 16 are flowcharts illustrating exemplary methods 1500 and 1600, respectively, for generating, modifying, or evaluating movement signatures. While methods 1500 and 1600 are shown as separate flowcharts performed according to movements of two users, user 1 and user 2, methods 1500 and 1600 may be performed as a single method. Further, user 1 and user 2 may be two different users, or may be the same user performing methods 1500 and 1600 at different times, or as part of a single performance. While the steps of methods 1500 and 1600 are shown in an exemplary order, as understood, the steps of one or both of these methods may be performed in a different sequence, simultaneously, and/or in a partially overlapping manner.

Methods 1500 and 1600 (FIGS. 15 and 16) will be described with reference to FIG. 14. A step 1502 of method 1500 may include placing one or more wearable devices on a user. This wearable device may correspond to the above-described wearable devices (e.g., wearable device 1402, shown in FIG. 14) and may be in any suitable form factor, such as the strap-based devices shown in FIG. 14 (e.g., a watch and an armband). While wearable devices are shown with screens, in at least some embodiments, one or more wearable devices may be a strap-based device without a screen, but including a housing containing one or more of the above-described sensors.

Step 1502 may include placing the wearable devices on a first user, "user 1," who will perform a movement for a signature. User 1 may be a trainer (e.g., physical therapist, personal trainer, etc.), coach, patient, or other human subject. In some aspects, user 1 may be a non-human subject, including a non-living subject (e.g., a robot having a plurality of links connected via joints). In at least some embodiments, user 1 or user 2 (described below) can be any desired object. For example, the object may be a toy, blocks, a chair, etc., that can be moved and, upon moving, generate a signature with a wearable device (e.g., a device secured to the object).

Figure 17:
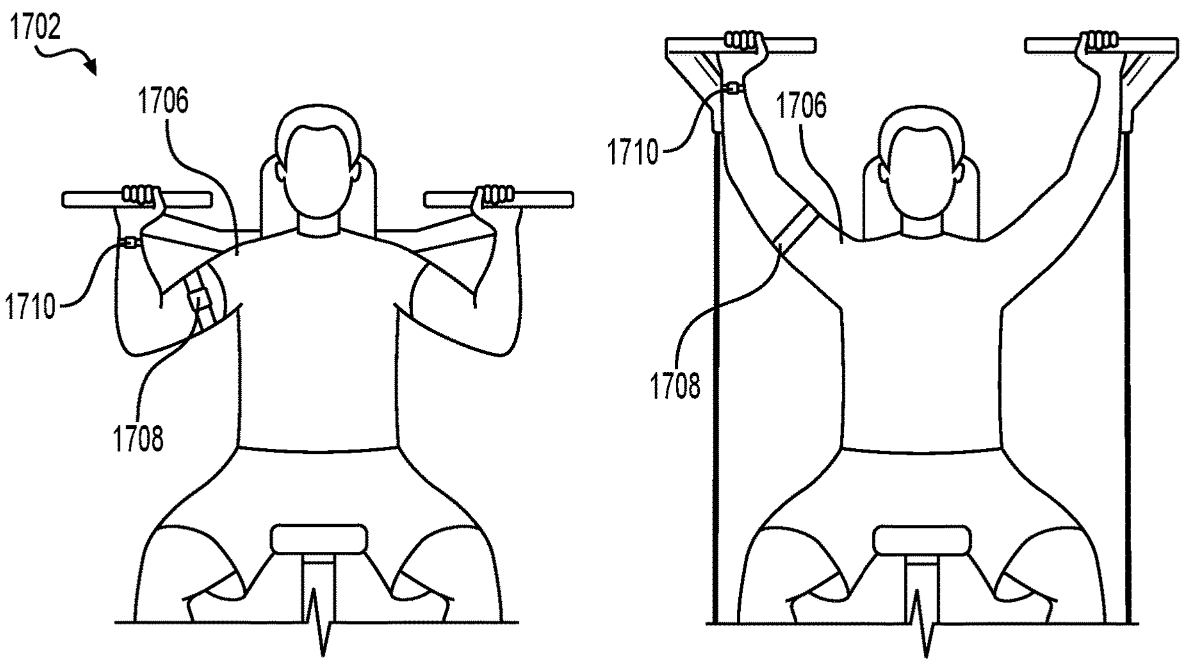
FIG. 17 is a diagram showing a beginning position and an end portion of a signature movement.

In the example of a human subject wearing multiple wearable devices, the devices may be placed on a common (e.g., the same) limb, such as an arm of a user 1706, as shown in FIG. 17, for example. Wearable devices 1710 and 1708 are placed on the wrist and bicep of the same arm, but may be placed on different limbs and/or different body parts (e.g., chest, waist, forehead, etc.).

A step 1504 may include calibrating the wearable devices by configuring a processor of the wearable device to identify motion via sensors 1405. Calibrating may include a selection, by user 1, to connect the devices with any other external computing device or devices via any wired or wireless communication. Exemplary communication standards include those known for connection to a mobile phone, laptop, tablet, personal computer, etc. This connection may be between two or more wearable devices, or between one or more wearable devices and a non-worn computing system. In some configurations, connection to another device is optional and the wearable devices are used independently, as standalone systems without an active connection for communication to a device. In some configurations, a plurality of wearable devices connect to each other to facilitate communication, but do not connect to any external devices.

Once a communication connection is made (if a connection is desired) with wearable device controller 1400, step 1504 may be performed by interacting with a touchscreen display or other input device of the wearable device or with an external computing device such as a mobile phone, personal computer, tablet, etc. Step 1504 may include displaying a prompt or other graphical user interface element that enables a user to select the location where the wearable device is currently worn or will be worn during generation of the signature. A user may select, for example, a bicep, wrist, ankle, thigh, waist, chest, head, etc. In the example of a touch-screen selection, the user may select the body part of a virtual avatar, resulting in the generation of placement inputs 1404 (FIG. 14). The same selection or similar selection may also be made via an external system. Other configurations for selecting a body part may include selecting from a list of options instead of interacting with a virtual avatar. This calibration process may be repeated for each wearable device (e.g., second, third, fourth, or additional wearable devices).

Another example of a calibration, that can be performed instead of or in addition to selecting a limb or other body part, is presenting a prompt to move a particular body part with placement inputs 1404. For example, signature manager 1408 may cause placement inputs 1404 to provide a notification (e.g., a display) of a particular body part where signature manager 1408 expects the wearable device to be placed. The user may then interact with the screen of the device or move that body part such that the wearable device(s) present on that body part are recognized based on the data generated by sensors 1405 during this movement. This may be repeated for each body part and/or each wearable device. In some aspects, placement inputs 1404 may request movement in a particular plane and/or in a particular direction. Movement in a particular plane or in a particular direction may generate data with sensors 1405 that enables wearable device controller 1400 to determine an orientation as well as a placement of the wearable device.

A step 1506 may include initializing one or more wearable devices with signature initializer 1410 (e.g., by signature initializer 1410) to record a signature. As one example, initialization may include manually interacting with the wearable device by touching a touchscreen, a button, or other input device to trigger signature recording. Any suitable graphical representation may be displayed, such as a record icon (e.g., a red circle) as shown in FIG. 14 as an example of signature recording input 1406.

Additionally or alternatively, step 1506 may be performed by the wearable device in an automated manner. For example, a predetermined starting posture (e.g., a starting posture programmed in signature database 1416) may cause signature initializer 1410 to initiate the below-described process for recording a signature. In some embodiments, a predetermined motion may cause signature initializer 1410 to initiate the steps for recording a signature. A physiological characteristic (e.g., a predetermined heart rate threshold or range) may be used instead of or in addition to the starting posture or predetermined motion. In some embodiments, the wearable device may include a microphone enabling the use of a voice command to initiate signature recording. For example, a user may speak the phrase "record signature," this phrase being recognized by signature initializer 1410.

Once signature initializer 1410 determines that a signature will be recorded, a countdown timer may begin. This countdown timer may be presented as a haptic notification (e.g., three vibration pulses representing three seconds remaining until signature recording, two vibration pulses representing two seconds remaining until signature recording, etc.), an auditory notification, and/or a visual notification. A countdown may be advantageous, especially in configurations where initialization is performed automatically, allowing the user to move their limb(s) and/or body into a desired position for the beginning of the signature.

In some embodiments, step 1506 may include providing a notification to the user that signature recording has begun. This may be performed in a manner similar to that for the countdown. In particular, a notification may be presented via haptic, audio, and/or visual notifications. This provides the user with the knowledge that movement occurring after the notification will be recorded.

A step 1508 may include receiving sensor data with signal filter and analyzer 1412 (e.g., by signal filter and analyzer 1412). This sensor data may be from sensors 1405 and may be performed as described above in Section I. Sensor data may be received from a single wearable device or a plurality of wearable devices.

Step 1508 may also include filtering the data according to one or more of the above-described techniques, including low pass filtering, high pass filtering, and butter worth filtering. Filtering may be performed by signal filter and analyzer 1412 to improve movement prediction/comparison accuracy, improve processing speed, and/or to provide other advantages. The filtered and/or raw data may be analyzed and recorded in real time. While filtering is described with respect to step 1508, filtering and other signal processing techniques may be performed during calibration (step 1504) and during corresponding steps 1602 and 1604 of method 1600, described below.

Filtering may be performed in real-time by simultaneous application of multiple techniques, or by applying one filtering technique, in real-time. If desired, a plurality of filtering techniques may be performed in sequence. In an exemplary sequence, low pass filtering may first be performed, followed by high pass filtering. Filtering may also include the application of signal processing techniques such as averaging, as described above.

Step 1510 may include recording the movement (e.g., the raw data and/or filtered data from sensors 1405) as a signature with signature processor 1414 (e.g., by signature processor 1414). For example, signature processor 1414 determines that at least some of the data (in raw and/or filtered form) is a signature.

Step 1510 may include determining the type of movement performed (e.g., whether the movement is a new exercise, previously-performed exercise, new authentication, or a log-in attempt according to a previously-performed authentication). Signature processor 1414 may employ one or more of the above-described techniques, including biomechanics-based algorithms using one or more probability-based, and/or supervised, semi-supervised, unsupervised, or reinforcement machine learning, Fourier transforms ("FFT"), or others.

In some configurations, techniques such as Naïve Bayes, decision tree, random forest, or K-nearest neighbors are used to identify the type of movement performed. These techniques may facilitate signature recognition by accurately determining whether a movement performed after step 1506 was performed previously or is unique. When a unique signature is recognized, signature processor 1414 may employ machine learning techniques to determine whether the movement is an authentication, an exercise, or other training movement. When an exercise or other training movement was performed, signature processor 1414 may determine which movement was performed (e.g., a shoulder press, squat, stretch, yoga pose, etc.). Physiological data may also be used to facilitate classification of a signature. In these or other configurations, clustering and/or regression algorithms may be performed. The user may confirm whether the signature is new or otherwise correctly classified, enabling the use of reinforcement learning techniques.

The above-described algorithms may be performed in real-time. Thus, steps 1508 and 1510 may be performed simultaneously. Matrix techniques and/or linear algebra-based algorithms may also be used to facilitate real-time analysis. In particular, matrices may be created. Matrices include, for example, rows and columns that store the raw or processed data of the accelerometer, gyroscope, and/or magnetometer. The processed data may be in numerical form and analyzed via matrix computation techniques.

Real-time processing may be applied in situations other than performance of a prescribed movement. For example, real-time processing may be beneficial in circumstances where a user has difficulty in executing a movement or in situations where a coach, trainer, or other instructor adjusts a specific movement for the user during performance of a movement, between movement repetitions, or otherwise in real time. In such situations, data processing techniques may be adjusted to enable feedback generation and improve the accuracy of the feedback provided. As examples of these adjustments, particular algorithms and/or particular matrix computation techniques are given precedence to provide user flexibility for real-time processing.

Matrices may also include physiological data. Matrix operations may involve using data of rows, columns, certain portions of the row and columns or a combination of the above to allow the devices to process data faster and use the resulting calculation to enable the device to provide feedback to the user of the movement being done in real time.

Step 1512 may include storing the signature with signature processor 1414 (e.g., by signature processor 1414). Signature processor 1414 may store the signature in signature database 1416. When the signature is a new exercise or new authentication, the status of the movement as an exercise or an authentication may be stored in association with some or all of the raw or processed data from sensors 1405. A unique identifier associated with the user may also be stored with the data from sensors 1405.

The stored movement may be correlated with anatomic data, such as a kinematic chain. Signature processor 1414 may generate an output 1418 that causes a notification 1420 to be displaced based on the anatomic data or movement identified by machine learning. While notification 1420 may be real-time feedback, in some aspects, notification 1420 may provide information, such as a computer-generated illustration of the movement, text, etc., that enables the user to confirm whether the signature was correctly classified.

For example, a simplified rendition of the movement may be displayed. A textual or other notification may also indicate whether the signature is classified as an exercise, and may identify the exercise that was performed.

When the movement is an authentication, outputs 1418 may prompt the user to approve the authentication signature or re-record the signature. The prompt to approve the signature or re-record the signature may be presented when the signature is classified as an exercise.

When the signature is approved, step 1512 may be performed to store the signature. While step 1512 is illustrated as a final step of method 1500, as understood, step 1512 may be performed in real-time, in conjunction with the above-described algorithms and filtering techniques, to record a signature while the movement is being performed.

In step 1512, as discussed above, signature processor 1414 may add the signature to signature database 1416 (e.g., data storage on-board a wearable device and/or located externally of the wearable device) as a new exercise signature or a new authentication signature. In some aspects, an existing exercise signature or an existing authentication signature in signature database 1416 may be replaced or modified (e.g., adjust in whole or in part) based on the signature that was recorded according to steps 1502-1510. The signature may, in at least some examples, be a custom movement signature generated by user 1.

A method 1600 may be performed by a second user, "user 2." As indicated above, user 2 may be the same user as user 1 (e.g., performing a second signature movement). When user 2 is a different user, user 1 may have performed a signature for training purposes and user 2 will perform a movement intended to match the training movement performed by user 1. In either example, the movement and/or physiological data associated with performance of method 1600 may be compared to the signature of method 1500.

A step 1602 may include placing, calibrating, and initializing the wearable devices on user 2. This step may be performed in the manner describe above with respect to steps 1502, 1504, and 1506. At the conclusion of step 1602, user 2 may begin a movement while the wearable device(s) receive sensor data in a step 1604. Step 1604 may be performed in the same manner as step 1508 to facilitate the analysis of movement data and/or physiological data.

A step 1606 may include comparing the signature movement according to the sensor data received in step 1604. This comparison may be performed in real-time while the sensor data is received, or may be performed after the data has been recorded.

In one example, signature processor 1414 may perform the comparison based on user-inputs that select which signature will be used as the basis of the comparison. This may be beneficial when method 1500 is performed more than once prior to the performance of method 1600. A user may review one or more signature of signature database 1416 and select the signature that will be used as a basis for comparison. In another example, signature processor 1414 may compare the signature movement of method 1600 to the immediately preceding signature, which was performed for method 1500.

When the comparison of step 1606 is performed, signature processor 1414 may generate an output in a step 1608. The output may include real-time feedback or feedback following the completion of the entire signature. The feedback may be provided in the manner described in Section I. For example, the feedback may indicate a level of compliance with another signature, including compliance with movement, one or more physiological characteristics, or both.

Additionally or alternatively, the feedback may illustrate portions of the second signature that was performed in a manner that complies with the first signature, and/or illustrate portions that are out of compliance with the first signature. The wearable device may present a display representing portions of the movement performed during method 1600, or corresponding physiological data, that deviate from those of the signature stored during method 1500. When it is desirable to modify a signature that was stored previously, user 2 may be presented with the option to modify the signature stored in step 1512 of method 1500 based on the deviations identified during method 1600.

When multiple deviations are identified, these deviations may be presented, in series, via the wearable device. For example, when three deviations occur, a first deviation at a first time involving the elbow, a second deviation at the same time (e.g., the first time) involving the shoulder, and a third deviation at a different time (e.g., a second time) involving the elbow, each deviation may be presented to user 2. This may allow user 2 to select the deviations that are used to modify the signature of method 1500. The deviations may be presented in chronological order, or based on anatomy (e.g., by presenting a deviation based on the impact of the deviation on the ability to perform the movement).

In some examples, methods 1500 and 1600 are performed in an interactive environment. In these examples, method 1500 is performed to create an exemplar (e.g., a custom movement signature) that a plurality of users, a plurality of "user 2", attempts to replicate. Each of the users acting as a user 2 may be provided with individualized feedback, in real time. This may advantageously facilitate gamification of a training session, group exercise, group therapy, or other activity.

In other examples, method 1600 is performed as part of regiment or plan of training and method 1500 is performed by user 1 to establish training movements that are performed for rehabilitation, exercise, etc., for user 2. In other examples, a plurality of users may record individual custom movement signatures. These signatures may be compared against each other. This comparison may enable the wearable devices to identify portions of an individual signature that deviate from corresponding portions of multiple other signatures, allowing a wearable device to determine when one user's movements deviated from that of a group of other users. This may enable step 1606 to be performed without establishing a single signature that is used for comparison with the signature of a particular "user 2."

In examples where methods 1500 and 1600 are performed for authentication, method 1500 may be used to set a movement signature for authentication, e.g., to replace an alphanumeric password, second factor authentication, or biometric authentication. In these examples, method 1500 may include performing an initial authentication by use of a password, second factor, or biometric method, or by creating a new account. The signature recorded and stored in steps 1510 and 1512 may then be associated with the user and established for use in subsequent authentications represented by method 1600.

When the movement signature is performed for authentication, the comparison may determine whether the authentication is granted or denied. In authentication examples, it may be desirable to omit the presentation of detailed feedback to user 2. For example, a denied authentication may provide feedback such as "signature incorrect," without providing details explaining which portion(s) of the movement failed to match the signature recorded in method 1500.

In embodiments where methods 1500 and 1600 are used for authentication, the performance of method 1600 may be used to authenticate user 2 for financial transactions, health care access, personal identification (e.g., access to one or more accounts), etc. The use of an authentication may be used as a replacement for other authentication processes, such as a password, or used in combination. The authentication may be used in a private setting when used as an authentication to sensitive information, such as financial accounts, and may be used in public for situations with less sensitivity, such as identifying a user for a group training session.

When desired, method 1500 or 1600 may include resetting a signature. This may be performed by user 1 or by user 2. A signature may be reset immediately following the completion of the signature (e.g., immediately following step 1512 or step 1608), or after reviewing a plurality of signature stored in signature database 1416 (FIG. 14).

FIGS. 17 and 18 illustrate the performance of a signature movement in the form of an exercise and a corresponding display on a wearable device, respectively. As shown in FIG. 17, the signature may be performed in an environment 1702. Environment 1702 may include a user 1706 (user 1 and/or user 2) and one or more wearable devices, two wearable devices 1708 and 7110 being shown. The left portion of FIG. 17 illustrates the beginning of the signature.

The posture on the left of FIG. 17 may be a predetermined starting position that, when recognized, causes signature initializer 1410 to recognize that signature recording will occur. The starting position may correspond to a position that user 1706 transitions to prior to the end of a countdown for beginning the signature.

The posture on the right of FIG. 17 represents the final position of the signature. The completion of the signature may be signaled by the user or determined automatically by signature analyzer 1408. A user may signal the end of a signature by holding a fixed position for a predetermined amount of time (e.g., three seconds, four seconds, five seconds, etc.) or by a voice command. This may be preferred when the signature is an exercise. In other examples, the user may interact with a wearable device (e.g., a touchscreen) to terminate recording, and may interact with the wearable device or external computing system to remove sensor data that was recorded after the end of the movement but prior to the interaction with the screen. When machine learning or other classification techniques are used, the wearable device may be configured to automatically identify portions of the signature that correspond to the exercise and portions of the signature immediately prior to the interaction with the wearable device in which the user provided an input to stop recording. Thus, excess data may be automatically removed or trimmed from the signature.

Once a signature is completed, signature processor 1414 of the wearable device may provide outputs 1418 (FIG. 14), exemplary outputs being shown in FIG. 18. When, for example, a signature is successfully recognized, wearable device 1810 may present a notification 1812 to the user with this information. Notification 1812 may be presented when a signature is automatically recognized. In other examples, notification 1812 may be presented when a signature is successfully recorded. While the phrase "signature recognized" is shown in FIG. 18, as understood notification 1812 may include other text, such as "signature recorded," an auditory notification, haptic notification, or any combination thereof.

A notification 1814 may include an image, animation, or other representation of the signature that was recognized or recorded. This may facilitate confirmation that the signature was recognized or recorded appropriately. In the example shown in FIG. 18, equipment associated with the signature (a shoulder press) is illustrated. As understood, an animation may show a representation of the user without the presence of equipment.

Figure 19:
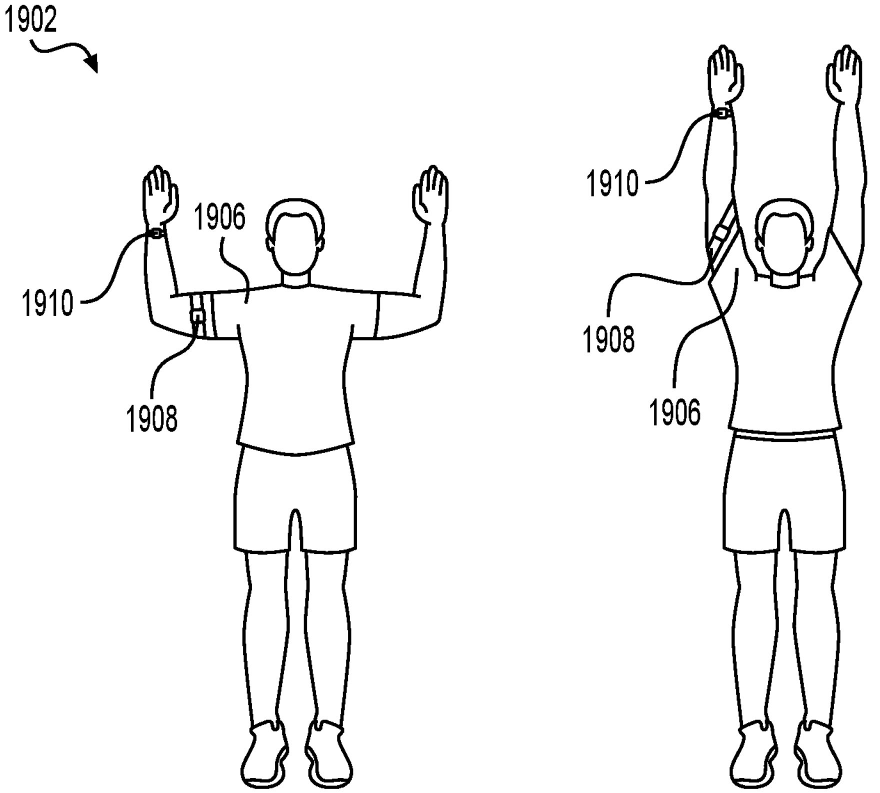
FIG. 19 is a diagram showing a beginning position and an end portion of a signature movement.

In the example environment 1902 shown in FIGS. 19 and 20, a user 1906 performs a signature movement, such as a shoulder press, without equipment. The signature may be recorded in an environment 1902 which includes a user 1906 (user 1 and/or user 2) and one or more wearable devices, two wearable devices 1908 and 1910 being shown. The left portion of FIG. 19 illustrates the beginning of the signature, similar to the corresponding portion of FIG. 17.

As shown in FIG. 20, notifications 2012 may and 2014 may be presented via the display of a wearable device 2010, or in any above-described manner, such as display on a different device (e.g., a cellular phone, tablet, laptop, or other computing device). Notification 2012 corresponds to notification 1812, while notification 2014 corresponds to notification 1814. When the movement of FIG. 19 may also correspond to an authentication movement, notification 2012 may indicate that the authentication was successful or unsuccessful.

Each wearable device described herein may include a memory, e.g., a central processing unit (CPU) with one or more processing cores, a graphics processing unit (GPU), etc. The terms "a processor" and "the processor" encompasses one or more processors, and not necessarily the same processors, digital signal processors, application specific integrated circuits, field programmable gate arrays, etc. Processors of the wearable devices and other systems described herein implement a software program, such as code generated manually (i.e., programmed).

The wearable devices also include memory that communicate with the one or more processors via a bus. Memory may include computer-readable storage media such as various types of volatile and non-volatile storage media, including but not limited to random access memory, read-only memory, programmable read-only memory, electrically programmable read-only memory, electrically erasable read-only memory, flash memory, magnetic tape or disk, optical media, etc. Memory can include a cache or random-access memory for the processor.

While examples of wearable devices are shown above, in some aspects, signature manager 1408, including signature initializer 1410, signature filter an analyzer 1412, signature processor 1414, and signature database 1416 may be embodied as programming suitable for different types of devices. This programming may be delivered to various types of wearable devices by accessing the programming via the Internet (e.g., by a repository referred to as an "App store"), another wearable device, an external computing system, removable storage media, etc. In some aspects, signature manager 1408 may be executed by an external computing system, such that sensors 1405 on the wearable device provide raw data and/or filtered data, with the other functions of signature manager 1408 being performed on the external system. These configurations may advantageously enable a user to create and use signature manager 1408 without the need to acquire new hardware components.

Other examples of the disclosure will be apparent to those skilled in the art from consideration of the specification and practice of the examples disclosed herein. Though some of the described methods have been presented as a series of steps, it should be appreciated that one or more steps can occur simultaneously, in an overlapping fashion, or in a different order. The order of steps presented is only illustrative of the possibilities and those steps can be executed or performed in any suitable fashion. Moreover, the various features of the examples described here are not mutually exclusive. Rather any feature of any example described here can be incorporated into any other suitable example. It is intended that the specification and examples be considered as exemplary only, with a true scope and spirit of the disclosure being indicated by the following claims.

What is claimed is:

1. A method for generating or modifying movement signatures, the method comprising:

receiving a request to generate a movement signature;

receiving first sensor data from one or more sensors of a first wearable device positioned at a first location on a subject during performance of a designated movement, the first sensor data being generated with one or more of an accelerometer, a gyroscope, or a magnetometer of the first wearable device;

processing the first sensor data with a Kalman filter to generate filtered first sensor data;

correlating the filtered first sensor data with an electronic representation of a kinematic chain of the subject to generate the movement signature representing movement of one or more body segments of the subject;

associating the filtered first sensor data with the movement signature and storing the filtered first sensor data;

receiving second sensor data from one or more sensors of a second wearable device, the second sensor data being generated with one or more of an accelerometer, a gyroscope, or a magnetometer of the second wearable device;

removing second noise from the second sensor data with the Kalman filter to generate filtered second sensor data;

selecting one or more comparative modeling techniques based on at least one of:

a limb, a limb segment, a joint involved in the movement, or a characteristic of the second sensor data;

analyzing, by the one or more comparative modeling techniques, the filtered second sensor data in comparison to the first sensor data; and based on the analyzing, generating a notification, or modifying the movement signature.

2. The method of claim 1, wherein the second wearable device is positioned at a second location on the subject.

3. The method of claim 1, wherein the second wearable device is positioned at a second location on a second subject.

4. The method of claim 3, further including using the movement signature to authenticate the second subject.

5. The method of claim 1, wherein the movement signature includes physiological data measured with a physiological sensor.

6. The method of claim 1, wherein the request to generate the movement signature is received via an interaction with a touch screen of the first wearable device.

7. The method of claim 1, further including analyzing the second sensor data using a supervised, an unsupervised, or a reinforcement learning algorithm.

8. The method of claim 1, further including analyzing the second sensor data using a Naïve Bayes, decision tree, random forest, or K-nearest neighbors technique.

9. The method of claim 1, further including applying a filtering technique to the first sensor data such that filtered first sensor data is associated with the movement signature.

10. The method of claim 1, wherein the request to generate the movement signature corresponds to a movement of the first wearable device that is measured with the first sensor data.

11. A system for processing movement signatures, the system comprising:

a memory storing instructions;

one or more processors that, when executing the instructions, performs operations including:

receiving a request to generate a movement signature;

receiving first sensor data from one or more sensors of a first wearable device positioned at a first location on a subject during performance of a designated movement, the first sensor data being generated with one or more of an accelerometer, a gyroscope, or a magnetometer of the first wearable device;

processing the first sensor data with a Kalman filter to generate filtered first sensor data;

correlating the filtered first sensor data with an electronic representation of a kinematic chain of the subject to generate the movement signature representing movement of one or more body segments of the subject;

associating the filtered first sensor data with the movement signature and storing the filtered first sensor data;

receiving second sensor data from one or more sensors of a second wearable device, the second sensor data being generated with one or more of an accelerometer, a gyroscope, or a magnetometer of the second wearable device;

removing second noise from the second sensor data with the Kalman filter to generate filtered second sensor data;

selecting one or more comparative modeling techniques based on at least one of:

a limb, a limb segment, a joint involved in the movement, or a characteristic of the second sensor data;

analyzing, by the one or more comparative modeling techniques, the filtered second sensor data in comparison to the first sensor data; and based on the analyzing:

generating a notification, or modifying the movement signature.

12. The system of claim 11, wherein the second wearable device is positioned at a second location on the subject.

13. The system of claim 11, wherein the second wearable device is positioned at a second location on a second subject.

14. The system of claim 13, wherein the operations further include using the movement signature to authenticate the second subject.

15. The system of claim 11, wherein the movement signature includes physiological data measured with a physiological sensor.

16. The system of claim 11, wherein the request to generate the movement signature is received via an interaction with a touch screen of the first wearable device.

17. The system of claim 11, wherein the operations further include analyzing the second sensor data using a supervised, an unsupervised, or a reinforcement learning algorithm.

18. The system of claim 11, wherein the operations further include analyzing the second sensor data using a Naïve Bayes, decision tree, random forest, or K-nearest neighbors technique.

19. The system of claim 11, wherein the operations further include applying a filtering technique to the first sensor data such that filtered first sensor data is associated with the movement signature.

20. The system of claim 11, wherein the request to generate the movement signature corresponds to a movement of the first wearable device that is measured with the first sensor data.

* * * * *